US010909586B2

(12) United States Patent
Avedissian et al.

(10) Patent No.: US 10,909,586 B2
(45) Date of Patent: Feb. 2, 2021

(54) SYSTEM AND METHODS FOR PROVIDING USER GENERATED VIDEO REVIEWS

(71) Applicant: Scorpcast, LLC, Las Vegas, NV (US)

(72) Inventors: Narbeh Avedissian, Studio City, CA (US); Nikhil Sreenath, Las Vegas, NV (US)

(73) Assignee: Scorpcast, LLC, Las Vegas, NV (US)

( * ) Notice: Subject to any disclaimer, the term of this patent is extended or adjusted under 35 U.S.C. 154(b) by 0 days.

(21) Appl. No.: 15/973,082

(22) Filed: May 7, 2018

(65) Prior Publication Data
US 2018/0253765 A1 Sep. 6, 2018

Related U.S. Application Data

(63) Continuation of application No. 15/688,566, filed on Aug. 28, 2017, now Pat. No. 9,965,780, which is a (Continued)

(51) Int. Cl.
*G06Q 30/02* (2012.01)
*H04N 21/44* (2011.01)
(Continued)

(52) U.S. Cl.
CPC ..... *G06Q 30/0282* (2013.01); *G06Q 30/0261* (2013.01); *G06Q 30/0278* (2013.01);
(Continued)

(58) Field of Classification Search
CPC ........... G06Q 30/0282; G06Q 30/0278; G06Q 30/0261; H04N 21/4828; H04N 21/44016;
(Continued)

(56) References Cited

U.S. PATENT DOCUMENTS 5,774,869 A 6/1998 Toader
5,911,131 A 6/1999 Vig
(Continued)

FOREIGN PATENT DOCUMENTS

CN 102547566 7/2012
CN 102946378 2/2013
(Continued)

OTHER PUBLICATIONS

Perez, Luis, "iMovie '09 Basics", Apr. 2009, pp. 1-12, downloaded from: https://etc.usf.edu/te_mac/movies/pdf/imovie09.pdf (Year: 2009).*
(Continued)

*Primary Examiner* — Lynda Jasmin
*Assistant Examiner* — Ehrin L Pratt
(74) *Attorney, Agent, or Firm* — Knobbe, Martens, Olson & Bear LLP

(57) ABSTRACT

Methods and systems for content aggregation and distribution are described. Video content may be received from a plurality of sources. The video content may be associated with metadata identifying items included within the video content. A video player may be provided which enables video content to be displayed on a user terminal, and a control may be provided enabling the user to quickly navigate to specific portions of the video content. A viewer of the video content may, in turn, author and provide additional video content. The video player may be embeddable.

29 Claims, 39 Drawing Sheets

Related U.S. Application Data continuation of application No. 14/180,241, filed on Feb. 13, 2014, now Pat. No. 9,754,296, which is a continuation of application No. 13/804,121, filed on Mar. 14, 2013, now Pat. No. 8,682,809, which is a continuation-in-part of application No. 13/449,610, filed on Apr. 18, 2012, now Pat. No. 8,615,474, and a continuation-in-part of application No. 13/451,478, filed on Apr. 19, 2012, now Pat. No. 8,635,169.

(51) Int. Cl.
| | |
|---|---|
| H04N 21/4223 | (2011.01) |
| H04N 21/4722 | (2011.01) |
| H04N 21/475 | (2011.01) |
| H04N 21/482 | (2011.01) |
| H04N 21/81 | (2011.01) |
| H04N 21/442 | (2011.01) |
| H04N 21/4784 | (2011.01) |

(52) U.S. Cl.
CPC ....... *H04N 21/4223* (2013.01); *H04N 21/442* (2013.01); *H04N 21/44016* (2013.01); *H04N 21/4722* (2013.01); *H04N 21/4756* (2013.01); *H04N 21/4784* (2013.01); *H04N 21/4828* (2013.01); *H04N 21/812* (2013.01)

(58) Field of Classification Search
CPC ............... H04N 21/812; H04N 21/442; H04N 21/4756; H04N 21/4722; H04N 21/4223; H04N 21/4784
See application file for complete search history.

(56) References Cited

U.S. PATENT DOCUMENTS

| | | | |
|---|---|---|---|
| 5,913,204 A | 6/1999 | Kelly | |
| 6,029,141 A | 2/2000 | Bezos et al. | |
| 6,073,127 A | 6/2000 | Lannert et al. | |
| 6,086,380 A | 7/2000 | Chu et al. | |
| 6,175,840 B1 | 1/2001 | Chen et al. | |
| 6,216,112 B1 | 4/2001 | Fuller et al. | |
| 6,248,946 B1 | 6/2001 | Dwek | |
| 6,317,761 B1 | 11/2001 | Landsman et al. | |
| 6,317,811 B1 | 11/2001 | Deshpande et al. | |
| 6,317,881 B1 | 11/2001 | Shah-Nazaroff et al. | |
| 6,343,313 B1 | 1/2002 | Salesky et al. | |
| 6,363,356 B1 | 3/2002 | Horstmann | |
| 6,496,981 B1 | 12/2002 | Wistendahl et al. | |
| 6,530,082 B1 | 3/2003 | Del Sesto et al. | |
| 6,968,243 B1 | 11/2005 | Oh | |
| 7,027,983 B2 | 4/2006 | Puterbaugh et al. | |
| 7,069,310 B1 | 6/2006 | Bartholomew | |
| 7,076,434 B1 | 7/2006 | Newnam et al. | |
| 7,080,139 B1 | 7/2006 | Briggs et al. | |
| 7,139,813 B1 | 11/2006 | Wallenius | |
| 7,158,942 B2 | 1/2007 | Miyazaki et al. | |
| 7,162,433 B1 | 1/2007 | Foroutan | |
| 7,191,023 B2 | 3/2007 | Williams | |
| 7,297,860 B2 | 11/2007 | Decuir | |
| 7,308,413 B1 | 12/2007 | Tota et al. | |
| 7,512,421 B2 | 3/2009 | Kim et al. | |
| 7,539,742 B2 | 5/2009 | Spector | |
| 7,592,532 B2 | 9/2009 | Coleman | |
| 7,664,678 B1 | 2/2010 | Haber | |
| 7,720,707 B1 | 5/2010 | Mowry | |
| 7,792,782 B2 | 9/2010 | Yun | |
| 7,865,394 B1 | 1/2011 | Calloway et al. | |
| 7,945,463 B2 | 5/2011 | Sussman et al. | |
| 8,099,325 B2 | 1/2012 | Gangadharpalli et al. | |
| 8,103,545 B2 | 1/2012 | Ramer et al. | |
| 8,175,252 B2 | 5/2012 | Batni et al. | |
| 8,209,396 B1 | 6/2012 | Raman | |
| 8,290,824 B1 | 10/2012 | Mesaros | |
| 8,312,486 B1 | 11/2012 | Briggs | |
| 8,342,412 B2 | 1/2013 | Schacherer et al. | |
| 8,447,324 B2 | 5/2013 | Shuman et al. | |
| 8,458,053 B1 | 6/2013 | Buron | |
| 8,479,246 B2 | 7/2013 | Hudson et al. | |
| 8,595,057 B2 | 11/2013 | Avedissian | |
| 8,682,809 B2 | 3/2014 | Avedissian | |
| 8,813,132 B2 | 8/2014 | Andrews, II et al. | |
| 8,849,945 B1 | 9/2014 | Desjardins | |
| 9,071,730 B2 | 6/2015 | Livesey | |
| 9,697,504 B2 | 7/2017 | Spitz | |
| 10,055,768 B2 | 8/2018 | Briggs | |
| 2001/0025259 A1 | 9/2001 | Rouchon | |
| 2002/0013785 A1 | 1/2002 | Miyazaki et al. | |
| 2002/0056123 A1 | 5/2002 | Liwerant | |
| 2002/0091455 A1 | 7/2002 | Williams | |
| 2002/0103695 A1 | 8/2002 | Urken et al. | |
| 2002/0143607 A1 | 10/2002 | Connelly | |
| 2002/0198723 A1 | 12/2002 | Mowry | |
| 2003/0028873 A1 | 2/2003 | Lemmons | |
| 2003/0036944 A1 | 2/2003 | Lesandrini et al. | |
| 2003/0075036 A1 | 4/2003 | Isozaki et al. | |
| 2003/0105666 A1 | 6/2003 | Taub et al. | |
| 2003/0130894 A1 | 7/2003 | Huettner et al. | |
| 2003/0079015 A1 | 8/2003 | Fein et al. | |
| 2003/0149574 A1 | 8/2003 | Rudman | |
| 2003/0164084 A1 | 9/2003 | Redmann et al. | |
| 2003/0167465 A1 | 9/2003 | Davis et al. | |
| 2003/0171982 A1 | 9/2003 | Paul | |
| 2003/0187802 A1 | 10/2003 | Booth | |
| 2003/0229537 A1 | 12/2003 | Dunning et al. | |
| 2004/0003097 A1 | 1/2004 | Willis et al. | |
| 2004/0015427 A1 | 1/2004 | Camelio | |
| 2004/0093236 A1 | 5/2004 | Chacker | |
| 2004/0093249 A1 | 5/2004 | Chacker | |
| 2005/0002226 A1 | 1/2005 | Ackley | |
| 2005/0021903 A1 | 1/2005 | Baxter, Jr. | |
| 2005/0022226 A1 | 1/2005 | Ackley | |
| 2005/0071865 A1 | 3/2005 | Martins | |
| 2005/0097613 A1 | 5/2005 | Ulate et al. | |
| 2005/0120389 A1 | 6/2005 | Boss et al. | |
| 2005/0195292 A1 | 9/2005 | McIntyre et al. | |
| 2005/0229227 A1 | 10/2005 | Rogers | |
| 2005/0246377 A1 | 11/2005 | Faso | |
| 2005/0267819 A1 | 12/2005 | Kaplan | |
| 2005/0276246 A1 | 12/2005 | Walker et al. | |
| 2006/0009979 A1 | 1/2006 | McHale et al. | |
| 2006/0026593 A1 | 2/2006 | Canning et al. | |
| 2006/0080716 A1 | 4/2006 | Nishikawa | |
| 2006/0106675 A1 | 5/2006 | Cohen et al. | |
| 2006/0129688 A1 | 6/2006 | Chatani et al. | |
| 2006/0143068 A1 | 6/2006 | Calabria | |
| 2006/0149681 A1 | 7/2006 | Meisner | |
| 2006/0155575 A1 | 7/2006 | Gross | |
| 2006/0212350 A1 | 9/2006 | Ellis et al. | |
| 2006/0212367 A1 | 9/2006 | Gross | |
| 2006/0218153 A1 | 9/2006 | Voon et al. | |
| 2006/0229993 A1 | 10/2006 | Cole | |
| 2006/0242139 A1 | 10/2006 | Butterfield et al. | |
| 2006/0242269 A1 | 10/2006 | Gross | |
| 2006/0251399 A1 | 11/2006 | Ando | |
| 2006/0253599 A1 | 11/2006 | Monteiro et al. | |
| 2006/0292541 A1 | 12/2006 | Ehmann | |
| 2007/0044639 A1 | 3/2007 | Farbood et al. | |
| 2007/0056002 A1 | 3/2007 | Ganesan et al. | |
| 2007/0112762 A1 | 5/2007 | Brubaker | |
| 2007/0130040 A1 | 6/2007 | Stinski | |
| 2007/0156507 A1 | 7/2007 | Connelly et al. | |
| 2007/0157251 A1 | 7/2007 | Shrivastava et al. | |
| 2007/0174774 A1* | 7/2007 | Lerman | G06F 17/30017 715/723 |
| 2007/0186272 A1 | 8/2007 | Hunter et al. | |
| 2007/0243509 A1 | 10/2007 | Stiebel | |
| 2007/0250378 A1 | 10/2007 | Hughes et al. | |
| 2007/0263984 A1 | 11/2007 | Sterner | |
| 2007/0294177 A1 | 12/2007 | Volk et al. | |
| 2007/0300258 A1* | 12/2007 | O'Connor | A23L 2/52 725/44 |
| 2008/0034066 A1 | 2/2008 | Shamus et al. | |

(56) References Cited

U.S. PATENT DOCUMENTS

| | | | |
|---|---|---|---|
| 2008/0040235 A1 | 2/2008 | Avedissian | |
| 2008/0040444 A1 | 2/2008 | Angquist et al. | |
| 2008/0050713 A1 | 2/2008 | Avedissian | |
| 2008/0050714 A1 | 2/2008 | Avedissian | |
| 2008/0059256 A1 | 3/2008 | Lynch | |
| 2008/0059891 A1 | 3/2008 | Herzog | |
| 2008/0077517 A1 | 3/2008 | Sappington | |
| 2008/0082417 A1 | 4/2008 | Publicover | |
| 2008/0082421 A1 | 4/2008 | Onyon et al. | |
| 2008/0092062 A1 | 4/2008 | Motsinger | |
| 2008/0104626 A1 | 5/2008 | Avedissian | |
| 2008/0104627 A1 | 5/2008 | Avedissian | |
| 2008/0109841 A1 | 5/2008 | Heather | |
| 2008/0143481 A1 | 6/2008 | Abraham et al. | |
| 2008/0172705 A1* | 7/2008 | Liwerant | G06Q 30/02 725/109 |
| 2008/0178230 A1 | 7/2008 | Eyal | |
| 2008/0189752 A1 | 8/2008 | Moradi et al. | |
| 2008/0255961 A1 | 10/2008 | Livesey | |
| 2008/0262931 A1 | 10/2008 | Chan et al. | |
| 2008/0307454 A1 | 12/2008 | Ahanger | |
| 2009/0024923 A1 | 1/2009 | Hartwig | |
| 2009/0079835 A1 | 3/2009 | Kaplan | |
| 2009/0094629 A1* | 4/2009 | Lee | G06Q 30/02 725/10 |
| 2009/0150920 A1 | 6/2009 | Jones | |
| 2009/0192972 A1 | 7/2009 | Spivack et al. | |
| 2009/0210779 A1 | 8/2009 | Badoiu | |
| 2009/0228347 A1 | 9/2009 | Spector | |
| 2009/0276805 A1 | 11/2009 | Andrews, II | |
| 2009/0287532 A1 | 11/2009 | Cohen et al. | |
| 2009/0300475 A1 | 12/2009 | Fink | |
| 2009/0307092 A1 | 12/2009 | Gugliuzza | |
| 2009/0313546 A1 | 12/2009 | Katpelly | |
| 2010/0005498 A1 | 1/2010 | Lanahan | |
| 2010/0153831 A1 | 6/2010 | Beaton | |
| 2010/0163831 A1 | 6/2010 | Beaton | |
| 2010/0269144 A1 | 10/2010 | Forsman | |
| 2010/0274673 A1 | 10/2010 | Isaac | |
| 2010/0293190 A1* | 11/2010 | Kaiser | G06F 3/048 707/769 |
| 2010/0332283 A1 | 12/2010 | Ng et al. | |
| 2011/0059770 A1 | 3/2011 | Silverbrook et al. | |
| 2011/0112915 A1 | 5/2011 | Geer | |
| 2011/0145065 A1 | 6/2011 | Mustafa | |
| 2011/0161820 A1* | 6/2011 | Lee | G06F 17/30038 715/723 |
| 2011/0162002 A1 | 6/2011 | Jones | |
| 2011/0163971 A1 | 7/2011 | Wagner | |
| 2011/0191809 A1 | 8/2011 | Briggs et al. | |
| 2011/0196724 A1 | 8/2011 | Fenton et al. | |
| 2011/0202874 A1 | 8/2011 | Ramer et al. | |
| 2011/0229108 A1 | 9/2011 | Ryckman et al. | |
| 2011/0231260 A1 | 9/2011 | Price | |
| 2011/0251897 A1 | 10/2011 | Litvack et al. | |
| 2012/0022924 A1* | 1/2012 | Runnels | G06F 3/011 705/14.4 |
| 2012/0066355 A1 | 3/2012 | Tiwari et al. | |
| 2012/0095839 A1* | 4/2012 | Labarca | H04W 4/025 705/14.58 |
| 2012/0096357 A1* | 4/2012 | Folgner | G11B 27/34 715/726 |
| 2012/0110474 A1* | 5/2012 | Chen | H04W 4/21 715/753 |
| 2012/0150997 A1 | 6/2012 | McClements, IV | |
| 2012/0206647 A1 | 8/2012 | Allsbrook | |
| 2012/0266197 A1 | 10/2012 | Andrews, II et al. | |
| 2013/0004138 A1* | 1/2013 | Kilar | H04N 21/4756 386/230 |
| 2013/0046566 A1 | 2/2013 | Camelio | |
| 2013/0054757 A1 | 2/2013 | Spitz et al. | |
| 2013/0097644 A1 | 4/2013 | Brande | |
| 2013/0117262 A1 | 5/2013 | Lenahan | |
| 2013/0144903 A1 | 6/2013 | Andrews, II et al. | |
| 2013/0152123 A1 | 6/2013 | Briggs et al. | |
| 2013/0166382 A1 | 6/2013 | Cassidy | |
| 2013/0174037 A1 | 7/2013 | Gao | |
| 2013/0232516 A1 | 9/2013 | Paull | |
| 2013/0282533 A1 | 10/2013 | Foran-Owens et al. | |
| 2013/0283301 A1 | 10/2013 | Avedissian et al. | |
| 2013/0317944 A1 | 11/2013 | Huang et al. | |
| 2014/0032366 A1 | 1/2014 | Spitz et al. | |
| 2014/0033039 A1 | 1/2014 | Kandekar | |
| 2014/0068660 A1 | 3/2014 | Briggs et al. | |
| 2014/0089966 A1 | 3/2014 | Briggs et al. | |
| 2014/0095330 A1 | 4/2014 | Briggs et al. | |
| 2014/0250211 A1 | 9/2014 | Spitz et al. | |
| 2014/0282700 A1 | 9/2014 | Briggs et al. | |
| 2014/0310736 A1 | 10/2014 | Roberts | |
| 2014/0359671 A1 | 12/2014 | Andrews, II et al. | |
| 2015/0020110 A1 | 1/2015 | Fitzsimmons | |
| 2015/0074711 A1 | 3/2015 | Spitz | |
| 2015/0092111 A1 | 4/2015 | Spitz | |
| 2015/0221345 A1 | 8/2015 | Zhao | |
| 2016/0191981 A1 | 6/2016 | Briggs et al. | |
| 2016/0191982 A1 | 6/2016 | Briggs et al. | |
| 2016/0191983 A1 | 6/2016 | Briggs et al. | |
| 2016/0191984 A1 | 6/2016 | Briggs et al. | |
| 2016/0192015 A1 | 6/2016 | Briggs et al. | |
| 2016/0192031 A1 | 6/2016 | Briggs et al. | |
| 2016/0205431 A1 | 7/2016 | Avedissian | |
| 2016/0323646 A1 | 11/2016 | Pratt | |
| 2017/0134779 A9 | 5/2017 | Briggs et al. | |
| 2017/0195400 A1 | 7/2017 | Spitz et al. | |
| 2017/0301003 A1 | 10/2017 | Spitz et al. | |

FOREIGN PATENT DOCUMENTS

| | | | |
|---|---|---|---|
| WO | WO 9952056 A1 | 10/1999 | |
| WO | WO 2006/037053 A2 | 9/2004 | |

OTHER PUBLICATIONS

"How to create google video sitemap urls for very large video files with distinct segments"; Dec. 6, 2011, 1 Page; downloaded from http://webmasters.stackexchange.com/questions/23021/how-to-create-google-video-sitemap-urls-for—very-large-video-files-with-distinct.

"What is Tonos?", pp. 1-3, http://www.tonos.com/app2/tonos/jsp/what is tonos.jsp,2001-2002.

Craig Havighurst, "Webcasters say proposed royalty rate will put them out of business" : Byline (Business; p. 1 E): Jul. 1,2002.

DialogSrchJul. 11, 2013; Examiner Dialog search conducted Jul. 11, 2013.

Rack, C and Seeliger, R. and Arbanowski, S; Featured Media: Nonlinear, clickable multimedia content for an interactive video experience; 2010 Second International Conferences on Advances in Multimedia; Jul. 2010 [Retrieved on Apr. 11, 2017] Retrieved from the Internet: http://ieeexplore.ieee.org/document/5501602/.

Raoul V. Mowatt, in "Web radio royalty rate Postponed" (Metro; Zone: N; p. 2): May 22, 2002.

Webpage from wwwIdolUnderground.com, Selecting homepage; captured Aug. 9, 2007, original publication date Unknown.

Webpage from wwwidolUnderground.com, Selecting Idol Underground Competitions; captured Aug. 9, 2007, original publication date Unknown.

Webpage from www.MusicNation.com, Selecting homepage; captured Aug. 9, 2007, original publication date Unknown.

Webpage from www.MySpace.com, Selecting MySpace Music; captured Aug. 9, 2007, original publication date Unknown.

Webpage from www.MySpace.com, Selecting MySpace Ringtones; captured Aug. 9, 2007, original publication date Unknown.

Webpage from www.YouTube.com, Selecting YouTube Community; captured Aug. 9, 2007, original publication date Unknown.

Webpage from www.YouTube.com, Selecting YouTube Contests; captured Aug. 9, 2007, original publication date Unknown.

www.talentnetworks.com, 53 pages, Jun. 12, 2003.

(56) References Cited

OTHER PUBLICATIONS

Petition for Inter Partes Review of U.S. Pat. No. 9,965,780, filed Sep. 28, 2020.
Defendants' Initial Invalidity and Subject Matter Ineligibility Contentions in U.S. District Court, Eastern District of Texas, Marshall Division, Case No. 2:20-cv-00193-JRG, dated Nov. 4, 2020, 77 pages.
Exhibit 1: U.S. Publication No. 2007/0263984 (Sterner) in U.S. District Court Case, Eastern District of Texas, Marshall Division, No. 2:20-cv-00193-JRG, 59 pages.
Exhibit 2: U.S. Publication No. 2011/0112915 (Geer) in U.S. District Court Case, Eastern District of Texas, Marshall Division, No. 2:20-cv-00193-JRG, 48 pages.
Exhibit 3: U.S. Publication No. 2009/0300475 (Fink) in U.S. District Court Case, Eastern District of Texas, Marshall Division, No. 2:20-cv-00193-JRG, 39 pages.
Exhibit 4: U.S. Publication No. 2009/0297118 (Fink) in U.S. District Court Case, Eastern District of Texas, Marshall Division, No. 2:20-cv-00193-JRG, 44 pages.
Exhibit 5: U.S. Publication No. 2009/0187825 (Sandquist) in U.S. District Court Case, Eastern District of Texas, Marshall Division, No. 2:20-cv-00193-JRG, 43 pages.
Exhibit 6: U.S. Pat. No. 8,392,821 (DeMarco) in U.S. District Court Case, Eastern District of Texas, Marshall Division, No. 2:20-cv-00193-JRG, 42 pages.
Exhibit 7: U.S. Publication No. 2013/0004138 (Kilar) in U.S. District Court Case, Eastern District of Texas, Marshall Division, No. 2:20-cv-00193-JRG, 44 pages.
Exhibit 8: U.S. Publication No. 2010/0037149 (Heath) in U.S. District Court Case, Eastern District of Texas, Marshall Division, No. 2:20-cv-00193-JRG, 50 pages.
Exhibit 9: U.S. Publication No. 2009/0210779 (Badoiu) in U.S. District Court Case No. 2:20-cv-00193-JRG, 39 pages.
Exhibit 10: Wellcomemat System in U.S. District Court Case, Eastern District of Texas, Marshall Division, No. 2:20-cv-00193-JRG, 67 pages.
Exhibit 11: Youtube System in U.S. District Court Case, Eastern District of Texas, Marshall Division, No. 2:20-cv-00193-JRG, 50 pages.
Exhibit 12: Viddler System in U.S. District Court Case, Eastern District of Texas, Marshall Division, No. 2:20-cv-00193-JRG, 24 pages.
Exhibit 13: Obviousness Chart in U.S. District Court Case, Eastern District of Texas, Marshall Division, No. 2:20-cv-00193-JRG, 116 pages.

* cited by examiner

SYSTEM AND METHODS FOR PROVIDING USER GENERATED VIDEO REVIEWS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to content sharing, and more specifically, to providing user generated or produced video reviews of products and/or services.

Description of the Related Art

The broad accessibility of internet, along with the increasing popularity of affordable digital video recording devices has led to the proliferation of user generated videos shared over the internet. There is now an opportunity to leverage the popularity of user generated videos into a convenient, efficient, and entertaining method for dissemination of information regarding consumer goods and services.

U.S. patent application Ser. No. 12/494,425 discloses a computer system that hosts a web site allowing users via the Internet to post video clips, view video clips, or provide feedback regarding a viewed video clip, wherein the computer system selects the most popular video clips based on certain criteria to make available to a video service provider. In one embodiment, the computer system transcodes the video clip received at the web site into a format compatible with a VOD system associated with a cable service provider, and generates the appropriate metadata based on input from the user posting the video clip based in part on values determined by the computer system and based in part on default values determined by an administrator. Subscribers to a cable service provider can then select and view the video clips in the VOD system by invoking a VOD service offered by the cable service provider.

U.S. patent application Ser. No. 11/950,158 discloses a method for use in providing content that includes hosting a network site on a computer network, displaying on the network site links to one or more videos, and displaying on the network site at least an on-demand preview of a first video in response to a corresponding one of the links being selected. A storage medium stores a computer program for use on a client computer.

None of these disclosures, either individually or in combination, discloses the features of the present invention as claimed.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As referred to herein, the term "product" refers to an item sold to and used by a consumer. Embodiments described herein may be utilized with respect to services sold to a consumer, and it is to be understood that for all instances of the term "product," whether or not the term "service" appears with such instances of the term "product," the description below applies to products and services, and may be referred to collectively as "consumable items." One or more embodiments described herein provide for a user generated video review platform. In certain example embodiments, methods are embodied in software and distributed among various devices in the client-server relationship existing between a website server that handles multiple clients using various client devices. In an example aspect, certain embodiments provide a method for obtaining and publishing user generated video product reviews by receiving a user generated video review, where the user generated video review comprises audio and video data featuring a reviewed product.

A video review (which may be in the form of a single item of video content, such as a single video file) may optionally include reviews of multiple items. The item reviews may be sequentially included in the video review file. For example, if a user goes on a shopping trip, the user may then review each item purchased (or a subset thereof) in a single video. A given item review within the video review file may be time stamped by the user via a user interface, the time stamp indicating at what point in time in the video review file the review of the given item begins/occurs. Other techniques may be used to identify the location/position of a given item review within a video review. For example, a frame number may be identified as the point at which the item review for the given item begins. A control may be provided to the user at the same time the video review is displayed, where the user can activate the control to indicate the start of an item review and/or to add tags associated with the item review. Optionally, the user is provided the option of uploading an image of the product before or after they have tagged the item. This image may optionally then be displayed in a scrubber area when the review is displayed to a user. Optionally, the tag and/or a user interface is provided via which the user can indicate which frame within the item review is to be used to represent the item review in future search results or the like.

An image from a given item review may be displayed in a scrubber area (e.g., an area including a scrubber bar or other control that a user can utilize (e.g., by dragging a scrubber control in a scrubber timeline) to indicate where the user wants the video playback to begin or to browse frames in the video, and optionally including an area adjacent to the scrubber bar). Thus, for example, the scrubber area may display images of items being reviewed in the video review file, where a given item image is displayed in the scrubber timeline at a location corresponding to where the review of the respective item begins. The item image may be a frame from the review of the item, such as, by way of example, the first frame from the review of the item. Optionally, other frames from a given item review are not presented in the timeline when the scrubber is static, in that the scrubber control is not being manipulated by the user or otherwise in motion.

An item tag associated with the reviewed item may be received from the user posting the video review or a user viewing the video review. The item tag may be descriptive of the reviewed item (e.g., the tag may be an item name, a brand name associated with the item, a functional/descriptive name, etc.). One or more user-assigned or other tags may be associated with the start of an item review. Optionally, an interface may be provided via which the user can upload still images in association with the review, such as a still image of the item being reviewed. Optionally, the still image of the item image may be a photograph of the item, optionally uploaded separately from the corresponding video review. Optionally, the interface may enable users to provide one or more links to photographs or other images of the item from other sites (e.g., other websites) to provide the image.

Optionally, the user generated video review is approved (e.g., automatically by a posting system and/or manually by an administrator) if a set of criteria is met. The user generated video review is published (e.g., on an online video sharing networked site, an on line media property, a blog, a social networking site, in an advertisement, etc.). An incentive is optionally distributed to the user associated with the user generated video review.

A rich source of content for products and services reviews may be aggregated from users having adding to the collective of reviews, optionally motivated by an incentive, such as a payment, credit, discount, etc. Storage of the user generated video review can be facilitated through central or distributed databases, or by use of removable recording media or transmission to a user's client device, such as a laptop or smart phone or any device capable of receiving and storing audio and video items received from a connected network or a localized transmitter in the case of removable media. Product reviews may be generated in stores and other public places, some without connectivity to a network so a user may manage his or her product review from a portable client device as the user moves between locations where the subjects of video reviews are found.

Certain embodiments optionally provide a polling feature enabling a user seeking product information to poll/ask members of a group selected by the user (e.g., friends or contacts from a social networking site, contacts from a contact database, etc.) their opinions about the product or service reviewed in a video review (where the review may have been generated by the user or a third party). For example, the group may be polled by asking the group members one or more questions to determine the groups' views on the product or service, and the polling results are communicated to a user. For example, as the members of the group watch the video review sent to them or referenced by the user, the individual members may submit ratings, submit textual, audio and or video feedback or select opinions about different aspects of the subject of the review, to indicate their opinions regarding the item.

Certain embodiments provide an interface between a user and computer, wherein a user seeking product information is provided a control via which the user can submit a review. The control may be provided in conjunction with a display control showing a camera view as seen from a client-side camera, such as found on client devices such as a laptop, smart phone, or other suitable client device, such as a camera equipped kiosk. By showing the user what a device camera is capturing (and optionally playing audio captured by a device microphone), and providing the "submit a review" control (e.g., a displayed button, sometimes referred to as a "record a review" control), the user is informed that a product review recording session controlled by him or her is about to start once they select the control. By selecting the control, the user begins execution of a set of computer instructions that record a user-submitted review as directed by the user's interaction. While recording the review, a similar control in appearance, having an indication to stop recording video and audio, thus terminating the recording of the user generated review, is presented to the user during recording of the review. When the user selects the stop control, the recorded review is presented to the user for review, and the user then may re-record the product review or submit it as a user-submitted review. The user-submitted review may also be handled as other product reviews, and either transmitted across a computer network to a database, or stored locally on a client device. Once the review is uploaded to a video sharing system (or before the video is uploaded), the user is presented with an interface via which the use can tag each item reviewed, optionally in association with an indication as to where the product review begins.

Thus, certain embodiments enable a user to record, upload, and/or link to a review video that pertains to the item that was being viewed by the user, another item reviewed in the video review, and/or create a new review video of items unrelated to what was reviewed in the video the user viewed.

Some or all of the functionality described herein may be provided via a video player which may be installed on or linked to a variety of documents, such as webpages hosted on different web servers. For example, the player may be linked to, accessed via an application programming interface (API), and/or displayed embedded within editorial content (e.g., third party editorial content), within advertisements (e.g., optionally including banner advertisements, pre and/or post roll in a video), or elsewhere.

An example aspect provides a system for distribution of video reviews, comprising: at least one processing device; non-transitory memory storing programmatic code that when executed by the at least one processing device, cause the system to perform operations comprising: providing for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. Optionally, at least partly in response to an indication from the first user that the user wants to record a second video review for at least the first item, enabling the first user to record the second video review for the first item, enabling the first user to provide textual descriptive information regarding the second video review for the first item and/or automatically identifying textual descriptive information regarding the second video review based at least in part image recognition performed with respect to at least a portion of one image associated with or included in the second video review, storing the textual descriptive information regarding the second video review for the first item in association with the second video review.

Optionally, a third user may be enabled to access the second video review for the first item via at least one advertisement. Optionally, the first user may be enabled to record a review regarding a second item different than the first item via a control provided in association with the video player. Optionally, at least one user is enabled to record a video review regarding a second item different than the first item via a control provided in association with the video player, a user interface is be provided for display on the terminal of the at least one user, the user interface including one or more fields configured to receive item detail information regarding the second item and/or automatically identifying textual descriptive information regarding the second item based at least in part image recognition performed with respect to at least a portion of one image associated with or included in the second item video review, the item detail information regarding the second item in association with the video review regarding the second item is stored, and the video review regarding the second item and at least a portion of the item detail information regarding the second item is provided to display to a plurality of users.

Optionally, the operations further comprise accessing metadata associated with the first consumer provided review, and associating at least a portion of the accessed metadata with the second video review. Optionally, the video player is configured to display in a scrubber area a plurality of representative images selected by a given reviewer, the plurality of representative images corresponding to respective item reviews included in a given video review. Optionally, the video player is configured to display in a scrubber area a plurality of representative images selected by a respective plurality of reviewers, the plurality of representative images corresponding to respective item reviews included in a given video review.

Optionally, the operations further comprise: receiving information scanned from an optical code or a radio frequency tag associated with at least one item included in a corresponding video review; populating one or more detail information fields associated with the corresponding video review based at least in part on the received information scanned from the optical code or the radio frequency tag.

Optionally, the operations further comprise: receiving an indication that a third user is at a first physical location based at least in part on information provided by a mobile device of the third user; identifying one or more merchants in a vicinity of the third user's first physical location; identifying one or more video reviews for one or more items offered by the identified one or more merchants in a vicinity of the third user's first physical location; providing the third user with access to one or more of the identified video reviews for the one or more items offered by the identified one or more merchants in the vicinity of the user's first physical location; and transmitting information regarding one or more of the identified merchants to the mobile device of the third user. Optionally, identifying one or more video reviews for one or more items offered by the identified one or more merchants in the vicinity of the third user's first physical location is based at least in part on an interest expressed by the third user in at least one item and/or demographic information associated with the third user.

Optionally, the operations further comprise enabling, via an application hosted on the mobile device, the third user to record and tag a review of at least one item in a merchant establishment.

Optionally, the operations further comprise: providing for display on a user terminal of a third user a user interface configured to enable the third user to provide a first video review for upload to the system or a link to the first video review; enabling the third user to specify a representative image corresponding to the first video review; enabling the third user to provide a title for the first video review; enabling the third user to identify representative frames for a plurality of respective item reviews included in the first video review; enabling the third user to provide textual detail information for respective item reviews in the first video review; storing: the first video review; the specification of the representative image corresponding to the first video review; the title for the first video review; the identification of the respective representative frames for the respective plurality of item reviews included in the first video review; the textual detail information for the respective item reviews in the first video review; and enabling the first video review to be viewed via at least one video player, the at least one video player configured to display: the representative image corresponding to the first video review; the title for the first video review; the respective representative frames for the respective plurality of item reviews in a scrubber area; and the textual detail information for the respective item reviews in the first video review.

Optionally, the video player is configured to: detect when a first video review includes a first plurality of item reviews; access comments provided by users with respect to the first plurality of item reviews included in the first video review; determine which item review in the first plurality of item reviews in the first video review is currently being provided for display via the video player; cause the respective comments, for the item review determined to being currently provided for display via the video player, to be displayed in a comments area, wherein comments for the items reviews in the first video review not currently provided for display via the video player are not displayed.

Optionally, the operations further comprise: selecting an advertisement to be displayed as an interstitial advertisement between two item reviews; causing at least in part the selected advertisement to be displayed as an interstitial advertisement between two item reviews. Optionally, the operations further comprise: receiving a video review search query from a second user; identifying, from a plurality of video reviews, a subset of video reviews, including the second video review, corresponding to the search query based at least in part on respective textual detail information associated with item reviews included in the subset of video reviews; providing for display on a terminal of the second user search results including entries corresponding to at least a portion of the subset of video reviews, the portion including at least the second video review, wherein the search result entry for the second video review includes at least a first representative image for an item review included in the first video review that corresponds to the search query; at least partly in response to receiving a selection by the second user of the second video review entry in the search results, causing the item review, in the second video review, that corresponds to the search query to be played back to the second user via a video player without first playing back an initial item review in the second video review that does not correspond to the search query.

An example aspect provides non-transitory memory storing programmatic code that when executed by a computing system including at least one processing device, causes the computing system to perform operations comprising: providing for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. The operations may further comprise, at least partly in response to an indication from the first user that the user wants to record a second video review for at least the first item, enabling the first user to record the second video review for the first item, enabling the first user to provide textual descriptive information regarding the second video review for the first item and/or automatically identifying textual descriptive information regarding the second video review based at least in part image recognition performed with respect to at least a portion of one image associated with or included in the second video review; and/or storing the textual descriptive information regarding the second video review for the first item in association with the second video review.

An example aspect provides a method, comprising: providing, via a content distribution system, for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. At least partly in response to an indication from the first user that the user wants to record a second video review for at least the first item, enabling by the content distribution system: the first user to record the second video review for the first item; the first user to provide textual descriptive information regarding the second video review for the first item and/or automatically identifying textual descriptive information regarding the second video review based at least in part image recognition performed with respect to at least a portion of one image associated with or included in the second video review; storing the textual descriptive information regarding the second video review for the first item in association with the second video review.

An example aspect provides a system for distribution of video reviews, comprising: at least one processing device; non-transitory memory storing programmatic code that when executed by the at least one processing device, cause the system to perform operations comprising: providing for display on a user terminal of a first user a user interface configured to enable the first user to provide a first video review for upload to the system or a link to the first video review; enabling the user to specify a representative image corresponding to the first video review; enabling the user to provide a title for the first video review; enabling the user to identify initial frames for a plurality of respective item reviews included in the first video review; and/or enabling the user to provide textual detail information for respective item reviews in the first video review. The operations optionally further comprising storing the first video review, the specification of the representative image corresponding to the first video review, the title for the first video review, the identification of the respective initial frames for the respective plurality of item reviews included in the first video review, and/or the textual detail information for the respective item reviews in the first video review. The operations optionally further comprise receiving a video review search query from a second user, identifying, from a plurality of video reviews, a subset of video reviews, including the first video review, corresponding to the search query based at least in part on respective textual detail information associated with item reviews included in the subset of video reviews, providing for display on a terminal of the second user search results including entries corresponding to at least a portion of the subset of video reviews, the portion including at least the first video review, wherein the search result entry for the first video review includes at least a first representative image for an item review included in the first video review that corresponds to the search query. The operations further optionally comprise at least partly in response to receiving a selection by the second user of the first video review entry in the search results, causing the item review, in the first video review, that corresponds to the search query to be played back to the second user via a video player without first playing back an initial item review in the first video review that does not correspond to the search query.

An example aspect provides a system for distribution of video reviews, comprising: at least one processing device; non-transitory memory storing programmatic code that when executed by the at least one processing device, cause the system to perform operations comprising: providing for display on a user terminal of a first user a user interface configured to enable the first user to provide a first video review for upload to the system or a link to the first video review; enabling the user to specify a representative image corresponding to the first video review; enabling the user to provide a title for the first video review; enabling the user to identify initial frames for a plurality of respective item reviews included in the first video review; and/or enabling the user to provide textual detail information for respective item reviews in the first video review. The operations optionally further comprising storing the first video review, the specification of the representative image corresponding to the first video review, the title for the first video review, the identification of the respective initial frames for the respective plurality of item reviews included in the first video review, and/or the textual detail information for the respective item reviews in the first video review. Optionally, the video player is configured to display in a scrubber area a plurality of representative images selected by a given reviewer, the plurality of representative images corresponding to item reviews included in a given video review, wherein at least partly in response to a selection of a given image displayed in the scrubber area by second user, the video player plays back the corresponding item review.

An example system and method perform acts and operations comprising: receiving an indication that a user is at a first physical location based at least in part on information provided by a mobile device of the user; identifying one or more merchants in a vicinity of the user's first physical location; identifying one or more video reviews for one or more items offered by the identified one or more merchants in a vicinity of the user's first physical location; providing the user with access to one or more of the identified video reviews for the one or more items offered by the identified one or more merchants in the vicinity of the user's first physical location; and transmitting information regarding one or more of the identified merchants to the mobile device of the user. Optionally, identifying one or more video reviews for one or more items offered by the identified one or more merchants in the vicinity of the third user's first physical location is based at least in part on an interest expressed by the third user in at least one item and/or demographic information associated with the third user.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF PREFERRED EMBODIMENTS

A review platform for consumable items such as products and services (sometimes generally referred to as "items") will now be described. In the following exemplary description numerous specific details are set forth in order to provide a more thorough understanding of example embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention.

Figure 1:
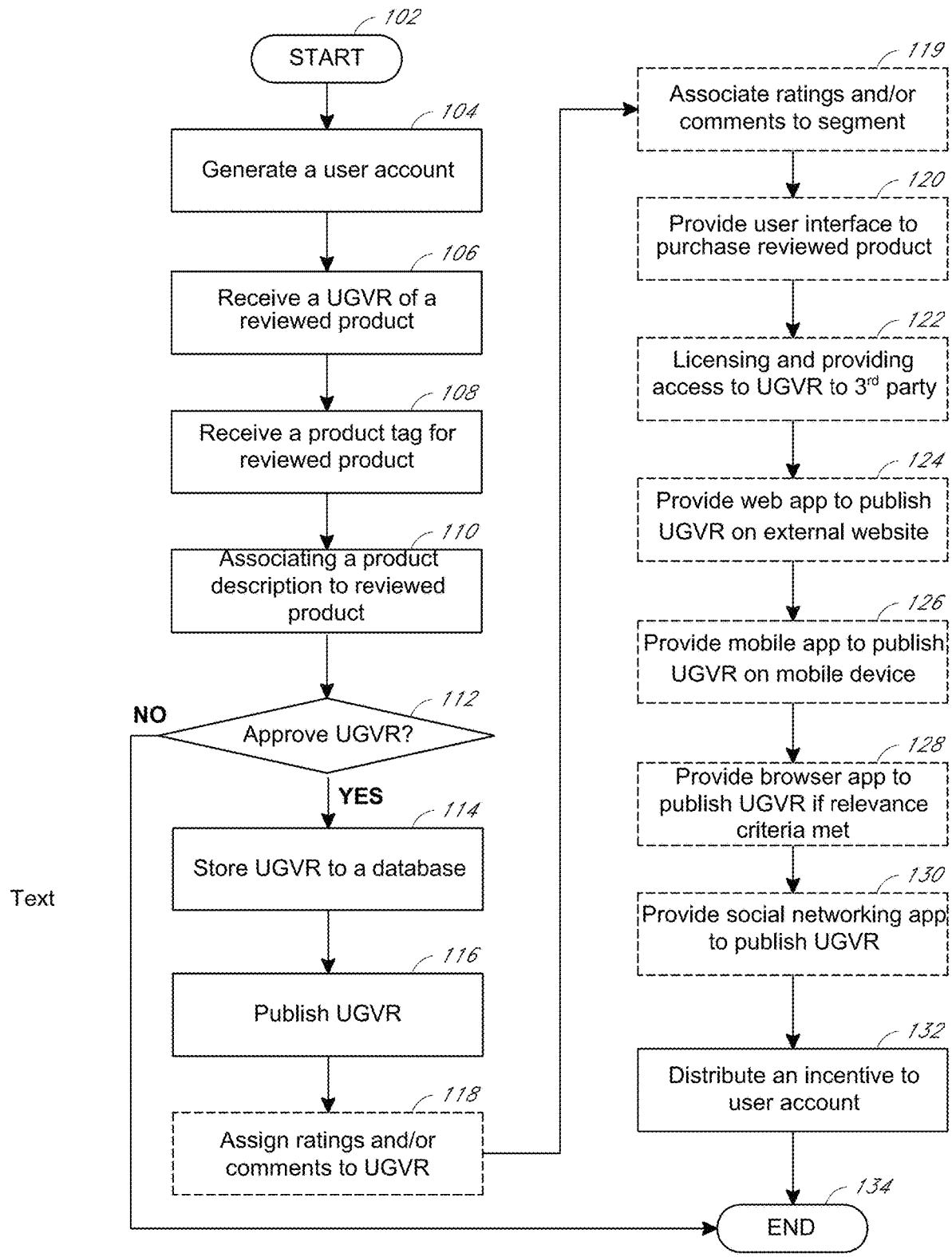
FIG. 1 illustrates a flowchart of an exemplary method in accordance with the system and methods for providing user generated user reviews described herein.

FIG. 1 illustrates a flowchart of an exemplary method in accordance with the system and methods for providing user generated user reviews described herein. A user account is generated at step 104. The user account may be generated for use on a host networked location (e.g., a website) by a registered user. The host networked location (which in this example is in the form of a website) may be addressed to a unique domain name or other network resource locator, and be publically accessible by desktop computers, mobile computers, tablet computers, and mobile phones with a wired or wireless internet network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and other information. The user account may be one of thousands or millions of user accounts generated for use on the host website. To confirm the identity of the registered user for subsequent access of the host website, the registered user is prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account or log-in via other authentication methods such as Open Authentication (OAuth) or any other suitable authentication method.

Figure 3:
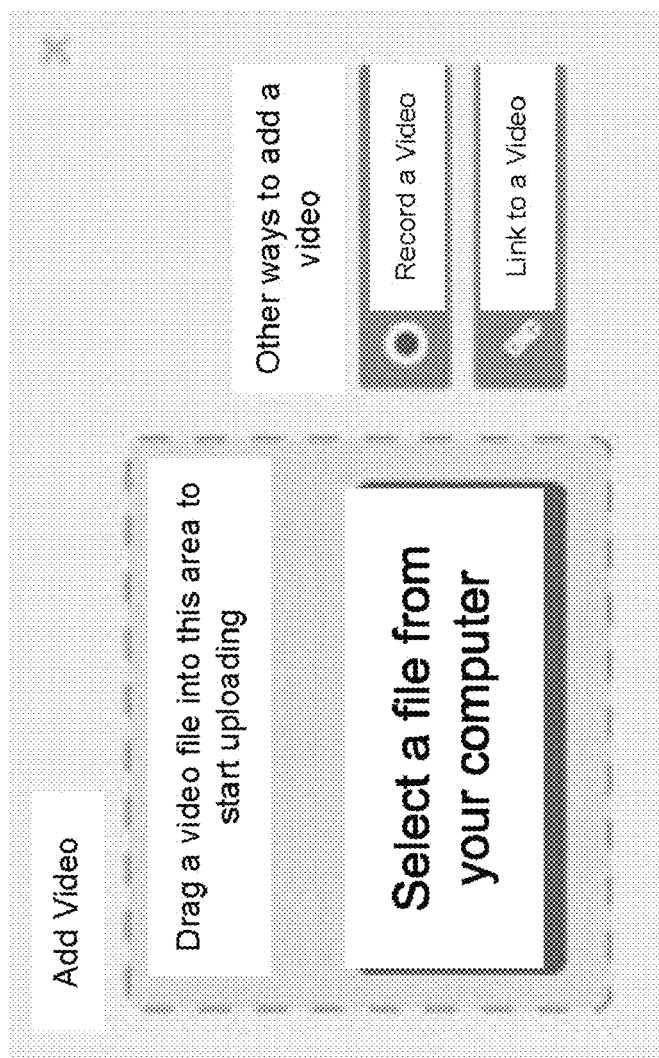
FIG. 3 illustrates an exemplary screenshot of sending or uploading a user generated video review in accordance with the system and methods for providing user generated user reviews described herein.
Figure 4:
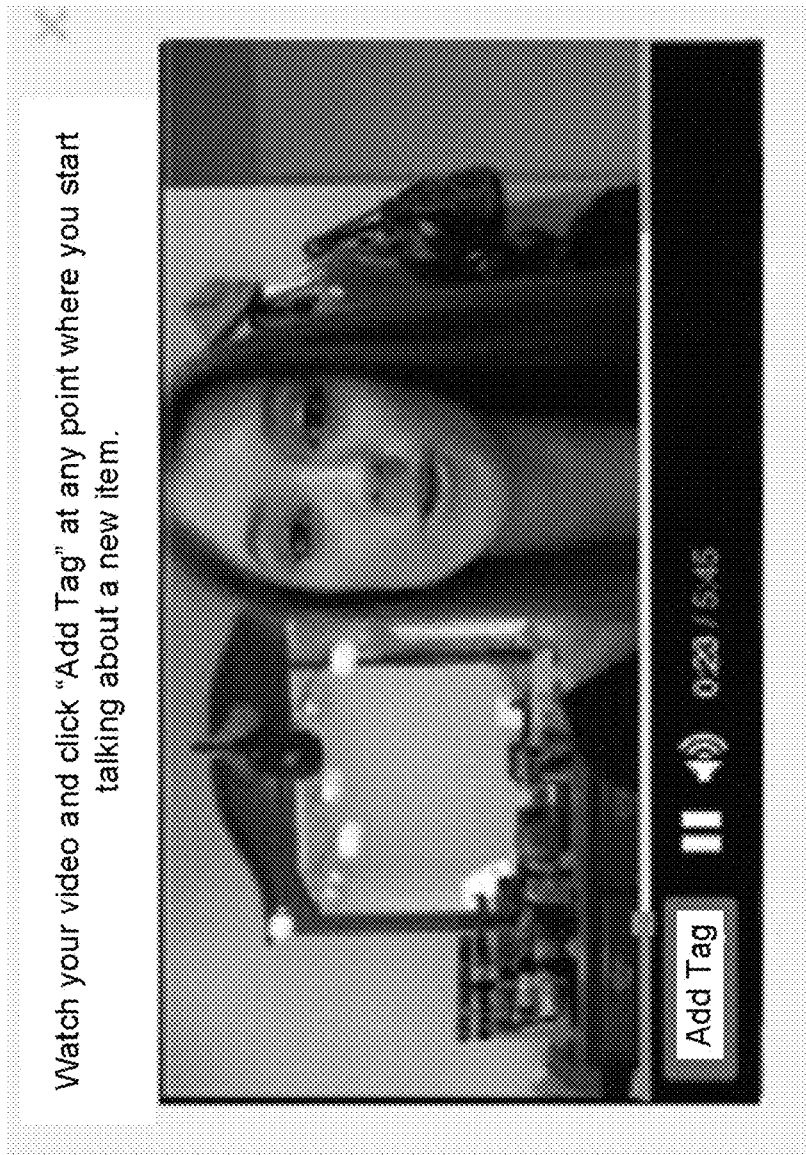
FIG. 4 illustrates an exemplary screenshot of creating a product tag in accordance with the system and methods for providing user generated user reviews described herein.
Figure 5:
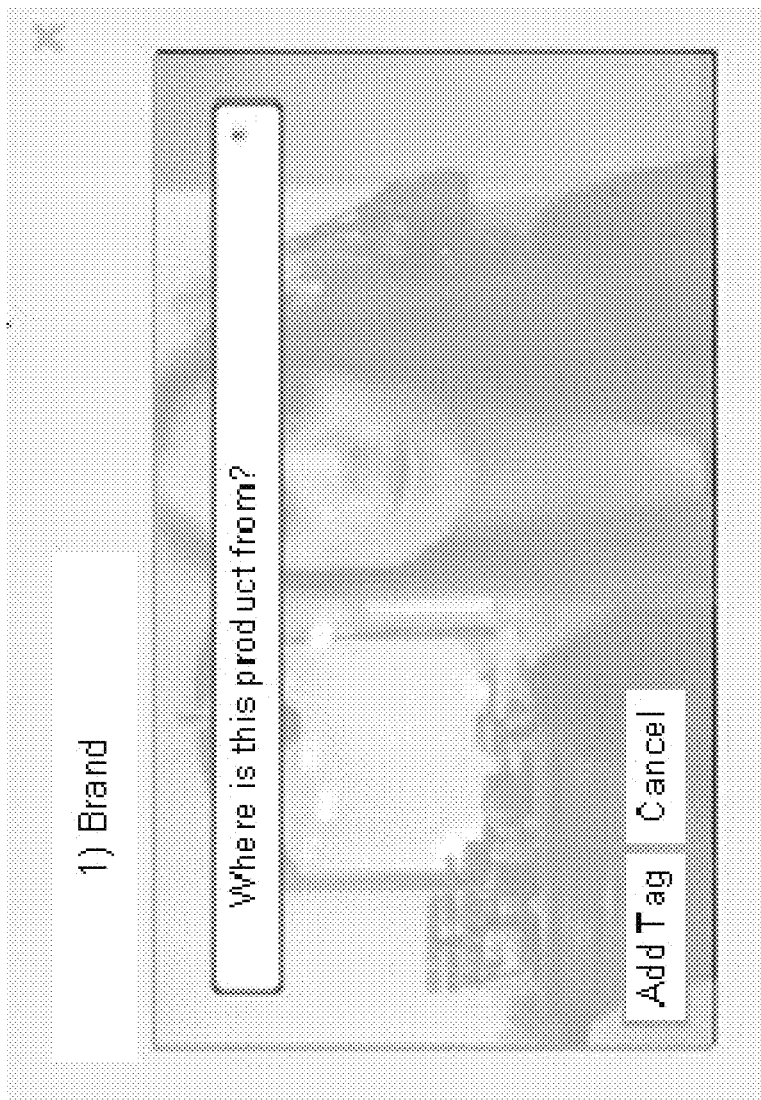
FIG. 5 illustrates an exemplary screenshot of creating a product tag in accordance with the system and methods for providing user generated user reviews described herein.
Figure 6:
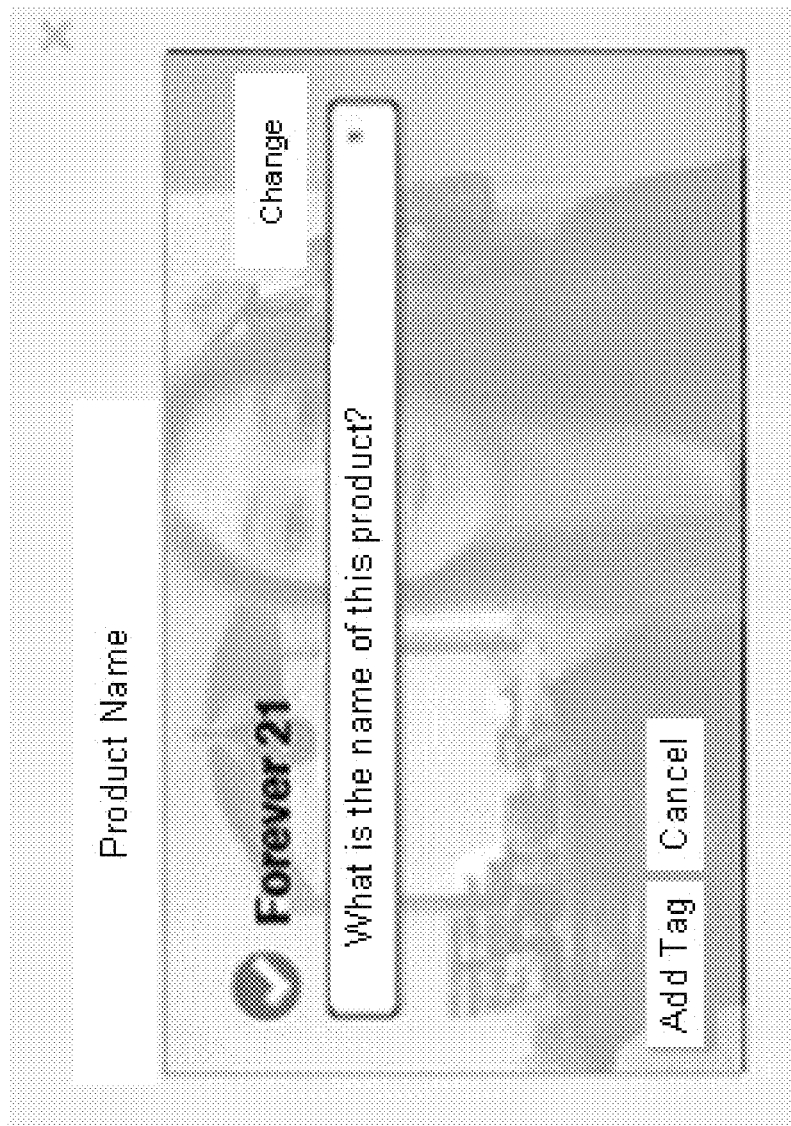
FIG. 6 illustrates an exemplary screenshot of creating a product tag in accordance with the system and methods for providing user generated user reviews described herein.
Figure 7:
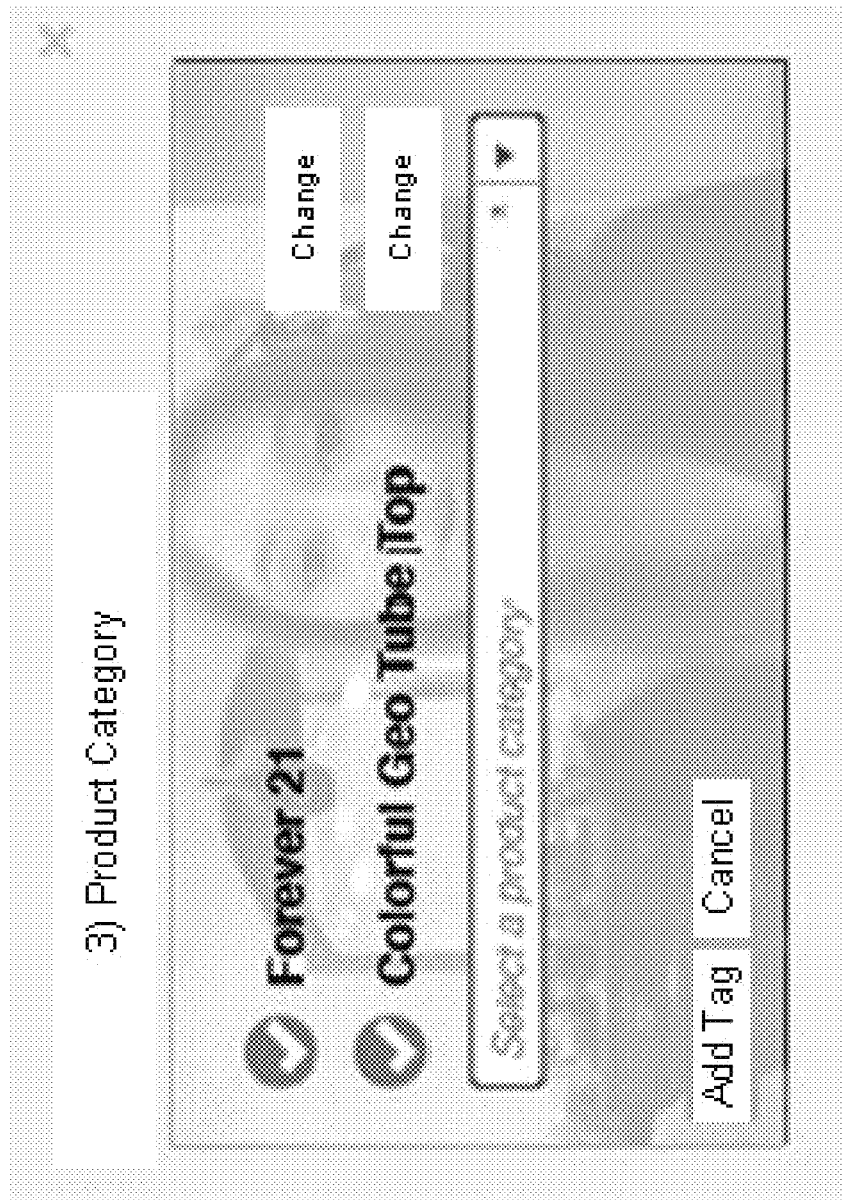
FIG. 7 illustrates an exemplary screenshot of creating a product tag in accordance with the system and methods for providing user generated user reviews described herein.
Figure 8:
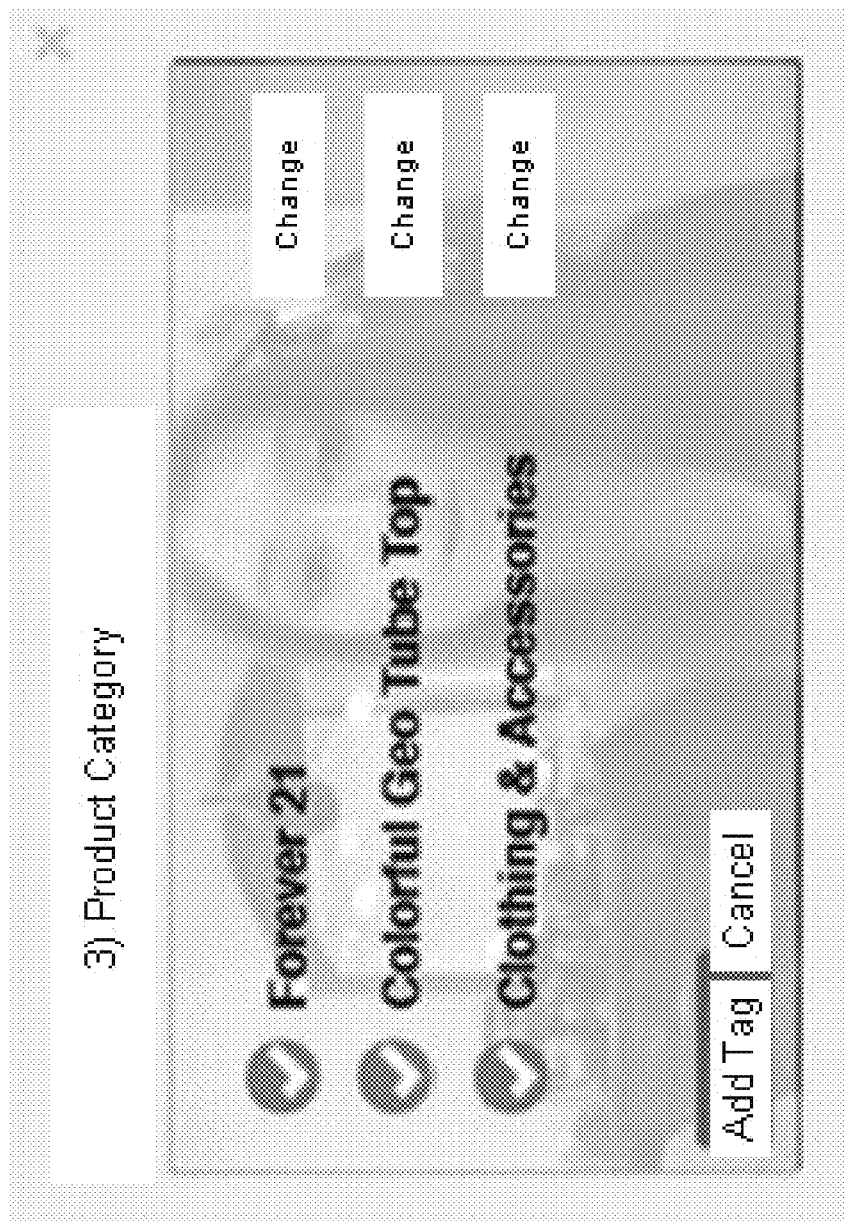
FIG. 8 illustrates an exemplary screenshot of creating a product tag in accordance with the system and methods for providing user generated user reviews described herein.

In some embodiments, once the registered user has a successful log-in into the user account, the registered user may send a user generated video review (UGVR) to be received by the host website at step 106. FIG. 3 illustrates an exemplary user interface enabling a user to select a user generated video review to upload (e.g., by dragging a video file to the user interface, by selecting a file via browse control, or otherwise), to record a user generated video review, or to link to a user generated video review or to otherwise provide a user generated video review in accordance with the system and methods for providing user generated user reviews described herein. The user generated video review comprises audio and video data which may be sent from a terminal, such as a desktop computer or a mobile device. The mobile device may be a notebook computer, tablet computer, mobile phone, or any portable electronic device able to communicate with the host website. The user generated video review may provide useful information about a reviewed product to a viewer of the user generated video review. The viewer of the user generated video review may be a potential costumer for the reviewed product featured in the user generated video review.

A user generated video review that features a reviewed product may include useful information to a potential costumer such as a demonstration of the unpacking of the product, visual views of the product from different angles and distances, visual and audio demonstrations of uses or functionality, and spoken descriptions of the reviewed product. As an example, the user generated video review featuring a new mobile phone may begin with the registered user unboxing a newly purchased mobile phone, assembling the mobile phone, turning the mobile phone around in the hands, turning the mobile phone on, and using a few of the mobile phone's functions. At the same time, the registered user may speak of facts and opinions on the packaging, visual appearance, and usefulness of the features of the mobile phone.

As noted above, the registered user may choose to upload a video file, record a video, or link a video of the user generated video review to be received by the host website using, for example, the interface illustrated in FIG. 3. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a new video instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be in a raw or compressed format.

The registered user may link a video as another option. The registered user may specify a network-accessible location of a preexisting video of the user generated video review. The preexisting video may be located on any network-accessible location such as an external website, an ftp server, or an online database. The host website finds the user generated video review based on the network-accessible location specified by the registered user.

In some embodiments, the user generated video review is recorded at and/or received from an interactive kiosk. The interactive kiosk may be located in a shopping center or retail store. The interactive kiosk may be a station equipped with a video camera and/or recorder, a user interface configured to receive user inputs (e.g., tag information, a review title, a still image, and/or other information discussed herein), and a network connection (e.g., to the Internet). Optionally, a scanner is provided (e.g., an optical and/or RF scanner) configured to scan information encoded on an item tag (e.g., a 2D or 3D barcode, or an RFID tag). Some or all of the scanned information (e.g., a product name, brand, module identifier, color, price, etc.) may be used to automatically populate tags associated with a review. A shopper may carry a store item to the kiosk in a shopping center or retail store and substantially immediately create and send a user generated video review of the item obtained at the store or shopping center. In addition or instead, the user generated video review may be created and submitted via a mobile device of the user.

The host website receives and stores a product tag associated with the reviewed product at step 108. The product tag may be stored in association with the corresponding video review. The product tag may be created by the registered user as words or phrases which describer (e.g., accurately describe) the reviewed product and/or their feelings regarding the reviewed product. FIGS. 4-8 illustrate exemplary user interfaces utilized in creating a product tag in accordance with the system and methods for providing user generated user reviews described herein. The product tag may include words or phrases identifying brand, model, size, color, visual traits, functional specifications, uses, and other descriptive text. The user may upload photos or find links to pictures of the tagged product. These product images are optionally associated with the aforementioned tags and in turn displayed during video playback. The product images can be displayed as part of the video playback scrubber and/or embedded into the video itself. For example, the product images can appear as part of the video playback scrubber as the video proceeds, and change during playback as different products are discussed, or entirely new/different product images can be shown as needed to support the review.

In some embodiments, the product tag may be received by obtaining labeling data, such as barcode data scanned from a barcode or RFID data scanned from an RIFD tag, and executing a product tag search to identify a product tag based, at least in part, on the labeling data. The barcode data may be extracted by scanning a barcode label affixed to a product, a product package, or a shelf on which the product is stored. Scanning refers to any method of extracting encoded data such as RFID data from a RFID tag using a RFID reader, or barcode data from a barcode label, including but not limited to using a pen-type reader, laser scanner, or a camera from a mobile device. Barcode data may be a partial or full image, number or other identifying data. The product tag search may be executed by a mobile device or by the host website.

The product tag is used to associate a product description to the reviewed product at step 110. In some embodiments, the product description contains text describing brand, model, size, color, visual traits, functional specifications, uses, and other descriptive information. The text may be obtained from the registered user, individuals experienced with the reviewed product, viewers of the user's review, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

In some embodiments, the user generated video review features at least one additional reviewed product, where each reviewed product associates with a different video segment in the user generated video review. In these embodiments, the user generated video review includes a plurality of video segments. Each video segment individually associates with a reviewed product which is associated with a product tag. The registered user individually creates a product tag and defines a video segment to associate with each reviewed product.

In some embodiments, each reviewed product in the user generated user review is additionally associated with a tagged portion of a display area of the user generated video review. The display area of the user generated video review is an area of a user interface containing dimensions of the video of the video generated video review. The tagged portion of the display area contains dimensions of the visual representation of each reviewed product. The tagged portion of the display area associated with the reviewed product may change in size and location during the video segment associated with the reviewed product.

In one or more embodiments, the user generated video review may be edited by the registered user on the host website. Editing refers to any method of altering the user generated video review, including but not limited to shortening the length of the user generated video review by removing selected segments or altering the brightness, contrast, or colors of the user generated video review. Editing also includes amending or changing tags associated with the video review.

Optionally, the user generated video needs to be automatically and/or manually approved prior to posting. For example, the user generated video review is approved if a set of criteria are met at step 112. The set of criteria may help ensure that the user generated video review is sufficiently useful to a viewer. Criterion may include suitability of product tags, length, visual quality, audio quality, clarity of speech, usefulness of review, identity of said reviewed product, or identity of said user account. For example, the preexisting video file may be limited to a file size of 5 megabytes to 500 megabytes and the length of video may be limited to 15 seconds to 15 minutes in order for the video to be posted. Limiting the size and length of the user generated video review has a useful effect of eliminating preexisting video files which likely do not contain enough desirable content or contains too much undesirable content. In another example, visual quality may be enforced by not approving videos with a resolution below a specified level, such as below 640×480 pixels or 480p. The approval process for the user generated video review may be manual or may be partially or fully automated by a software algorithm. A user generated review that is not approved will not be published on the host website at step 134.

The user generated video review is stored to a database comprising a plurality of user generated video reviews at step 114. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website. The user generated video review may be stored on database for an indefinite period of time until a decision is made to delete the user generated video review. In some cases, the user generated user review will be deleted from the database based on date of creation, the existence of newer user generated video reviews featuring the same reviewed product, video rating, or user account rating. As an example, a user generated video review that is over a year old, have fewer than 10 views in 6 months, or have a video rating below a certain threshold. The database may store multiple copies of the user generated video review in multiple computer storage mediums. This forms a backup enabled system so that the user generated video review will not be lost in the event a computer storage medium fails.

The user generated video review is published at step 116. In some embodiments, the user generated video review is made available to all viewers of the host website and the user generated video review may be found and viewed by any viewer without a log-in process. This enables the host website to provide a plurality of user generated video reviews as a free service to the public. In another embodiment, the user generated video review is made available to only a set of viewers and may only be viewed by viewers who have completed a log-in process.

The host website may implement an interface to enable a viewer to find user generated video reviews pertaining to the viewer's interest from the plurality of user generated video reviews available on the database. One such interface may be a search tool which enables a viewer to enter a word or phrase describing a brand, model, size, color, visual traits, functional specifications, uses, or another characteristic of a reviewed product. With a software algorithm, the search tool attempts to find at least one user generated video review that features a relevant reviewed product based on the word or phrase entered (e.g., by matching one or more query terms with video review tags). If the software algorithm finds more than one relevant user generated video review result, the software algorithm may sort the results according to a relevance criterion such as date of creation of the user generated video review result. In the embodiments where the user generated video review features a plurality of reviewed products and each reviewed product associates with a different video segment, the search tool will additionally find the relevant video segment.

Another interface enables the viewer to find a user generated video review by selecting a main category of reviewed products then navigating through at least one subcategory. A user generated video review, or a video segment in a user generated video reviews which feature a plurality of reviewed products, may be organized into categories and subcategories based on brand, model, size, color, visual traits, functional specifications, uses, or another characteristic of the reviewed product.

In some embodiments, a video rating may be associated with the user generated video review based on a collection of input from viewers of the user generated video review at step 118. A user account rating may then be assigned to the user account based on the video ratings of each of the user generated video reviews received from the user account. In some embodiments, the video rating or the user account rating have an effect on the incentive distributed to the user account.

In some embodiments, a segment rating may be individually associated with each video segment featuring each reviewed product in the user generated video review at step 119. The segment rating is based on a collection of input from viewers of the video segment. User generated comments may also be individually associated with each video segment featuring each reviewed product in the user generated video review at step 119. In embodiments, the number of comments made during a particular review is shown to a viewer of the review. As discussed in greater detail elsewhere herein, comments may be segmented by respective items presented within a video review.

In some embodiments, a user interface is provided to enable a viewer of a user generated video review to purchase the reviewed product featured in the user generated video review at step 120. The user interface may be a hypertext transfer protocol link that enables the viewer to quickly navigate a browser to an external website to purchase the reviewed product. The user interface may enable the viewer to directly purchase the reviewed product from the host website using common tools of online shopping known in art. The user interface may also provide instructions on methods that the viewer may apply to purchase the reviewed product. In some embodiments, the interface enables the viewer to select the tagged portion of a display area associated with the reviewed product to purchase the reviewed product. A display area of the user generated video review is an area of a display screen containing dimensions of the video of the video generated video review.

In some embodiments, the user generated video review may be licensed to a third party to provide access to the user generated review to the third party at step 122. Licensing access to the user generated video reviews is an effective method of monetizing the value of the plurality of user generated video reviews stored on the database. Third parties include suppliers, retailers, online shopping websites, online informational websites, external databases, mobile device manufacturers, software developers, and other such entities. In some embodiments, the third party may be monetarily charged for each user generated video review accessed. In some other embodiments with a subscription system, the third party may be charged a monthly or yearly fee for access to the video player, related technology and/or a large set of user generated video reviews and/or the third party may share revenues, related to the use of the video player, related technology and/or the user generated reviews, with the subscription system operator. In some embodiments, the video player is an intelligent gathering mechanism for analytics of consumer information, and tracks user behavior, such as what products are purchased on what days and at what time, cart size, products purchased, comments made per product, ratings per product, polling results conducted by the video player, demo information, and the like. The video player may be linked to and/or displayed embedded within editorial content (e.g., third party editorial content), within advertisements (e.g., optionally including banner advertisements, pre and/or post roll in a video), or elsewhere. The video player and/or content may be licensed to third parties, optionally on a revenue sharing basis (e.g., where the provider of the video player and/or content receives revenue from licensee as a result of purchases or advertising revenues received as a result of a user utilizing the video player and/or content) or on a flat fee basis.

Figure 9:
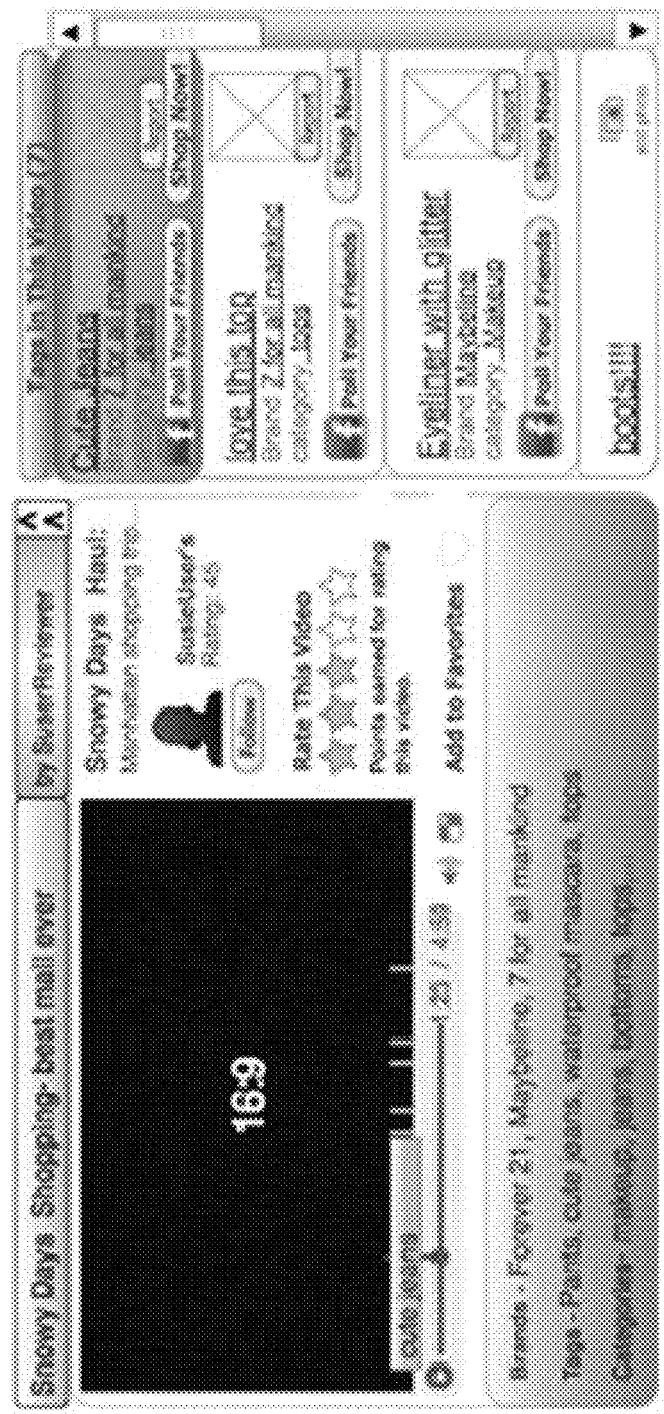
FIG. 9 illustrates an exemplary screenshot of a web application for publishing a user generated video review.

In some embodiments, a web application is provided to publish the user generated video review on an external website at step 124. FIG. 9 illustrates an exemplary user interface of a web application for publishing a user generated video review in accordance with the system and methods for providing user generated user reviews described herein. The web application may be a software program for a video player to be embedded on the external website. An external website containing a web content may use the web application to embed the video player to play a user generated video review featuring a reviewed product that is related to the web content. A user of the external website may view a user generated video review with the web application on the external website.

In some embodiments, a mobile application is provided to publish the user generated video review on a mobile device at step 126.

A user of the mobile device may view a user generated video review embedded within an advertisement or within the webpage itself in-line with website content with the mobile application on the mobile device.

In some embodiments, a browser application is provided to a browser, where the browser application publishes the user generated video review on the browser if a set of relevance criteria are met at step 128. The relevance criteria compares the reviewed product featured in the user generated video review with a content displayed on the browser. An example implementation of this embodiment enables a user performing a search on a search engine in the browser to view a user generated video review featuring a reviewed product related to the search on the search engine.

In some embodiments, a social networking application is provided or accessed, where the social networking application publishes the user generated video review on a social networking website at step 130. A viewer of the user generated video review may use the social networking application to display the user generated video review on a social networking website. Users of the social networking website may then view the user generated video review on the social networking website. In some embodiments, the users of the social networking website may specify whether they "like" or "dislike" the product and/or service reviewed in the user generated video review, or purchase the reviewed product featured in the user generated video review. In an embodiment, the users may specify that they want or own the product or service reviewed. The number of users indicating this desire can also be displayed to the user.

An incentive is optionally distributed to the user account associated with the user generated video review at step 132. The incentive acts as a reward to the registered user for creating an approved user generated review and as a motivation to create more user generated video reviews in the future. Incentives may be distributed based on criteria such as, but not limited to the number of approved user generated reviews received from the user account, the quality of the registered user's user generated video reviews, the number of views for the user generated video review, the ratings given by viewers of the user generated video review, and/or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

Figure 2:
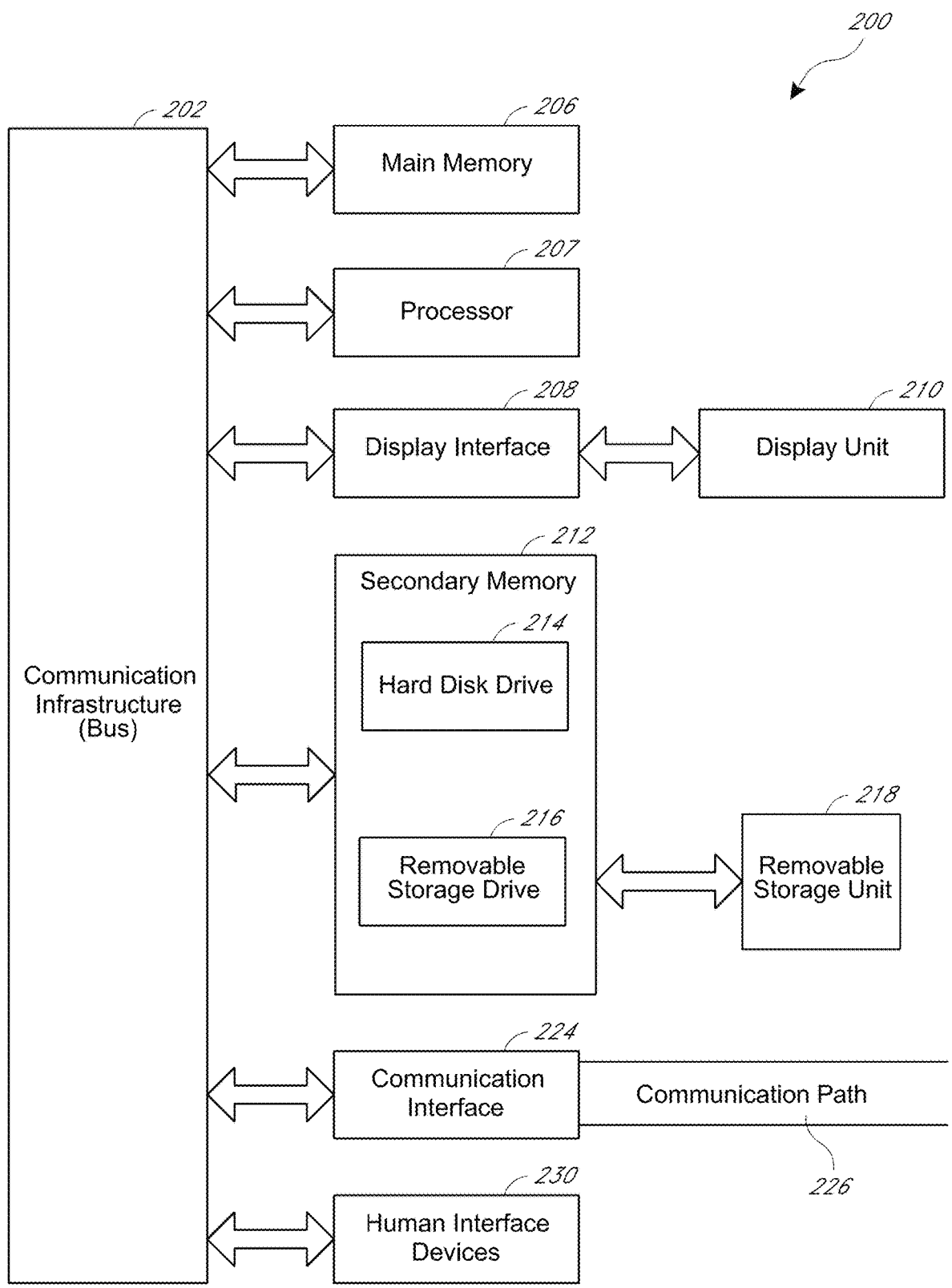
FIG. 2 illustrates a computer system in accordance with the system and methods for providing user generated user reviews described herein.

FIG. 2 illustrates a computer system in accordance with the system and methods for providing user generated user reviews described herein. A general-purpose computer and peripherals, when programmed as described herein, may operate as a specially programmed computer 200 capable of implementing one or more methods, apparatus and/or systems of the solution described in this disclosure. A processor 207 may be coupled to a bi-directional communication infrastructure 202 such as communication infrastructure system 202. The communication infrastructure 202 may generally be a system bus that provides an interface to the other components in the general-purpose computer system such as the processor 207, a main memory 206, a display interface 208, a secondary memory 212, and/or a communication interface 224.

The main memory 206 may provide a computer-readable medium for accessing and executing stored data and applications. The display interface 208 may communicate with a display unit 210 that may be utilized to display outputs to a user of the specially programmed computer 200. The display unit 210 may comprise one or more monitors that may visually depict aspects of the computer program to the user. The main memory 206 and the display interface 108 may be coupled to the communication infrastructure 202, which may serve as the interface point to the secondary memory 212 and the communication interface 224. The secondary memory 212 may provide additional computer-readable medium resources beyond the main memory 206, and may generally function as a storage location for computer-readable instructions to be executed by processor 207. Either fixed or removable computer-readable media may serve as the secondary memory 212. The secondary memory 212 may comprise, for example, a hard disk 214 and a removable storage drive 216 that may have an associated removable storage unit 218. There may be multiple sources of the secondary memory 212 and systems implementing the solutions described in this disclosure may be configured as needed to support the data storage requirements of the user and the methods described herein. Numerous types of data storage devices may serve as repositories for data utilized by the specially programmed computer 200. For example, random access memory, read-only memory, solid-state storage, magnetic storage, optical or magnetic-optical storage, or any other available mass storage technology that provides a repository for digital information may be used.

The communication interface 224 may be coupled to the communication infrastructure 202 and may serve as a conduit for data destined for or received from a communication path 226. A network interface card (NIC) is an example of the type of device that once coupled to the communication infrastructure 202 may provide a mechanism for transporting data to the communication path 226. Computer networks such Local Area Networks (LAN), Wide Area Networks (WAN), Wireless networks, optical networks, distributed networks, the Internet or any combination thereof are some examples of the type of communication paths that may be utilized by the specially programmed computer 200. The communication path 226 may comprise any type of telecommunication network or interconnection fabric that can transport data to and from communication interface 224.

To facilitate user interaction with the specially programmed computer 200, one or more human interface devices (HID) 230 may be provided. Some examples of HIDs that enable users to input commands or data to the specially programmed computer 200 may comprise a keyboard, mouse, touch screen devices, microphones or other audio interface devices, motion sensors or the like, as well as any other device able to accept any kind of human input and in turn communicate that input to processor 207 to trigger one or more responses from the specially programmed computer 200 are within the scope of the system disclosed herein.

While FIG. 2 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 2.

The non-transitory computer-readable medium may store computer-readable instructions. The processor 207 executes the computer-readable instructions to accept a plurality of licensees. Each licensee may be an individual person, a group of persons, or business entities. Licensees may be recruited in-person, over the telephone, or on an Internet website. Licensees may be self-recruited or may be recruited by another entity. Self-recruitment may be accomplished by submitting information on an Internet website. Preferably, licensees will be entities with sales expertise, with knowledge of customer needs, with knowledge of consumer trends, with skill in business development, or with any other similarly desirable quality.

The processor 207 executes the computer-readable instructions to generate a user account. The user account may be generated for use on a host website by a registered user. The host website may be addressed to an unique domain name and be publically accessible by desktop computers, mobile computers, tablets, and mobile phones with a wired or wireless internet network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and/or other information. The user account may be one of thousands or millions of user accounts generated for use on the host website. To confirm the identity of the registered user for subsequent access of the host website, the registered user is optionally prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account.

The processor 207 executes the computer-readable instructions to receive a user generated video review associated with the user account, where the user generated video review features at least one reviewed product. The user generated video review comprises audio and video data which may be sent from a desktop computer or a mobile device. The mobile device may be a notebook computer, tablet computer, mobile phone, or any portable electronic device able to communicate with the host website. The user generated video review should ideally provide useful information about a reviewed product to a viewer of the user generated video review. The viewer of the user generated video review will most typically be a potential costumer for the reviewed product featured in the user generated video review. A user generated video review that features a reviewed product may include useful information to a potential customer such as a demonstration of the unpacking of the product, visual views of the product from different angles and distances, visual and audio demonstrations of uses or functionality, and spoken descriptions of the reviewed product.

The registered user may choose to upload a video file, record a video, or link a video of the user generated video review to be received by a review server supporting the host website. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a video "live" instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be raw or compressed format.

The processor 207 executes the computer-readable instructions to receive a product tag associated with a reviewed product selected from the at least one reviewed product. The product tag may be created by the registered user as words or phrases which accurately describe the reviewed product. The product tag may include words or phrases identifying brand, model, size, color, visual traits, functional specifications, uses, and other descriptive text.

The processor 207 executes the computer-readable instructions to associate a product description to the reviewed product based on the product tag. In some embodiments, the product description contains text describing brand, model, size, color, visual traits, functional specifications, uses, and other descriptive information. The text may be obtained from the registered user, individuals experienced with the reviewed product, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

The processor 207 executes the computer-readable instructions to approve said user generated video review if a set of criteria are met. The set of criteria helps ensure that the user generated video review is sufficiently useful to a viewer. Criterion may include suitability of product tags, length, visual quality, audio quality, clarity of speech, usefulness of review, identity of said reviewed product, or identity of said user account. The approval process for the user generated video review may be manual or may be partially or fully automated by a software algorithm. A user generated review that is not approved will not be published on the host website.

The processor 207 executes the computer-readable instructions to store said user generated video review to a database comprising a plurality of user generated video reviews. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website.

The processor 207 executes the computer-readable instructions to publish the user generated video review. In some embodiments, the user generated video review is made available to all viewers of the host website and the user generated video review may be found and viewed by any viewer without a log-in process. In another embodiment, the user generated video review is made available to only a set of viewers and may only be viewed by viewers who have completed a log-in process.

The processor 207 executes the computer-readable instructions to provide an interface for a viewer of the user generated video review to purchase the reviewed product featured in the user generated video review. The user interface may be a hypertext transfer protocol link that enables the viewer to quickly navigate a browser to an external website to purchase the reviewed product. The user interface may enable the viewer to directly purchase the reviewed product from the host website using common tools of online shopping known in art. The user interface may also provide instructions on methods that the viewer may apply to purchase the reviewed product.

In some embodiments, the system includes a web application which publishes said user generated video review on an external website. The web application may be a software program for a video player to be embedded on the external website. It is contemplated that an external website containing a web content will use the web application to embed the video player to play a user generated video review featuring a reviewed product that is related to the web content. A user of the external website may view a user generated video review with the web application on the external website. In some embodiments, the system includes a mobile application which publishes said user generated video review on a mobile device. A user of the mobile device may view a user generated video review with the mobile application on the mobile device.

The processor 207 executes the computer-readable instructions to distribute an incentive to the user account associated with the user generated video review. Incentives may be distributed based on criteria such as but not limited to the number of approved user generated reviews received from the user account, the quality of the registered user's user generated video reviews, the number of views for the user generated video review, the ratings given by viewers of the user generated video review, or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

Figure 11:
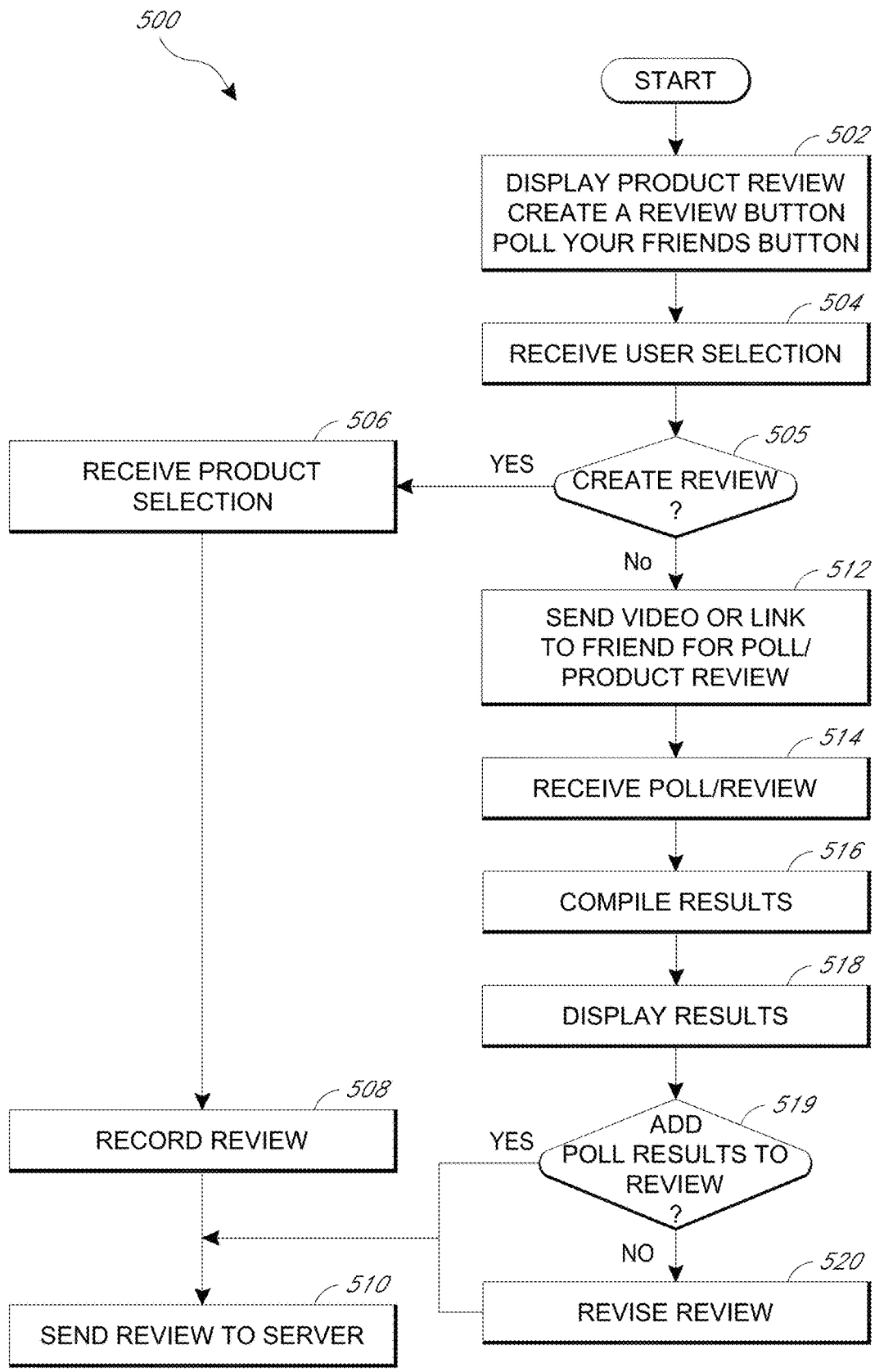
FIG. 11 illustrates an example process.

FIG. 11 displays an example process 500 from the perspective of a client device, such as used by an end user when operating in concert with a review server that manages databases as described above. Process 500 may be triggered when a product is displayed in an advertisement shown to the user on a third party content website that displays one or more advertisements, for example. In such advertisements, by selecting the product or product review selector choice, the user is able to initiate process 500. The client device (e.g., a portable device, such as a mobile phone) may be in communication with a public telecommunication network. At state 502, the client device displays a product review recording to a user and, while displaying the product review recording, optionally also displays a review product control to the user and a control to initiate the polling of others (e.g., the user's social network "friends"). Continuing to state 504, a user selection is received.

At decision state 505, if a user instruction to create a review is received, the process transitions to state 506. If a user polling instruction is received, the process transitions to state 512. In some embodiments, the instruction to create a review is to create a review of an item that has already been reviewed by another, and state 506 enables a user to provide their own opinion. Optionally, in addition or instead, the user may be presented with other products to review. Optionally, it is assumed that the same product is being reviewed in state 506 and gives the user a choice of what else the user desires to add. Optionally, in addition to creating a review, the user is also given the opportunity to purchase the product by a selectable option presented during the playback of the review. As control transitions to state 506, a user selection of a product to review is received. The selection may be made manually or the selection may be made by examining the product tag associated with a product review currently displayed to the user.

At state 508, a product review is recorded by the user. At state 510, the recorded preview is uploaded to a server of managed product reviews. Optionally, the user receives some level of reward or compensation for submitting a review. Returning to state 512, where the user has selected the polling control, optionally a link to a product review is sent to a list of recipients chosen by the user, such as members of a social network to which the user belongs, and/or the product review (or a link thereto) is published on a user's social profile.

Figure 12:
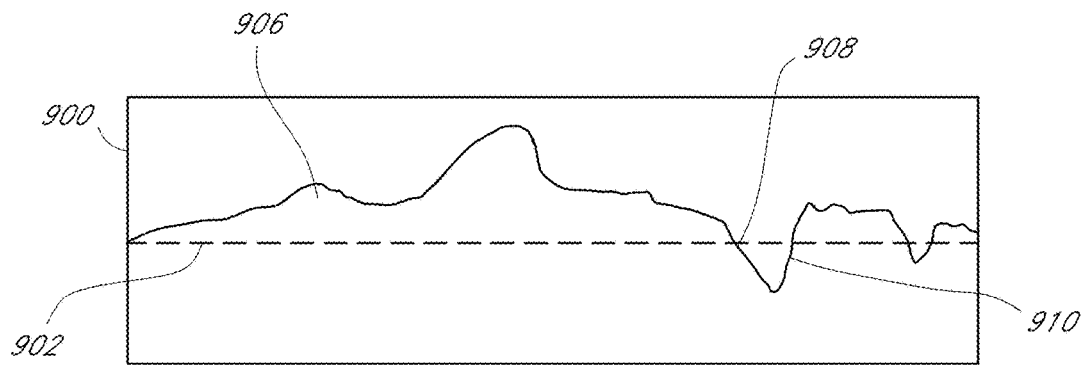
FIG. 12 illustrates an example dimensional graph used to display user feedback that maps user selection between a like state or a dislike state regarding a product review.
Figure 12:
Figure 13:
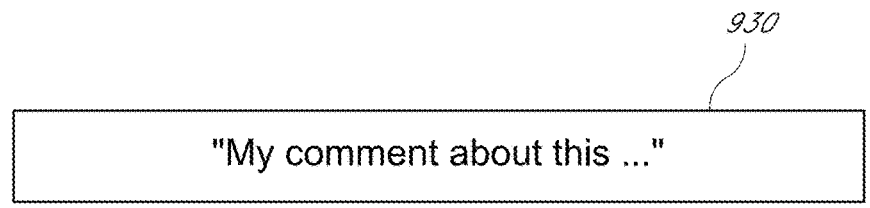
FIG. 13 illustrates an example dialogue box containing a written comment by a reviewer.

Polling of one's social network enables the user to monitor a smaller group of individuals, of whom the user has personal contact, or, a large online community of people including people with whom the user has not had personal contact, but has a communication path to such people. Referring to FIG. 12, there is shown graphically an example like/dislike representation that varies over time. Graph 900 includes a centerline that can be shown different ways, but herein is shown as dashed line 902. Good feeling of a polled individual while watching a review about a product and/or service can be recorded by the user by continually selecting a "like" control or a "dislike" control during the time a polled reviewer watches a review. Playback of the video about the reviewed product and/or service to the polled individual can be made contingent on the user pressing a like or dislike control, so that there is always a fresh opinion registered by a reviewer. Tracking of this opinion level is shown by line 906, which stays above dashed line 902 for most of the review, until there is a dislike spike at 908, followed by an immediate like spike 910, at a point in time during the review. Activating a like control repeatedly keeps a reviewer's like opinion high above dashed line 902; pressing a dislike control repeatedly keeps a reviewer's dislike opinion well below the dashed line 902, and inactivity brings the user's opinion close to dashed line 902; thus reviewers can reach their extreme expression points by rapidly pressing either a like or a dislike control, thus causing a peak or a valley to occur, making it easily seen by someone looking at polling results of individual reviewers to see where noteworthy feedback occurs. Thus, a viewer of the graph may quickly identify trends from the reactions of individuals in their social network. Slider tool 910 (also referred to as a scrubber herein) is provided in an embodiment to enable a user to select a portion of a review based on an upward or downward spike on line 906. Also, at these moments in time, members of a user's social group can add text, such as a text comment, which is displayed to a user during playback of a polled review in area 930, (see, e.g., FIG. 13).

Figure 21:
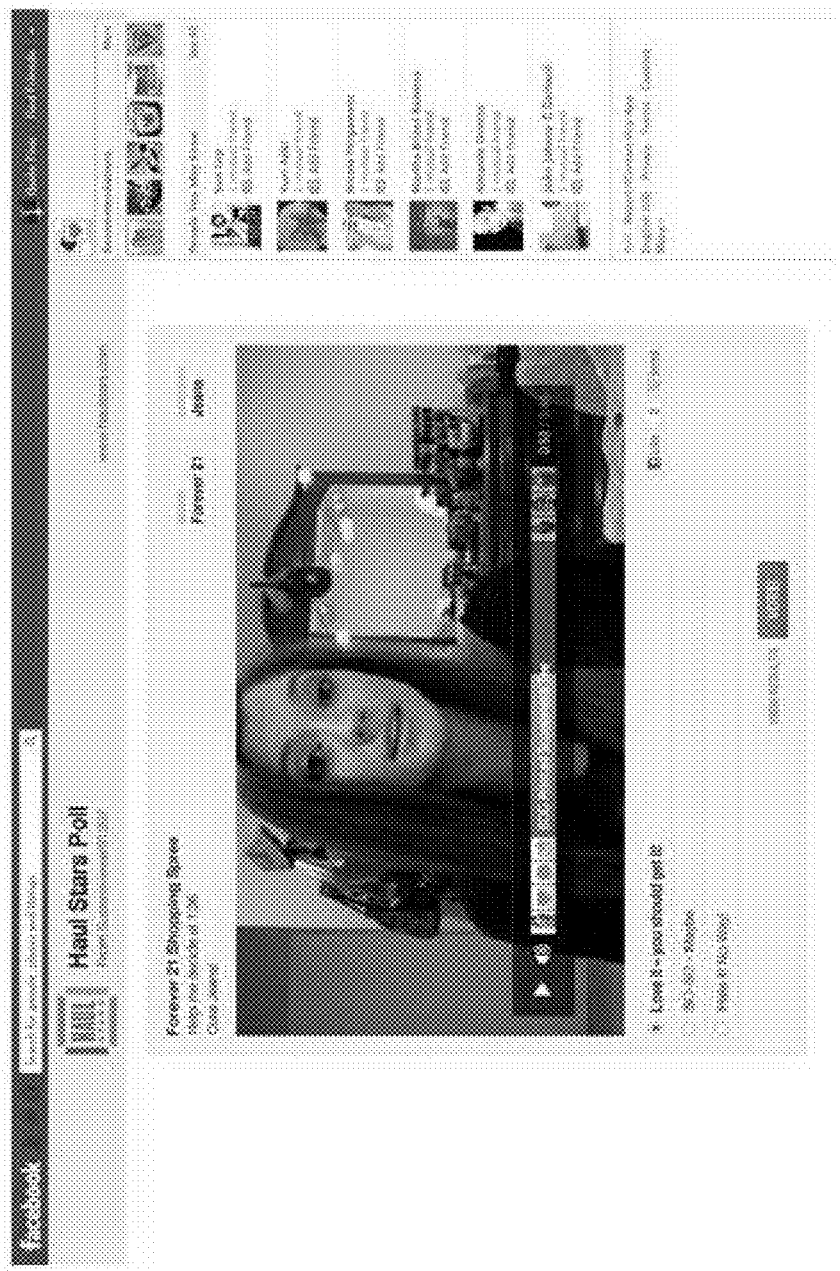
FIG. 21 illustrates an example polling interface.
Figure 26:
FIG. 26 illustrates an example user interface.

FIG. 21 illustrates an example polling request user interface, which may be presented to recipient, such as one or more contacts or social network members of a reviewer or a viewer of a review. In this example, the item video review is presented via the user interface in association with metadata, such as the name of the video review, the name of the item review, the item brand name, and/or the item category. The user interface requests that the recipient provide their opinion on the item being reviewed to aid the sender. In the illustrated example embodiment, several predefined poll responses are provided from which the recipient can select. For example, the predefined responses may be approval (e.g., "I love it—you should get it"), indifference/indecisive (e.g., "so-so, maybe"), or disapproval (e.g., "hate it! No way!"), and/or there may be a text field configured to receive a text input from the recipient. The recipient's response may be provided to the poll requester individually and/or in aggregation with poll responses from others (e.g., with a total for how many recipients voted approval, disapproval, and indifference). FIG. 26 illustrates another example polling user interface embedded on a social networking site page of a user/recipient, which includes user comments regarding the item being reviewed and that enables the recipient to add comments in addition to voting with respect to the item.

Figure 14:
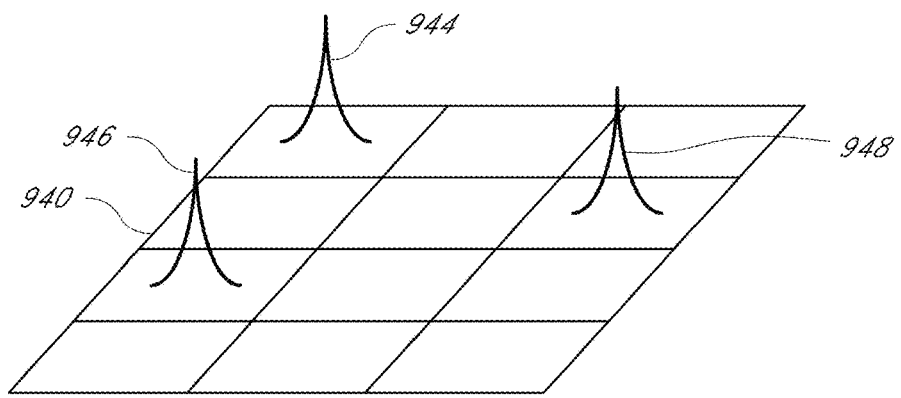
FIG. 14 illustrates an example three dimensional graph used to display user feedback that maps individuals in a three dimensional manner on a landscape plot having cells of color that indicate like/dislike states.
Figure 14:
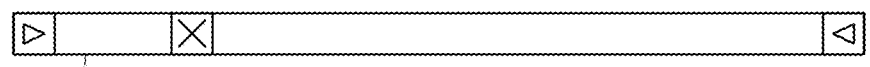

Referring to FIG. 14, in an example embodiment, the feedback gained from a user's social network can be represented in a three dimensional landscape plot that provides organization of a number of individuals from the user's social network. Considering a given cell of the graph 940 as a static location in a representation of friends polled by a user, manipulation of slider tool 910 during playback of a polled review enables a user to move forward or backward through a polled review and see what members of his or her social network are expressing through their selection of like or dislike during the review.

As a like control or dislike control is activated by the user during a review, the reviewer graph 940 can utilize color in the background of individual squares that show like or dislike, for example by illuminating a cell 942 assigned to a social network member as green for like or red for dislike, and also by using dynamic icons for social network members. These icons could appear on graph 940 as three-dimensional images of photographed person or computer-generated animation, or any other representation people would create for themselves. As referred to herein, dynamic icons are representations of individual social network members who have different actions or expressions over time are shown on graph 940 and are dependent on the user's like or dislike state.

For example, a user could populate a like/dislike span of images leading from one extreme to the other extreme. A user can monitor the social network by skimming through a review to see if there is seen activity on graph 940, and view groups of reviewers simultaneously during a product and/or service review that is being shown to them. Activity would be observed as, for example, at cells 944, 946, 948, where images of individual members of a social network may include an icon jumping up and down for a prolonged like state, or kneeling and sobbing, or sleeping for a prolonged dislike state.

Creativity in groups of users such as social networks is a function of the will of the individual members themselves, and adds an entertainment aspect to the observation of one's reviews by others, so different members of a social network may have their own set of pantomimes, by their own creation or by selection from a set of illustrated pantomimes in a database representation. Individual members of a social network may have a set of pantomimes stored for their icon that is used as explained above, to represent individual values along the range of like and dislike. Toolbar 910 and graph 940 as used herein enable a user to visually scan reviews quickly and select them based on like or dislike levels observed visually in his or her social network. If the icons on a user's graph are expressing pantomimes of extreme like (or dislike), or if the background colors of the cells on graph 940 are illuminated to indicate a strong like state, a user can stop, and watch that product or service review based on the expectations received from observing his or her social network as they are polled for like/dislike values.

While the review poll has been described in terms of a user's social network, in another embodiment, the system in addition or instead enables the user to select a fantasy social network, wherein the user selects reviewers who have been polled in many reviews, and places them manually on graph 940. This enables a user to build a unique set of reviews that can be scanned quickly by moving the space bar 910 across reviews that would intersect on a database of recorded reviews, providing the user a new ability of scanning combinations of reviewers that the user assembles by his or her selection of reviewers from a database of reviewers. A selection bar 960 may be included to enable a list of reviewers to be displayed from left to right, or they can be directly placed on graph 940.

Thus, various combinations of features described herein enable product reviews to be utilized not only for consumers of products and services, but optionally also for merchandisers looking to assemble merchandise lines for online stores as well as traditional vending methods. By assembling groups of reviewers that show particular insight to specific products and markets, vendors can more accurately select merchandise based on product reviews uploaded to a product review server. For example, a merchandiser having good connectivity with a particular market demographic, can assemble panel of product reviewers matching that demographic, and watch product reviews by members of the demographic.

Certain embodiments optionally provide in-edit distribution and/or in-ad distribution of user generated video reviews. For example, a review of a consumable item such as at least one of a product or a service in the form of audio and video information may be provided for display to a viewer. These reviews may be displayed on a web page (or other document accessed over or via a network) in-line (e.g., in-edit) with the content of the webpage (or other document) itself or accessed through a link on the web page to the content itself. For example, in an editorial article that mentions or refers to a particular product, the video review or a link to the video review may be placed in line with (e.g., embedded within) the content of the article. This presents readers with the option to easily access consumer generated product or service reviews directly from mentions of the product or service itself on the webpage. In other instances, the review is accessible from an advertisement such as a banner ad on the webpage or other document. The review may be embedded into the advertisement (in-ad) or a link to the review can be provided within the advertisement via a control or other such functionality that when selected is able to playback a user review relevant to the advertisement. Some or all of the foregoing functionality (e.g., the ability to record or upload video reviews, poll friends, index item reviews within the video review, provide tags, etc.), may be provided via a video player or otherwise when embedded in an advertisement, editorial content, or elsewhere, as discussed in greater detail elsewhere herein (e.g., see FIG. 25 and the corresponding discussion).

When the reader of a web page selects the review or a link to the review, a video playback window is provided for displaying the video. The video playback window provides a scrubber, such as a user-controllable playback slider bar, proximate to the displayed consumable item review. The playback slider bar indicates the progress of video playback during a time period in which the review is displayed.

The user-controllable playback slider bar comprises an option for accepting a user indication of a point on the slider bar, and advancing the video playback to a portion of the video corresponding to the user indication. Within the playback slider, at least one product image is displayed at a location within the slider that corresponds to a period of time during the review in which the consumable item associated with the image is reviewed. The user may indicate where an item review within the product review is located by placing a corresponding tag. Similarly, the user may indicate where an item photograph is to be presented within the scrubber area using a respective tag. Thus, by viewing product images in the scrubber area, a user viewing the video review can identify what portion of the video is relevant to the product they are interested in and skip forward to that portion of the video.

The slider may contain more than one product images. For example, in one or more embodiments a second image is contained within (or adjacent to) the playback slider when the content of the video transitions from a first consumable item to a second consumable item. Images within (or adjacent to) the slider may also correlate to different aspects of a same product. If the review is an unboxing review, for example, a first image might be of the outside of the box, a second image could show the box opened, a third image could show the product itself out of the box, a fourth image could show accessories associated with the product and a fifth image might show the reviewer using the product. Images within (or adjacent to) the slider are correlated to a time code or frame within the video and content of the video review near that time code or frame. Optionally, images displayed in the slider area may be of different people providing respective reviews of the same item or of different items.

Within (or adjacent to) the video playback window, controls are provided via which users are able to select an option to create their own reviews relevant to the product review they are watching or relevant to a related product or an unrelated product. Thus, a mechanism may be provided for displaying selectable options to a viewer related to the consumable item. The user may be provided the option to create a review of the consumable item or a related consumable item. The selectable option includes recording a review of the consumable item or a related item. Upon selection by a user, a review of the consumable item is generated. The review of the consumable item is optionally associated with the image in the video playback slider. The user review of the consumable item may also be unrelated to the consumable item currently being played back by the user.

Various selectable options may be provided to the user. The selectable options may also include displaying a polling option, the selection of which comprises polling individuals in the user's social network to determine opinions of the individuals with respect to the consumable item. Another selectable option includes a purchase option, the selection of which executes a purchase transaction of the consumable item by the user. Optionally, selection of the purchase option directs the user to an affiliate partner for purchase from a third party with a commission paid for a referral. The selectable options may also include a show image option, the selection of which executes display of additional images of the consumable item. Thus users can view alternative images of the consumable item reviewed in the video review. The selectable option may also include a comment option, the selection of which records a comment made by a user. When comments are entered, the system may provide for display the quantity of comments about the video review have been recorded. The selectable options may also include a like/dislike control, the selection of which records a user selection of one of a like selection and a dislike selection. In addition the selectable options may also include a want option, the selection of which records a user selection indicating that the user wants displayed consumable item (e.g., in the user's profile, which may be displayed to others as a user wish list).

The selectable options within the video review may also include a share option, the selection of which sends a message to an individual selected by a user. The share message may contain a link to the video review, an embedded copy of the review, or a copy of the review itself. In one or more embodiments, selection of the share option publishes a link to the consumable item on the viewing user's social profile on a social network. The interfaces for playback of the video review may also contain a "want" option, when the user selects the "want" option the user's desire for the item is stored in a want list and optionally shared to the user's social network or web in accordance with the user's privacy settings. The interface may also contain am "I own this" option which indicates the user owns a product in the video review. On selection of the "I own this" option, that information is stored and may be shared via a social network or through the Internet.

The interface displaying the video review may contain a number indicating how many users have indicated that they want the consumable item. Thus, the popularity of a consumable item may be determined through the display of the video review or via an associated graphic or indication. The display of the review may also display a number indicating how many users have viewed the review. The video reviews may be presented for playback in various contexts. For example, optionally video reviews are embedded within a downloadable, executable software program such an "app" for a mobile device or computer. In other cases, video reviews are associated with content on a web page.

For example, when a web page (or other network accessible document) has written content related to a product that has been reviewed, a link to the video review or the video review itself may be embedded into the web page with the written content. On selection, the video review is presented to the reader for playback along with the selectable options discussed herein. The video review or a link to the video review may also be part of or associated with an advertisement for the consumable product or service being advertised. Thus, the video review may also become an advertisement on a web page. The video reviews may be displayed, for example, on a television, laptop, phone, table, or other display device. Because certain embodiments provide various ways for viewers to interact with, create, and share video reviews analytics about these actions are obtained and stored. Information such as, how many times a particular video review is watched, how many people like the video review, who likes the video review, who indicates they "want" the product reviewed, ratings about the product, what demographics view and interact with the video review most, and who creates new reviews after evaluating an existing product review. Analytics such as, what products are purchased on a web site or affiliate web site after a user views the review and details about the purchase may also be obtained and stored.

A consumable item review method will now be described. The method may include providing a video review of a consumable item, such as a product or service, for display to a user. The video review is presented in various contexts (e.g., by selecting a link on a web page, a link in an advertisement, or in a mobile app). One or more selectable options are associated with display of the video review. These selectable options enable the viewer to take the actions specified in other parts of this specification. One example, of a selectable option is a control that when selected enables the user to create their own review of the product, an associated product or any other product. Users may also indicate whether they want, own, like or viewed the video review. If the user selects the option to review a consumable item such as a product or service, the user identifies the consumable item to be reviewed and records a video review of the identified item. The video review is then sent to server configured to store the consumable item reviews via a network connection.

As noted above, optionally incentives are awarded to the user for recording and submitting a review. The video review conducted by the user may in some cases be done subsequent to the user polling others in a social network to which the user belongs and in such cases the video review may be displayed to members of a social media associated with the user for feedback or further interaction. Members of the user's social network may, for example, create their own product reviews or provide comments about the review. Feedback from other users or video reviews about the consumable item may also be displayed. Users who view the video review may give it a rating and the system may collect and store rating information derived from individual ratings collected from multiple viewers of the recorded consumable item review.

As discussed above, a video review (e.g., a single video file) may optionally include reviews of multiple products. The product reviews may be sequentially included in the video review file. For example, if a user goes on a shopping trip, the user may then review each item purchased (or a subset thereof) in a single video (rather than multiple video files, where each file includes a single review). A given product review within the video review file may be time stamped, indicating at what point in time in the video review file the review of the given product begins/occurs. The time stamp, which may be in the form of a "start" tag automatically generated by the user indicating where the start of the product review is, may be recorded in metadata associated with the video review. Other techniques may be used to identify the location/position of a given product review within a video review. For example, a frame number may be identified as that point at which the product review for the given product begins. The frame number may be recorded in metadata associated with the video review. Optionally, a user interface is provided via which the user can indicate which frame within the item review is to be used to represent the item review in future search results or the like.

As noted above, an image from a given product review may be displayed in a scrubber area (e.g., a scrubber bar that a user can utilize (e.g., by dragging a scrubber control in the scrubber timeline) to indicate where the user wants the video playback to begin or to browse frames in the video). Thus, for example, the scrubber area may display images of products being reviewed in the scrubber area, where a given product image is displayed in the scrubber timeline at a location corresponding to where the review of the respective product begins. The product image may be a frame from the review of the product, such as, by way of example, the first frame from the review of the product.

A product tag associated with the reviewed product may be received from the user posting the video review or a user viewing the video review. As similarly discussed above, the product tag may be descriptive of the reviewed product (e.g., the tag may be a product name, a brand name associated with the product, a functional name, etc.). A product description is associated with the reviewed product based at least in part on the product tag.

When a video review is posted, optionally viewers of the review may be enabled, via a user interface provided by the posting system, to provide comments regarding a given product review within the video review. For example, the comments may be regarding the product being reviewed, the review itself and/or regarding comments from other viewers. The comments may be specifically linked to the corresponding product review within the video review so that when a viewer is viewing the video review file and the comments, the set of comments provided for display by the posting system will dynamically change depending on the product review in the video review file is currently being displayed (see, e.g., FIG. 17).

For example, if the video review includes three product reviews, when a viewer is viewing the video review, first the product review video for the first product will be displayed. Optionally, at substantially the same time, comments previously provided by other users for that first product review video will be displayed in a comments area, while comments for the product reviews for the second and third product will not be displayed. Then, when the product review video for the second product review is displayed in the comments area, corresponding comments previously provided by other users for that second product review video will be displayed, while comments for the product reviews for the first and third products will not be displayed. Then, when the product review video for the third product review is displayed in the comments area, corresponding comments previously provided by other users for that third product review video will be displayed, while comments for the product reviews for the first and second products will not be displayed. If a user (or the system) selects a particular product review to be displayed first (even if earlier product reviews are skipped over), the system may cause the corresponding comments to be displayed.

Figure 10:
FIG. 10 illustrates an example user interface application for publishing a user generated video review.

An example review playback interface will now be described. With reference to FIG. 10, in an example embodiment, while a still of the video review is being displayed and/or while the video review 1020 is being played for a viewer, various items of information 1018 may overlay the video review (or may be provide adjacent to the video review 1020) in one or more information areas. For example, information such as the name and/or brand of the item being reviewed, a relatively small still image of the item being reviewed, and/or the name of the reviewer may be provided for display. User accessible controls 1004, 1006, 1008, 1002 may be provided via which a viewer of the video review can purchase the item being reviewed, poll their friends regarding the item being reviewed (as similarly described elsewhere herein), record their own review (of the item in the viewed review or of a different item), indicate that the viewer wants the item being reviewed, and share the review (e.g., via instant message, email, posting on a social network page, or otherwise).

If the viewer activates the want control 1008, an indication that the viewer wants the item may be published at one or more networked locations, such as the viewer's social network page, other viewer profile, a blog, via email or instant messaging to one or more contacts of the viewer, or otherwise. Friends and family of the viewer (and optionally other users) can then see what the viewer wants, and can purchase the item for the viewer as a gift. Optionally, the number of likes received for the item and/or item review, and poll results may be displayed as well via the user interface.

Optionally, if the viewer indicates (e.g., by activating the appropriate record review or upload review control) that the viewer wants to record (or has recorded) a review for the same item as in the review item, at least some of the viewer's review tags (e.g., excluding the name of the reviewer, the merchant at which the item was purchased, etc.) are automatically prepopulated with the tags from the item review just viewed. For example, a brand name tag and a product name tag may be prepopulated with corresponding tags from the just viewed review. Optionally, the viewer can modify, delete, or add to the tags.

Controls may be provided via which the user can pause, fast forward, rewind, and play the video review, skip to the next item being reviewed in the video review, select a specific item review in the video review to view, etc. In addition, a time and/or frame indication may be provided (e.g., in the scrubber area 1002) indicating the current point in the video being viewed (e.g., 4 minutes, frame 2100) and/or the location of the beginning of each item review in the video review. The total length of the video review and/or of the item review, and/or time remaining may also be displayed.

As similarly discussed above, an image and one or more associated tags (e.g., a review name and/or the name of the item being reviewed) 1003 from the current item review being viewed, and one or more images and/or tags 1016 of other item reviews, may be displayed in the scrubber area 1002. In certain embodiments, a viewer may click on or otherwise select a given product image and/or tag in the scrubber area 104, and the video player will jump to the corresponding item review.

Other controls may be provided as well. For example, a control may be provided via which a viewer of an item review can indicate that they own the item being reviewed or that they do not own the item being reviewed. Optionally, if the viewer indicates that the viewer owns the item being reviewed, the viewer is prompted to provide a video review.

Optionally, the system may also identify other video reviews and/or particular item reviews a viewer may be interested in and provide a list of such recommended item reviews to the viewer. The list of recommended item reviews may include, for a given entry, a frame from the recommended item review, a playback control, a number of views, a number of indications of approval from viewers, and/or a number of comments from viewers.

For example, the system may identify other item reviews with one or more tags that are substantially the same as or generally correspond to one or more tags of the item review being viewed by the user. For example, the system may identify one or more item reviews that include the same brand name or the same product name (e.g., as determined from tag information) as the item review currently being viewed. By way of similar example, the system may identify other items reviewers by the author of the item review currently being viewed. The viewer can then select a given recommended item review (e.g., by clicking on a corresponding playback control or otherwise), and the selected item review is played back to the viewer (see, e.g., FIG. 17, 1706).

Figure 17:
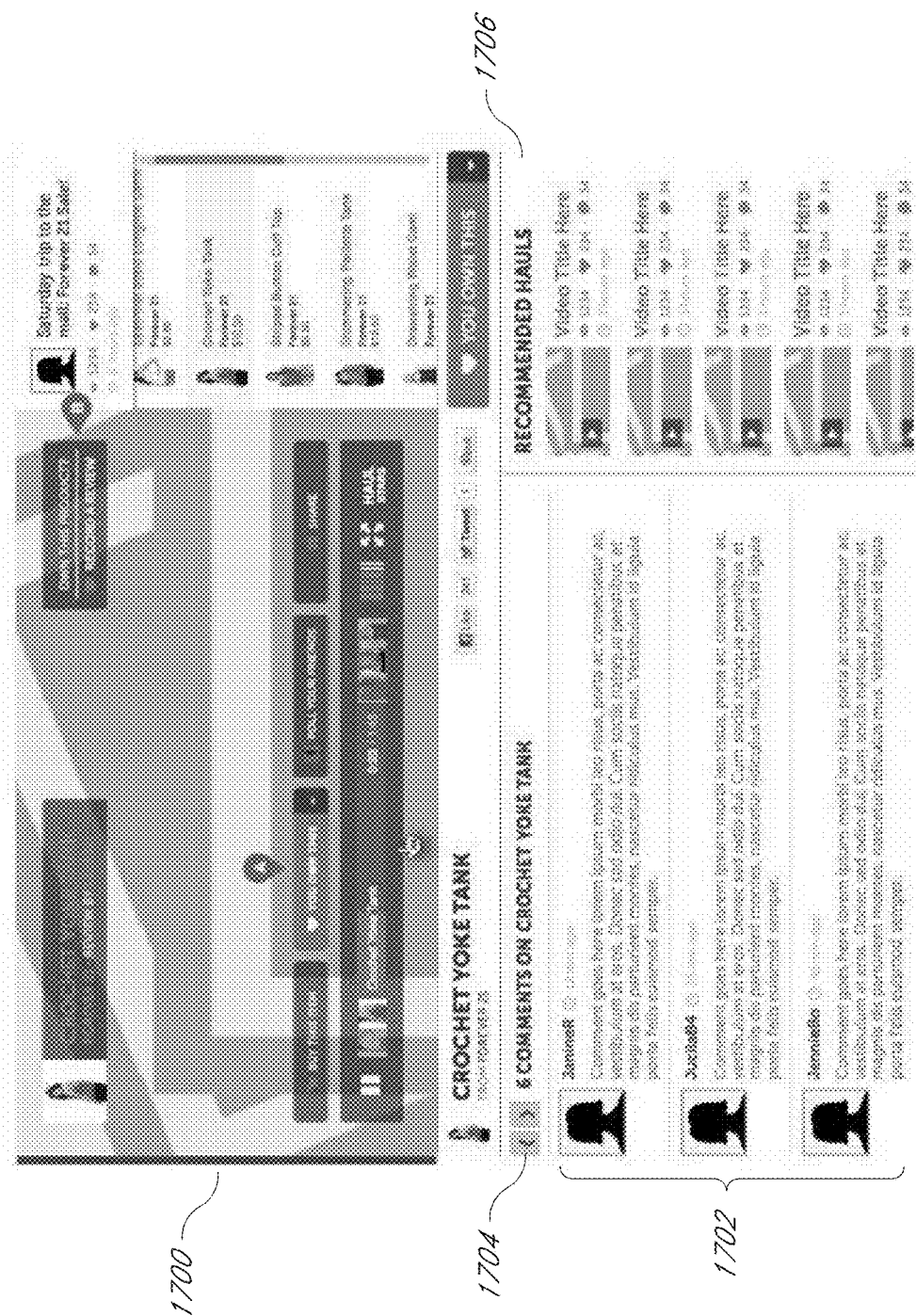
FIGS. 17, 18A-J, 19A-B illustrate example user interfaces.

With reference to FIG. 17, a comments area 1702 is presented beneath video review 1700, including a plurality of item reviews. The comments presented in comments area 1702 correspond to the item review being presented. As the video review playback proceeds and a next item review is presented, the comments presented in the comments area 1702 are cycled to present the comments corresponding to the next item review. A control 1704 is provided, which, when activated by the viewer, causes the comments to be cycled to display the comments for the next item review (if the viewer selects the forward control), or the comments for the previous item review (if the review selects the backward control). Optionally, the item review presented to the viewer will automatically cycle synchronous with the comments in the comments area 1702. As similarly discussed above, a recommend review area 1706 may list recommended reviews to the viewer.

Figure 22:
FIGS. 22, 23A-23B illustrates additional example user interfaces.

After a given video or item review (or between two video or items reviews), an interstitial ad (see, e.g., FIG. 22) may be presented to upsell or cross sell other products/service that have associated viewable video reviews (e.g., user generated video reviews). The interstitial ad may be selected by the system based at least in part on the brand and/or product included in the most recently item review viewed by the user, in other item reviews viewed by the user, and/or other indications of interest from the user (e.g., as similarly discussed elsewhere herein).

As noted above, a search engine may be provided (e.g., hosted on the system on which the video reviews are posted are on another system) wherein a user may submit a search query (e.g., including one or more search terms (e.g., jeans, boot cut jeans, blue jeans), which may be textual and/or graphical in nature) for a product review. For example, the search query may be submitted via a search field presented via a web page, a phone application, a browser plug-in, or otherwise. The search engine may identify video reviews to the user that include a product review relevant to the search query. For example, the search engine may identify video reviews (each of which or some of which may include reviews of multiple products) that include a product review relevant to the search query by comparing some or all terms in the search query against tags (or other descriptive matter) associated with video reviews. The videos included in the search results may be played back via a video playback device.

Optionally, some or all of the search results may include a timeline in a scrubber area or a representation of a scrubber area (which may be non-functional), or independent of a scrubber area. The search results may present and emphasize a frame (e.g., in the timeline) from identified reviews that correspond to the product. Thus, optionally, a timeline indicates at which point in an identified video review the product review corresponding to the search results substantially begins. The user can click on the emphasized frame and/or other portions of an identified video review, and the video review may begin playing at substantially the beginning of the product review, automatically skipping prior product reviews (if any) in the video review. Thus, the user does not have to sit through and view reviews of other products in an identified video review that user is not interested in, while waiting for the desired product review to begin. Further, optionally the user does not have to actually select the emphasized frame, and can instead, click on any point of the corresponding search result item to cause the item review to begin playing and/or click on or otherwise select a playback control. Optionally, the video playback device will automatically (or in response to a user instruction) cause the item review to be played back in full screen mode, or in a relatively expanded mode.

Figure 15:
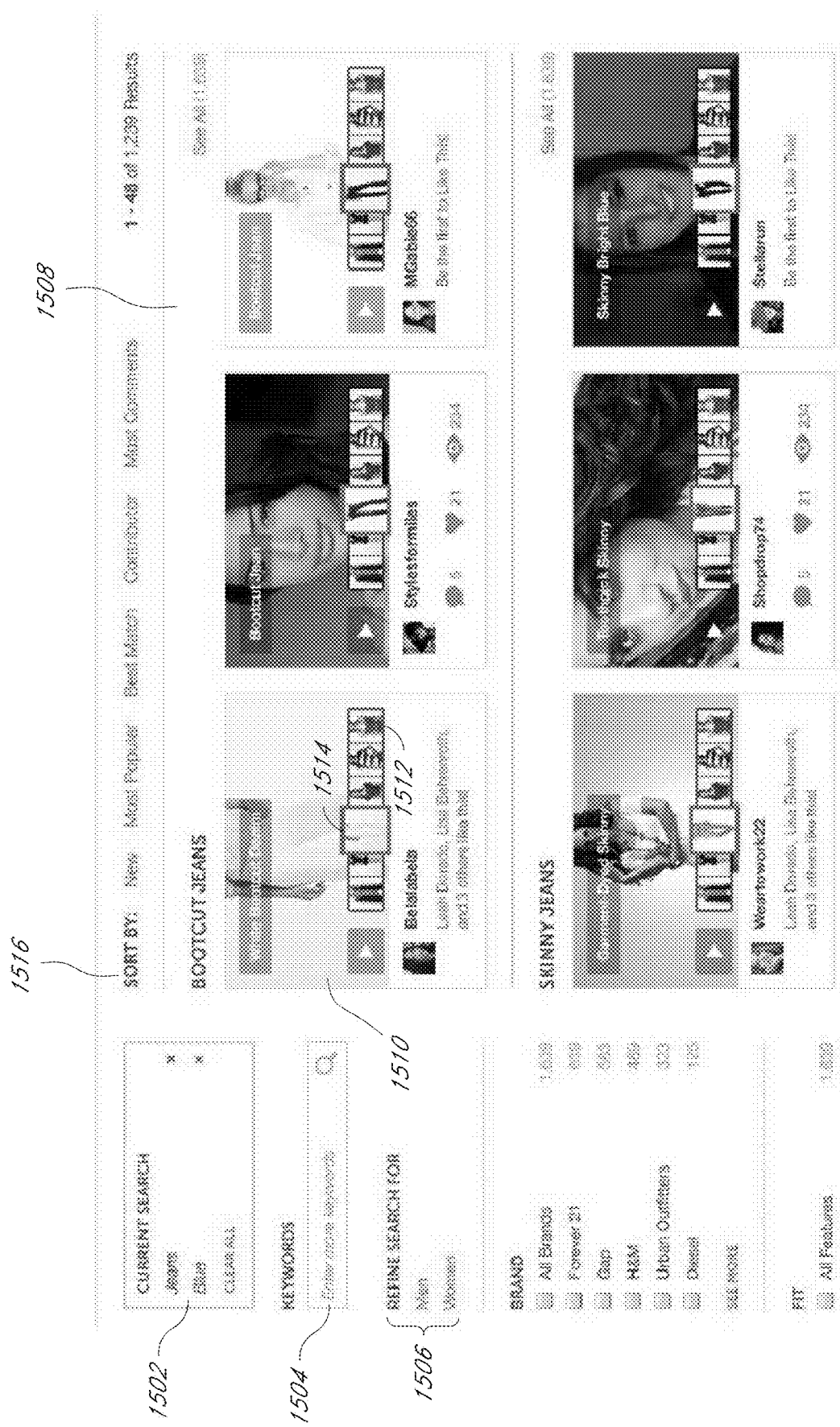
FIG. 15 illustrates an example search results user interface.

FIG. 15 illustrates an example user interface presenting search results. A "current search" area presents the user search terms corresponding to the search results. The user can broaden the search by deleting a search term (e.g., by activating a delete "x" control). A keywords field is provided via which the user can add search terms to further focus the search. In this example, predefined user selectable categories/search terms are provided (e.g., "men", "women"; brand; fit, etc.) in a refine search area 1506 to further refine the search. The search engine will then refresh the search results based at least in part on the user deletions of search terms and/or user selected categories/search terms. Optionally, the total number of search results and/or the number of item review search results associated with a given search results category is provided for display in association with the category. A results area 1508 displays the video/item review search results.

A given video review in the results area may be represented by a frame from the video review 1510 (e.g., above the scrubber area), a title (optionally provided by the user that recorded and uploaded the review), one or more tags, the name (or other identifier) of the reviewer, the names (or other identifiers) of other users that liked the review, etc., may be displayed in association (e.g., overlaying, above, and/or beneath) a given search result item. The frame representing the video review may be a frame (e.g., a substantially initial frame) of the item review within the video review corresponding to the search results. In addition, a timeline 1510 of frames may be included, where a representative frame (e.g., a substantially initial frame of an item review) for a given item review is included in the timeline in a time ordered manner. A frame 1514 from the item review corresponding to the user's search query may be emphasized. For example, the frame from the item review corresponding to the user's search query may be substantially centered in the timeline, presented as larger than other frames in the timeline, presented with a border that is different than that of other item review frames (e.g., bolder, of a different color, etc.) presented in the timeline, presented with no other frames in the scrubber area, and/or otherwise emphasized.

Referring again to FIG. 15, the search results may include subcategories corresponding to the search query. For example, if the search query is "blue jeans", the categories may be "boot cut jeans", "skinny jeans", "easy fit jeans", etc. A given item review presented in the search results may include one or more controls via which a viewer can add a comment, indicate that they like the item, play the item video review. A count may be provided indicating how many views the review has received. Optionally, a viewer's comments and/or indication that they like the item or the review, and/or that they viewed the review may appear on one or more documents associated with the viewer (e.g., a social networking site page/user interface associated with the viewer, a blog, etc.). Optionally, the viewer's comments, indicating that they like the item and/or review, and/or indication that the viewer viewed the review, may appear on such documents (e.g., social networking pate of the viewer), optionally in conjunction with a link to the video item review and/or including the video item review.

Sort controls 1516 may be provided via which the viewer can instruct to the system to sort the search results presented to the viewer using different criteria (e.g., sort in order of recentness, popularity, relevancy/closest match, contributor name/identifier, number comments, etc.), where optionally a user interface is provided via which the viewer can select the sort criteria. The search results are then sorted and presented to the viewer accordingly.

Figure 20:
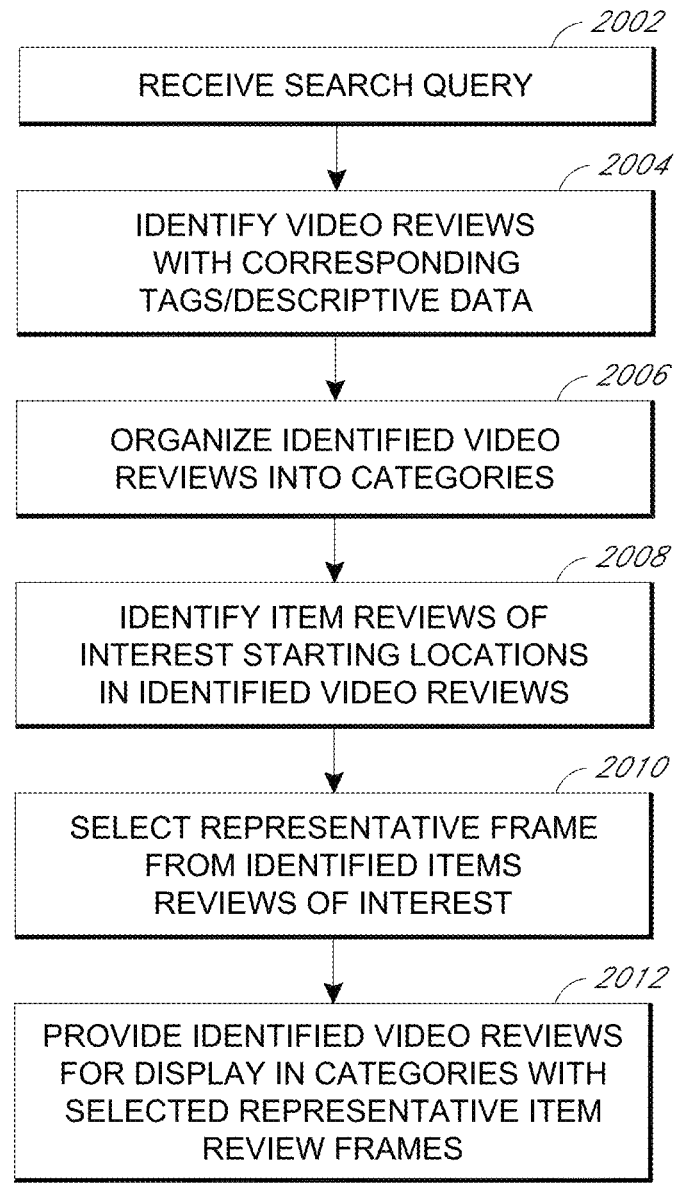
FIG. 20 illustrates an example review search process.

FIG. 20 illustrates an example search process. At state 2002, a search system, which may be included in a review posting system or which may interface to the system providing/hosting the video reviews, receives a user search query. At state 2004, video reviews with corresponding tags/descriptive data or other similarity data are identified. The tags and/or other descriptive data may be associated with a relevant item review included in the video review. At state 2006, the identified video reviews are organized into categories relevant to the search query using tags associated with the item reviews. For example, if the search query is "jeans", the video reviews may be organized into groups of reviews for different types of jeans (e.g., categories for "boot cut jeans", "easy fit jeans", "skinny jeans", etc.).

At state 2008, the start locations for the relevant item reviews within the video reviews are identified. For example, a "start" tag or other metadata may have been associated with the beginning of each item review, and a descriptive tag may be associated with each item review. The process may identify the start of a relevant item review based at least in part on start tag and/or the descriptive tag.

At state 2010, a frame (e.g., a substantially initial frame) for a given relevant item review is selected as a representative frame for the item review. The frame may be selected based at least in part on a prior selection of the frame by the author of the review or may be automatically selected. At state 2012, the identified video reviews are provided for display on the user terminal, organized in categories, with selected representative item review frames displayed in the scrubber area (e.g., on the scrubber or adjacent to the scrubber). The entire scrubber area, or a subset thereof, including the representative frame, may be a hot spot, wherein if the user clicks anywhere in the hotspot, the corresponding item review is played back. Thus, optionally, the searching user does not have to manually manipulate the scrubber control to the desired item review start location.

An application (also referred to as an "app") may be provided for installation on a mobile device of a user (although optionally the application may be installed on a remote system, wherein a user can access the application via the user's mobile device). By way of example, the mobile device may include a camera (which may be used to record video reviews), a microphone (which may be used to record audio for the video reviews) display, and input interface, such as a mobile phone, a mobile computer, or other mobile device. The app may include some or all of the functionality described herein, such as recording one or more products reviews, assigning tags, names, and other descriptive materials to a given product review, time and/or frame stamping a product review within a video including a plurality of reviews, uploading the review to a review posting site, uploading the review to a social networking site, sending the review (e.g., via MMS or email) to one or more recipients, initiating a poll, indicating that the user wants an item in a review, etc.

As similarly discussed above, optionally, using the app, the viewer may photograph an optical code (e.g., a 1 dimensional or 2 dimensional barcode, such as a QR code) or the app, via the mobile device, may read a code from a radio frequency (RF) tag (e.g., an RFID tag) attached to or corresponding to the product being reviewed. The code (whether optical or RF) may include information regarding the product being reviewed and/or regarding the merchant selling the product and/or where the review is being recorded. For example, the code may include a brand name of the product, a model number of the product, a color of the product, a price of the product, a name of the merchant, etc. Some or all of this information may be used to automatically populate tags for the product review.

Optionally, based on some or all of the code information, the system may identify other reviews for the product, other merchants/vendors selling the product, the price for the product from other merchants, and/or other information (e.g., by matching the code information with corresponding information stored for other reviews or merchant inventory databases). Some or all of such identified information may then be presented to the user via the app or otherwise. Optionally, the user may use the app to scan the code (which may be transmitted to the posting system) even without providing a review, and some or all of the foregoing identified information may be presented to the user.

Optionally, a user may be provided an incentive (e.g., a fee, discount, points that may be applied to an item purchase, other incentives discussed herein, etc.) for tagging and/or scanning the items they review and/or for providing/uploading the video product review. Different incentives may be provided for different items of information/reviews provided by the user. Optionally, the review hosting site is paid a fee (e.g., an affiliate fee) if the user and/or a viewer of the user's product review, purchases the scanned and/or reviewed product.

Optionally, the posting system and/or other system may provide location based push notifications based at least in part on one or more inputs (e.g., an indication of user interest, merchant location information, merchant inventory information, etc.). For example, a notification may inform the user that a product they have indicated as having an interest in (e.g., by recording a review for the product, by viewing a product for the product, by uploading barcode data, by activating a like control for a review for the product provided by a third party, etc.) is available at a named merchant within a specified geographic distance of the user's current location (e.g., as determined by location information, such as GPS location information, obtained from the user's mobile device).

Optionally, the app may enable the user to purchase the product online via the app (e.g., by activating a buy control), without having to visit a physical, bricks and mortar merchant, although optionally, the merchant may be notified of the purchase and the user may be able to pick up the product at the merchant. Optionally, the operator of the posting system and/or the third party reviewer may be paid a fee and/or be provided with another benefit, if the user purchases the product via the app and/or the physical, bricks and mortar merchant.

As noted above, a control may be provided in association with an item review, another item in the video review, in a video review being viewed by a user enabling the user to record a review for the same item, for another item in the video review, or for another item not included in the video review. For example a user interface (e.g., of a native video player) may be provided via which the user can indicate that they want to submit (e.g., record or upload) a review of the item which is the subject of the currently viewed review (e.g., a "crochet yoke tank"), another item in the video review (e.g., "another item in this haul"), or for one or more other items not included in the video review (e.g., "create a new haul").

Figure 18A:
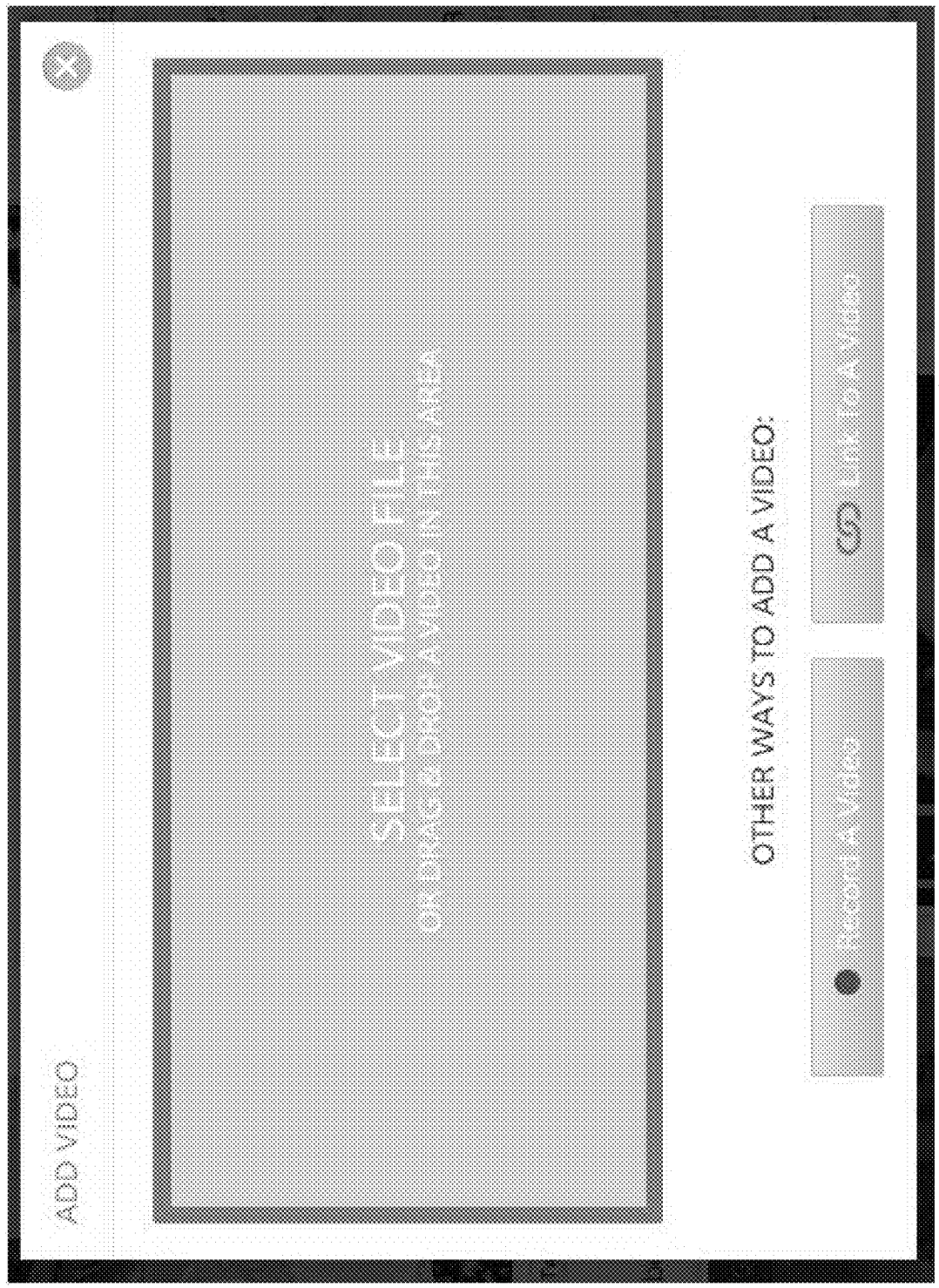
Figure 18B:
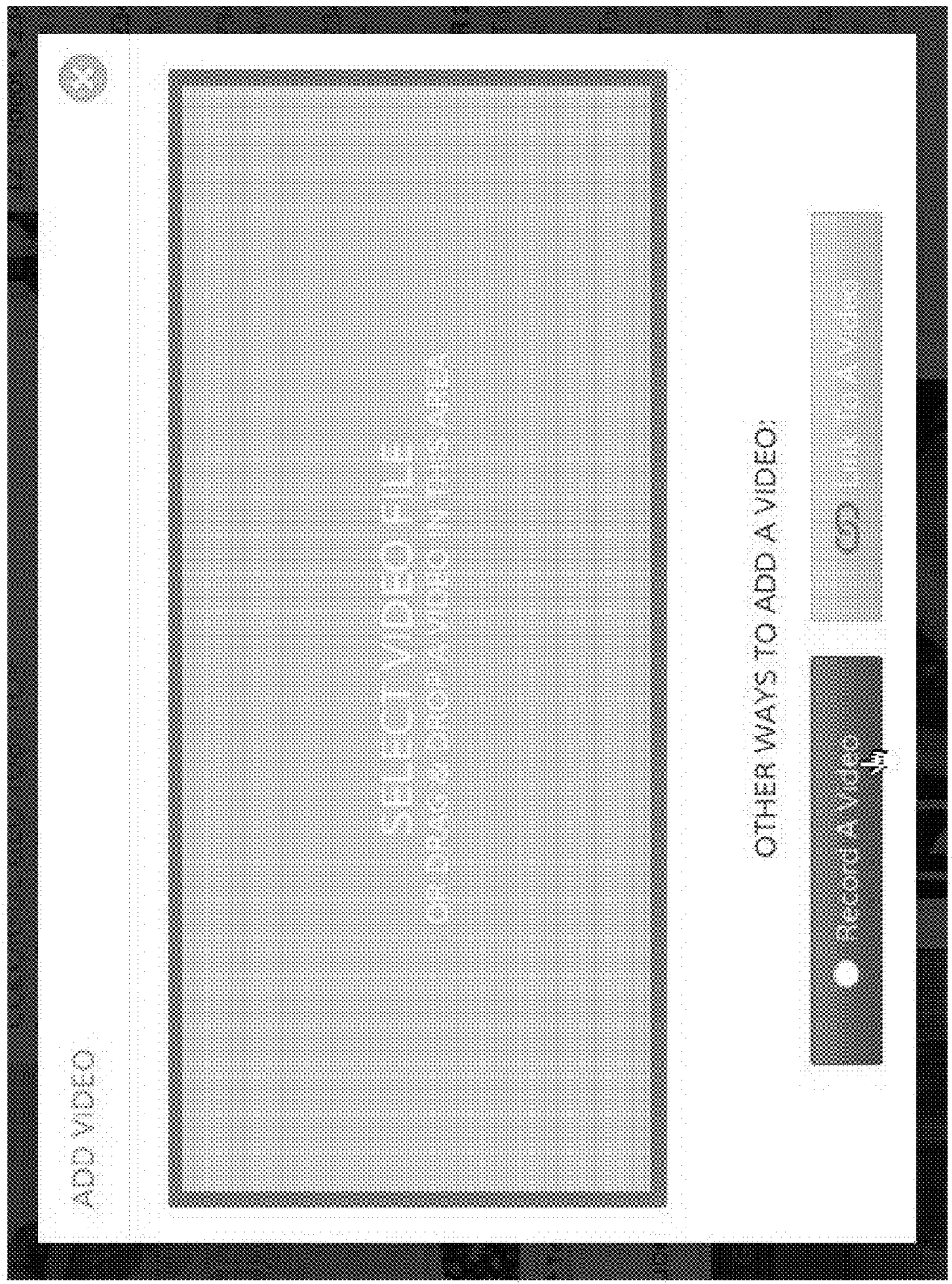
Figure 18C:
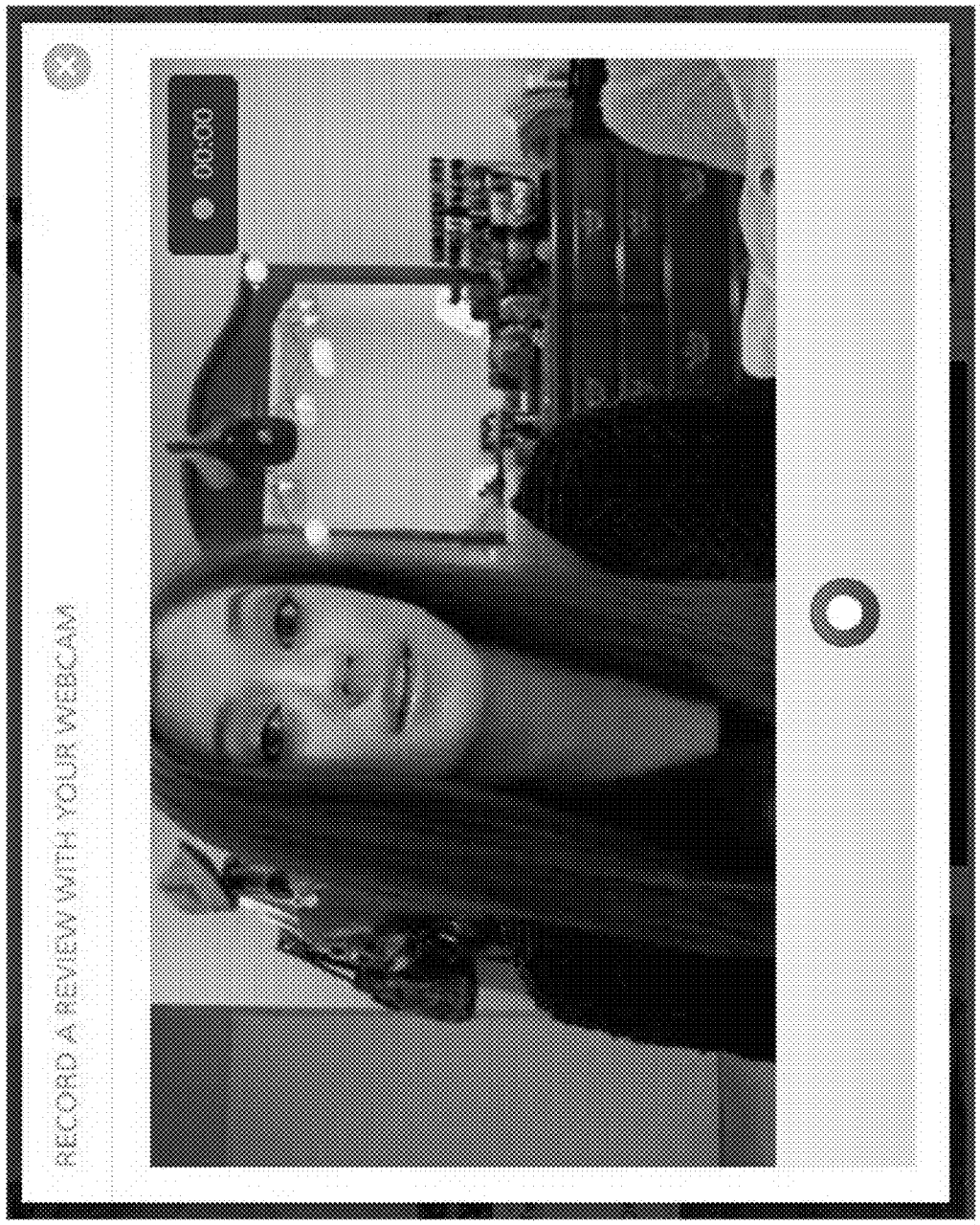
Figure 18D:
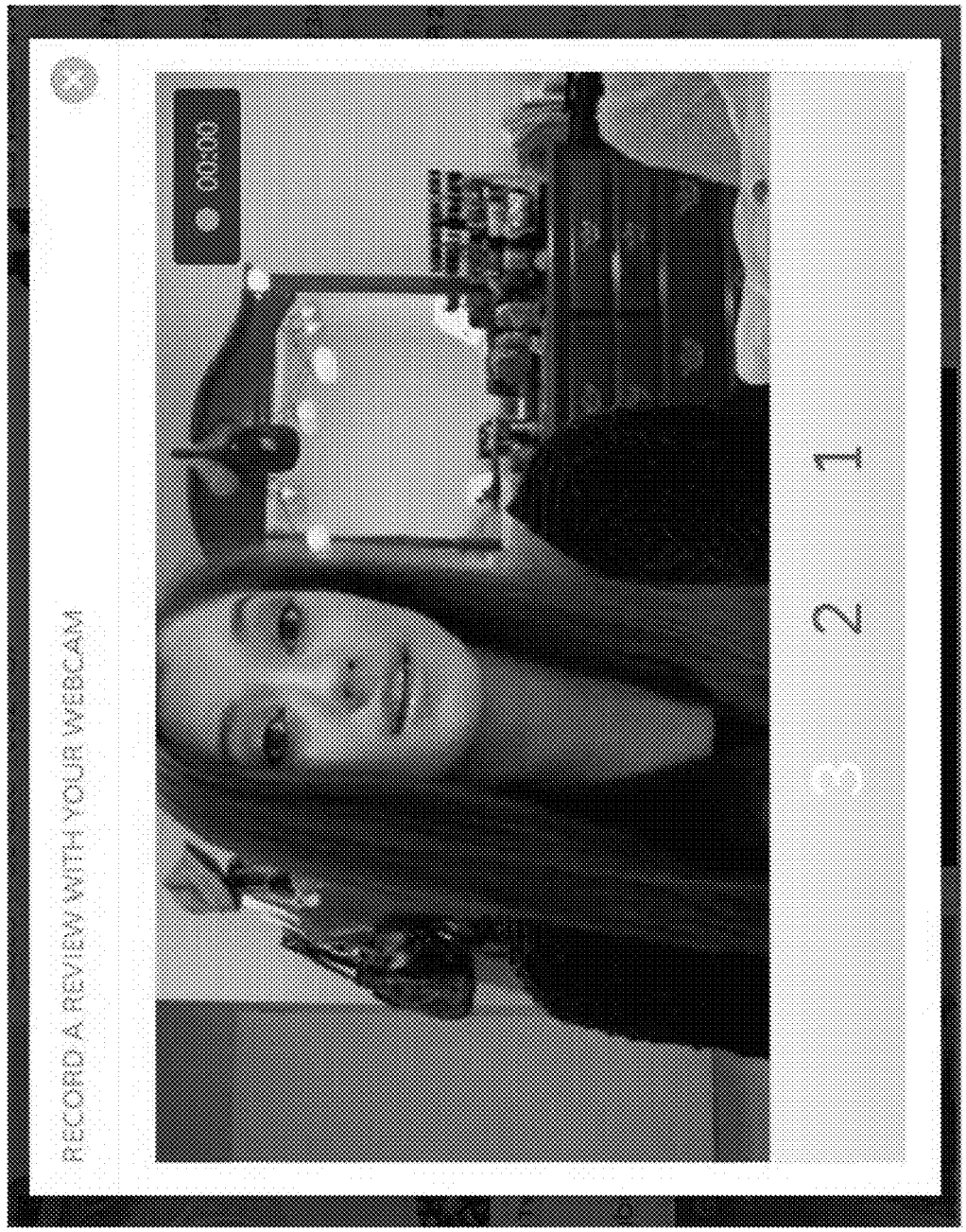
Figure 18E:
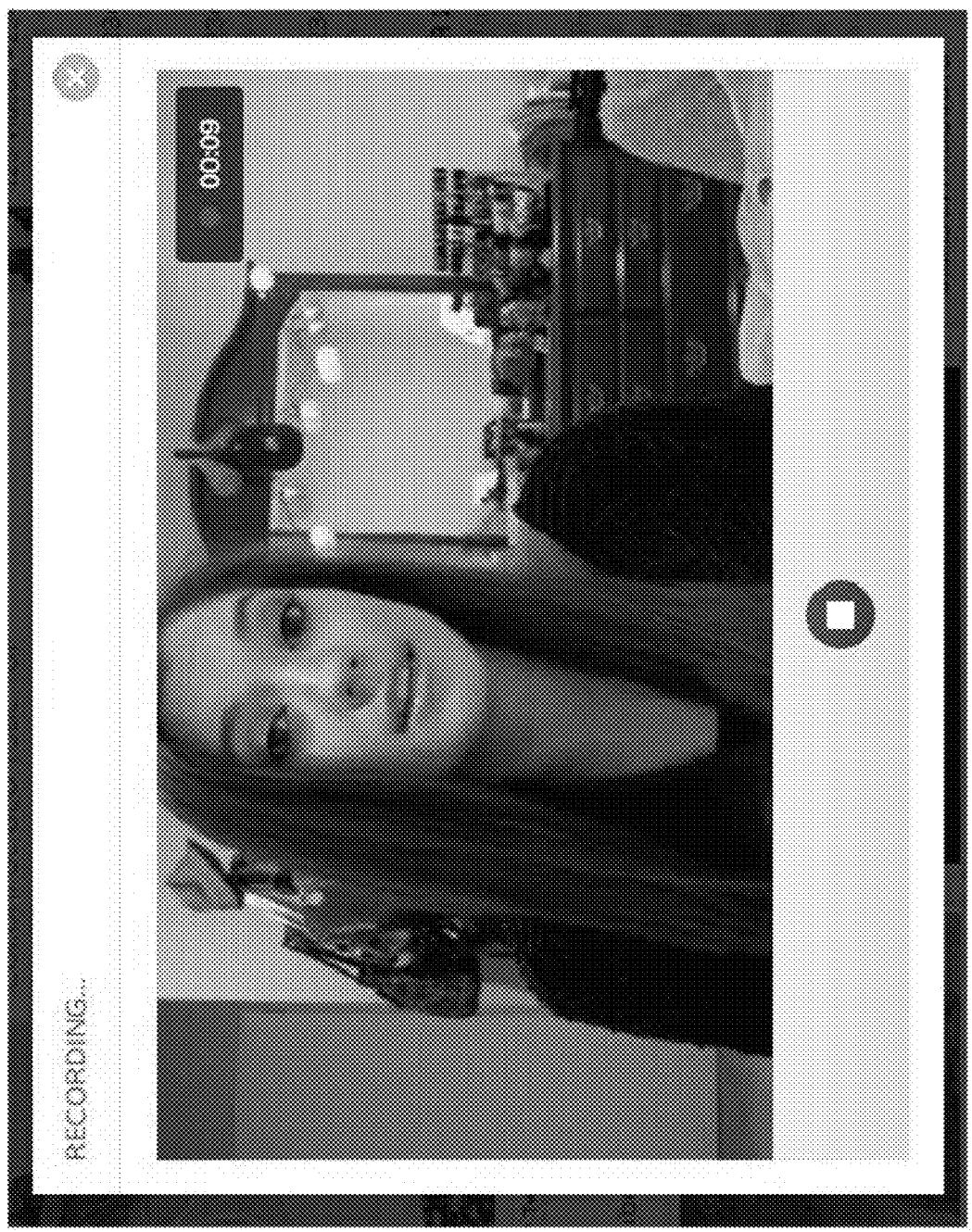

FIGS. 18A-J illustrate example user interfaces at various states of an example process of adding a video review (e.g., by uploading or recording a video review, or providing a link to a video review) to be viewed via networked terminals. Referring to FIG. 18A, a user interface is provided via which a user can provide a video file by browsing one or more storage areas to locate and selecting a desired video review, or by dragging a video review to a drop area, or by initiating a video review recording process (e.g., by activating a "record a review" control), or by providing a link to a video review stored on a network accessible site (e.g., by activating a "link to review" control). Referring to FIG. 18B, if a user selects the "record a video" control in this example, the user may begin recording a video through a webcam or camcorder connected to a user terminal. Referring to FIG. 18C, a live feed of the user is provided via the user interface, via which the user can view herself prior to and while recording the review. A record control may be provided, which when activated, causes the example interface presented in FIG. 18D to be presented. Referring to FIG. 18D, after the user activates the record control illustrated in FIG. 18C, a countdown timer (e.g., a three second counter or other type of countdown timer) is presented to the user visually and/or audibly indicating when the recording will begin. Referring to FIG. 18E, the system records the video, optionally in a memory system remote from the user terminal, and the user can view what is being recorded via the user interface. A stop recording control is provided, which when activated by the user, may halt or pause the recording. Optionally, a maximum video length may be specified by an administrator or otherwise, and the video recording may be automatically halted once the maximum video length (as specified in time) is reached.

Figure 18F:
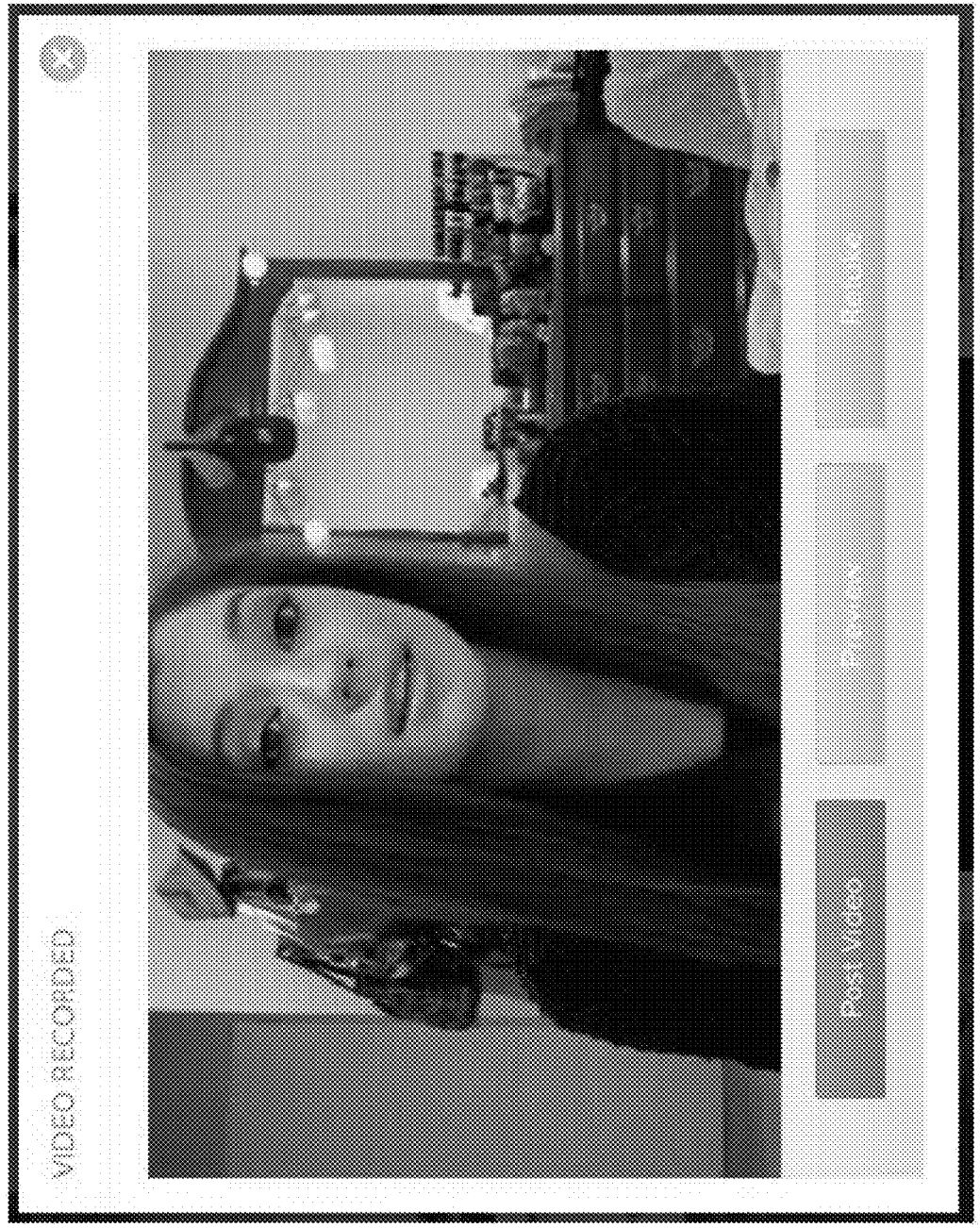

Referring to FIG. 18F, once the user has completed recording the video review (e.g., as indicated by the user activating the stop recording control), the user may activate a post control to post the recorded via, or review the video by activating a preview control, or retake the video by activating a retake control (which will optionally cause the previously recorded video to be deleted (e.g., functionally deleted) from memory).

Figure 18G:
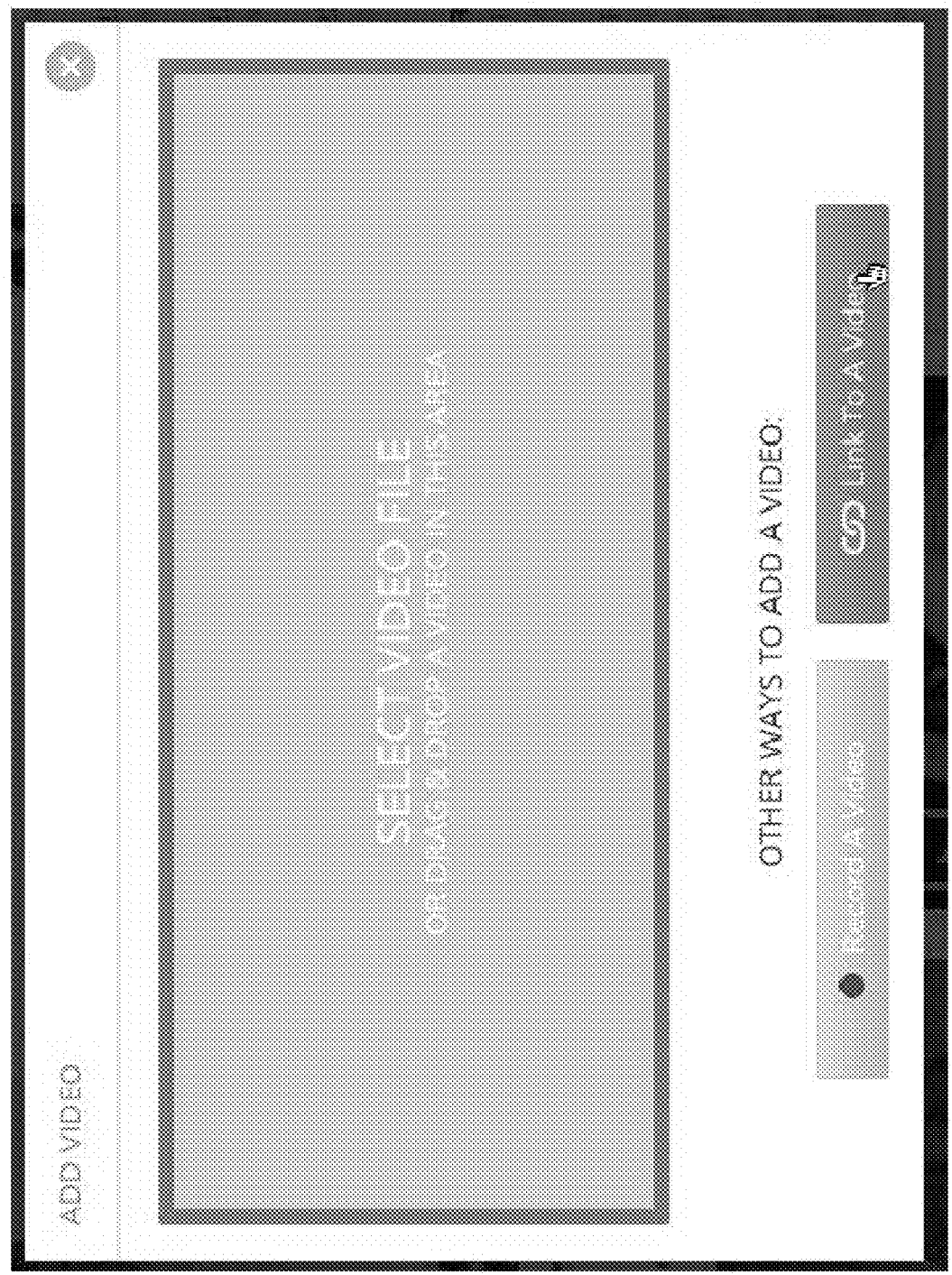
Figure 18H:
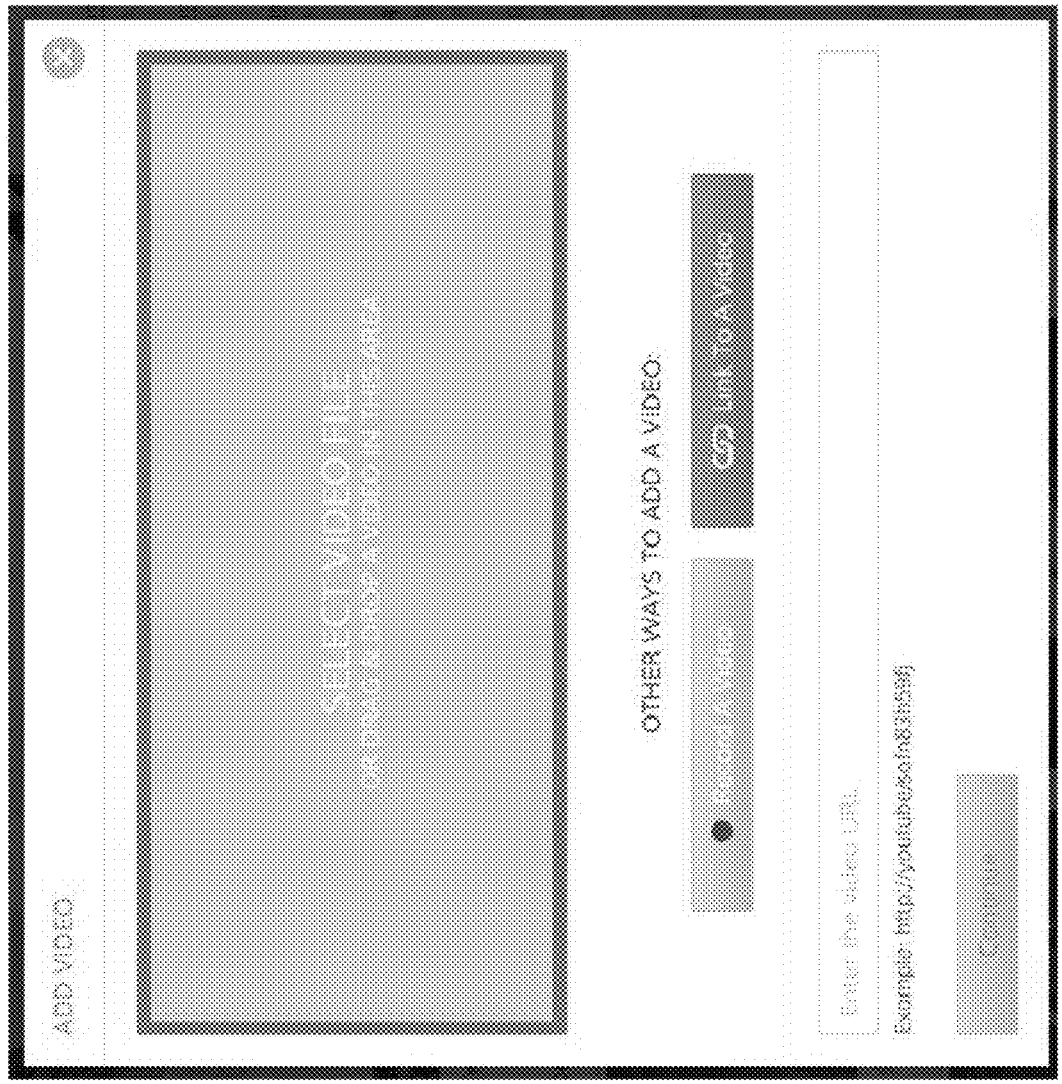
Figure 18I:
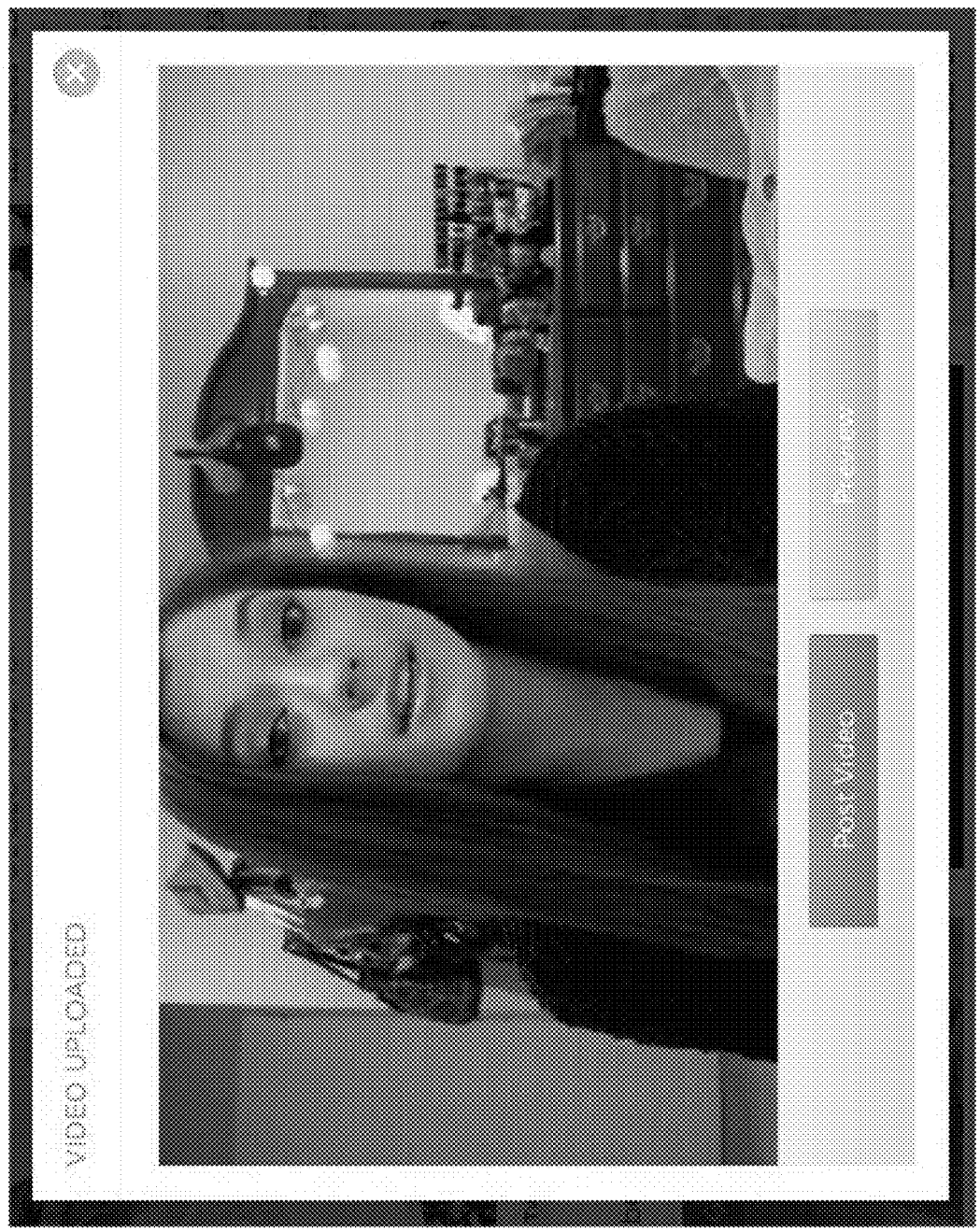

Referring to FIG. 18G, in this example, the user has activated the "link to video" control. Next, the example user interface illustrated in FIG. 18H is presented. A field is provided via which the user can enter a link to the video review (e.g., a uniform resource locator (URL)), which may then be saved in memory. Once the user enters the link, the user may activate a "continue" control. Referring to FIG. 18I, the user can preview the linked to video review via the illustrated user interface by activating a "preview" control, and activate a "post" control to post the video review.

Figure 18J:
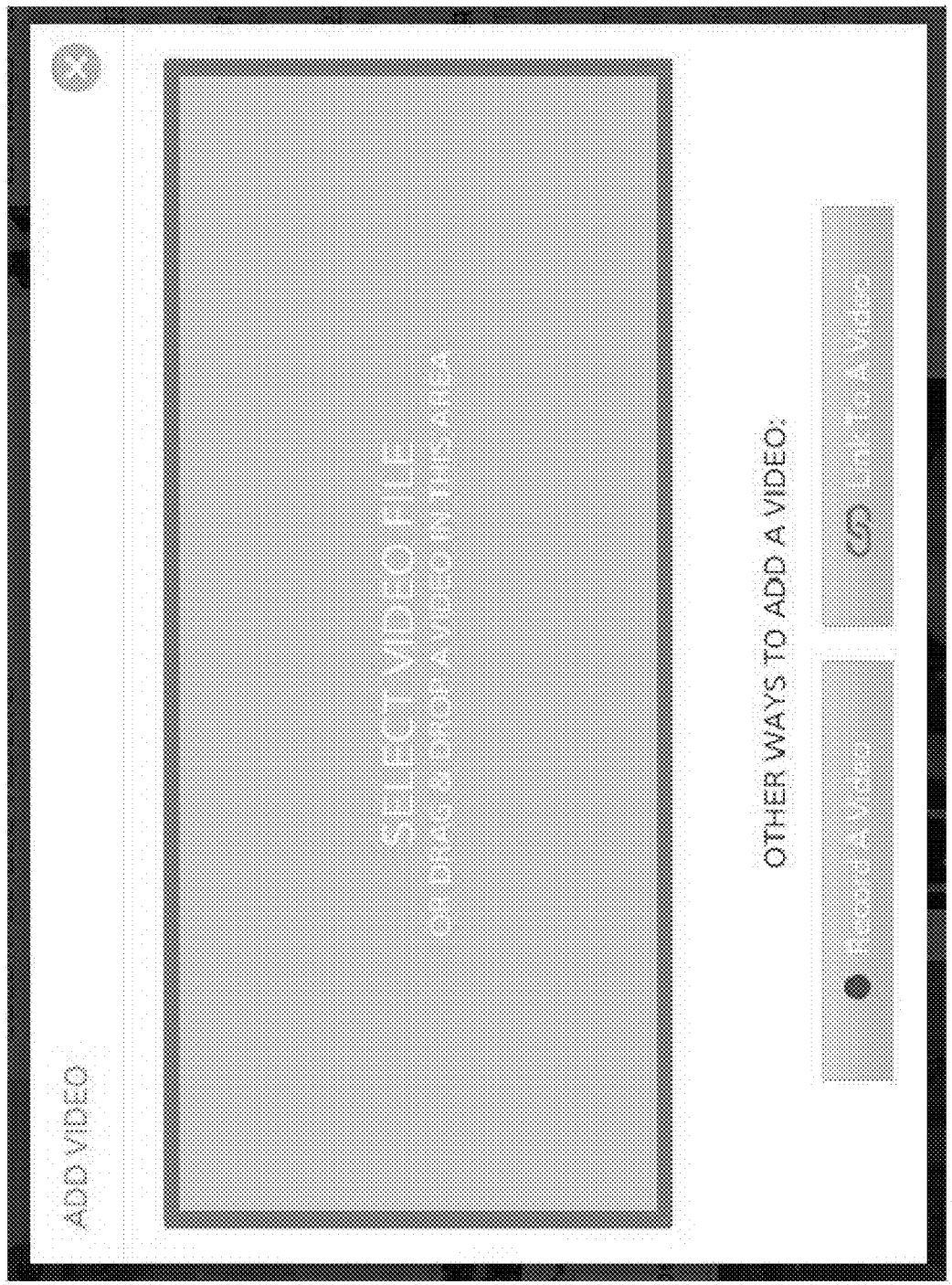

Referring to FIG. 18J, in this example, the user has activated the "upload" control, and the user may upload a preexisting video review stored on the user's terminal (or local to the user's terminal).

Figure 16A:
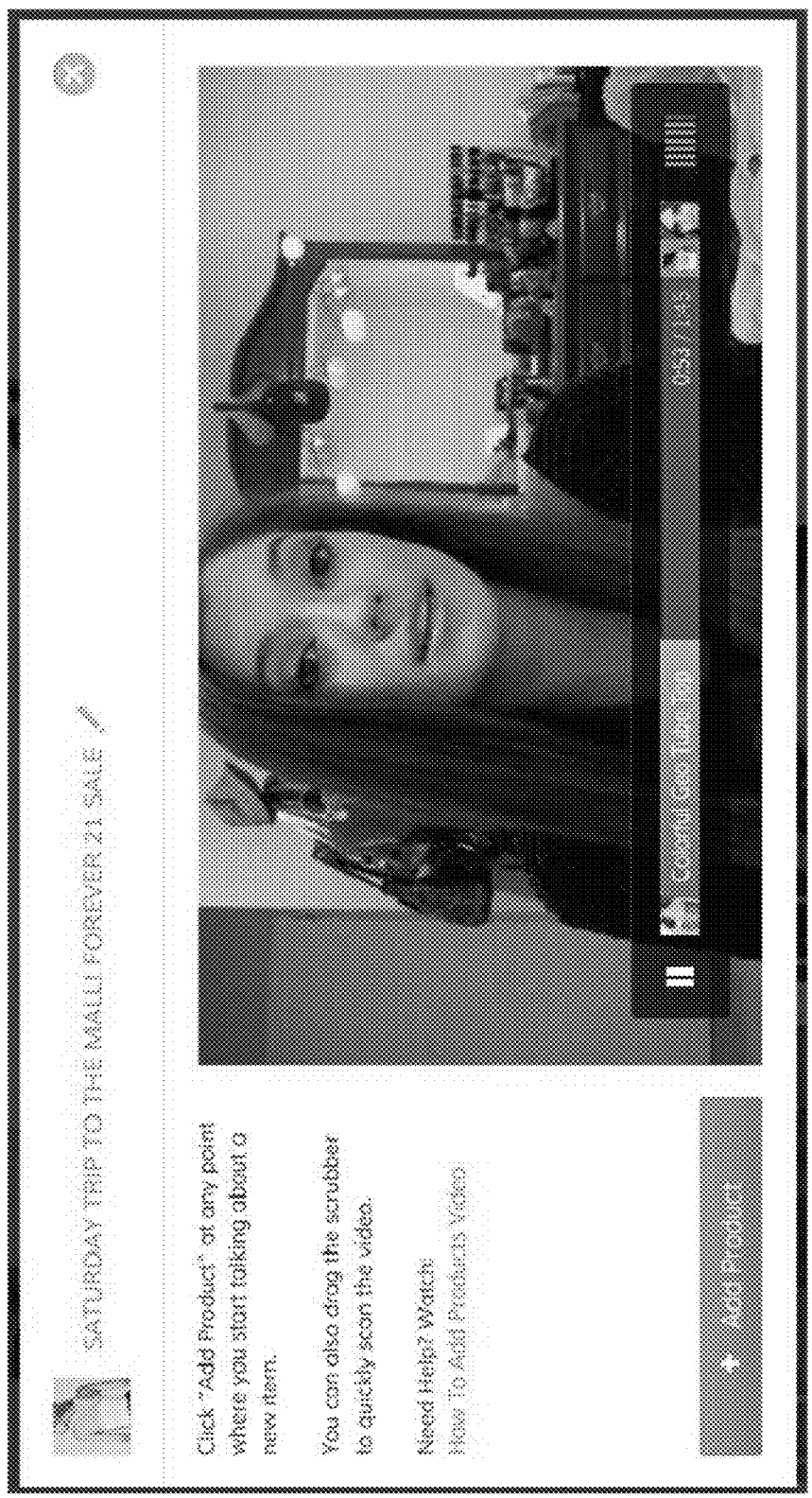
FIG. 16A-E illustrates example tagging and image upload user interfaces.

An example tagging process will now be described with reference to example user interfaces that may be provided for display on a user terminal (e.g., desktop, laptop, tablet, phone, interactive television, etc.). User inputs may be received by a remote system (e.g., the posting system), and data provided by the user may be stored and utilized by the system as discussed herein. Referring to FIG. 16A, a video review provided by a user is presented in association with a play/pause control, and a scrubber area including a scrubber control and timeline. An "add a product" control is provided, which when activated by the user, causes a tag or other indicator to be stored in association with the current point in the video review being displayed and/or the current position of the scrubber control in the timeline. This tag or other indicating may be used by the system to indicate the beginning point of the item review within the video review. The user may drag the scrubber control to a desired position to quickly scan the video to visually locate the beginning of an item review. An edit control (e.g., a pencil icon) may be provided, which when activate causes an edit user interface to be presented, such as the user interface illustrated in FIG. 16B.

Figure 16B:
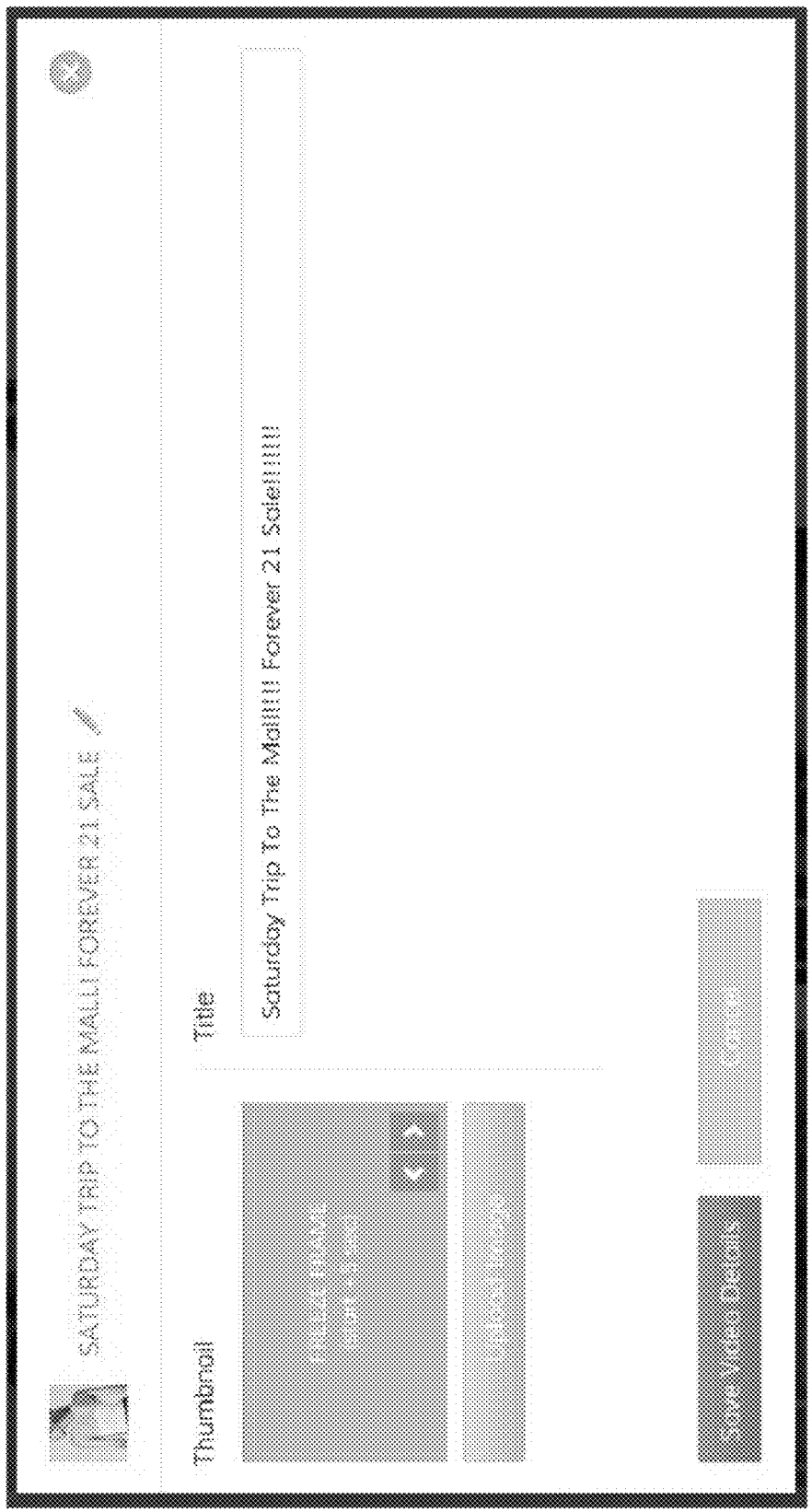

Referring to FIG. 16B, a user interface is provided via which the user can enter and edit descriptive details for the video review, which may be saved as metadata in association with the video review. For example, a field may be provided via which the user can enter and edit a title for the video review. The user may select a frame from the video review to act as a representative frame for the video review. For example, a freeze frame field is provided which statically displays a frame from the video review. Forward and reverse controls are provided via which the user can advance (e.g., on a frame by frame basis) the video review in the freeze frame field. When the user views a frame that the user wants to use as a representative frame for the video review, the user may select that frame (e.g., by clicking on the frame, activating a select frame control, activating a "save video details" control, or otherwise). Optionally, the user may upload an image (or a link to an image) that is to be used as a representative frame. Optionally, the video review title and/or the representative frame (e.g., in a thumbnail, reduced size version) may be displayed in search results that include the video review. Once the user has finalized the title and identified the representative image for the video review, the user may activate the "save video details" control, and the foregoing is saved in system memory, and the example user interface illustrated in FIG. 16C may be provided for display to the user. Optionally, in addition to or instead of the user providing descriptive information, such as an item review title or a name of the item being reviewed, the system may perform an automatic detection process that analyzes one or more frames in the item review and/or representative image, and performs an image analyses to identify the item being reviewed. The system may then add corresponding descriptive detail text, which may be displayed via the video player in association with the item review.

Figure 16C:
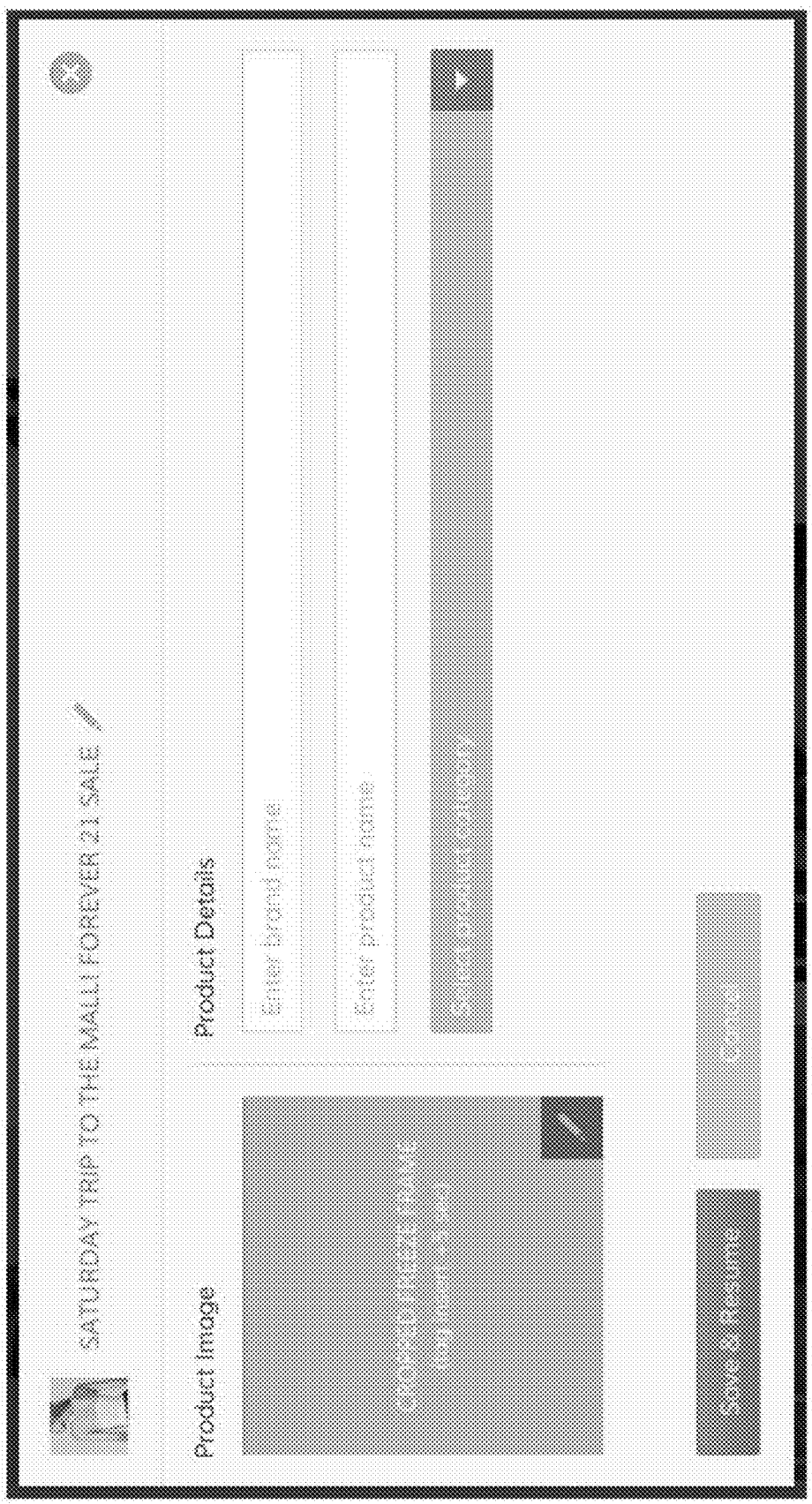

The example interface illustrated in FIG. 16C enables the user to add metadata with respect to the video review, and in particular, for a given item review within the video review. In this example, fields are provided via which the user can provide details regarding the item being reviewed. For example, a brand name field may be provided via which the user can enter a brand name of the item. A product name field may be provided view which the user can enter the item name (which may be a trademark name and/or a descriptive name). A product category field may be provided (e.g. as a drop down menu) via which the user can select, enter or otherwise specify the product category to which the item belongs (e.g., clothing, makeup, jewelry, electronics, accessories, etc.). Fields for receiving other metadata may be provided as well. For example, fields may optionally be provided for receiving the name of the merchant at which the item was purchased, the retail price of the item, the price paid for the item, the item color, the item size, etc.

As similarly discussed above with respect to FIG. 16B, a freeze frame field is provided which statically displays a frame from the video review. Forward and reverse controls are provided via which the user can advance (e.g., on a frame by frame basis) the video review in the freeze frame field. When the user views a frame from the item review, included within the video review, that the user wants to use as a representative frame for the item review, the user may select that frame as similarly discussed above. Once the user has provided the foregoing, the user may activate the "save and resume" control, and the user inputs are saved.

Figure 16D:
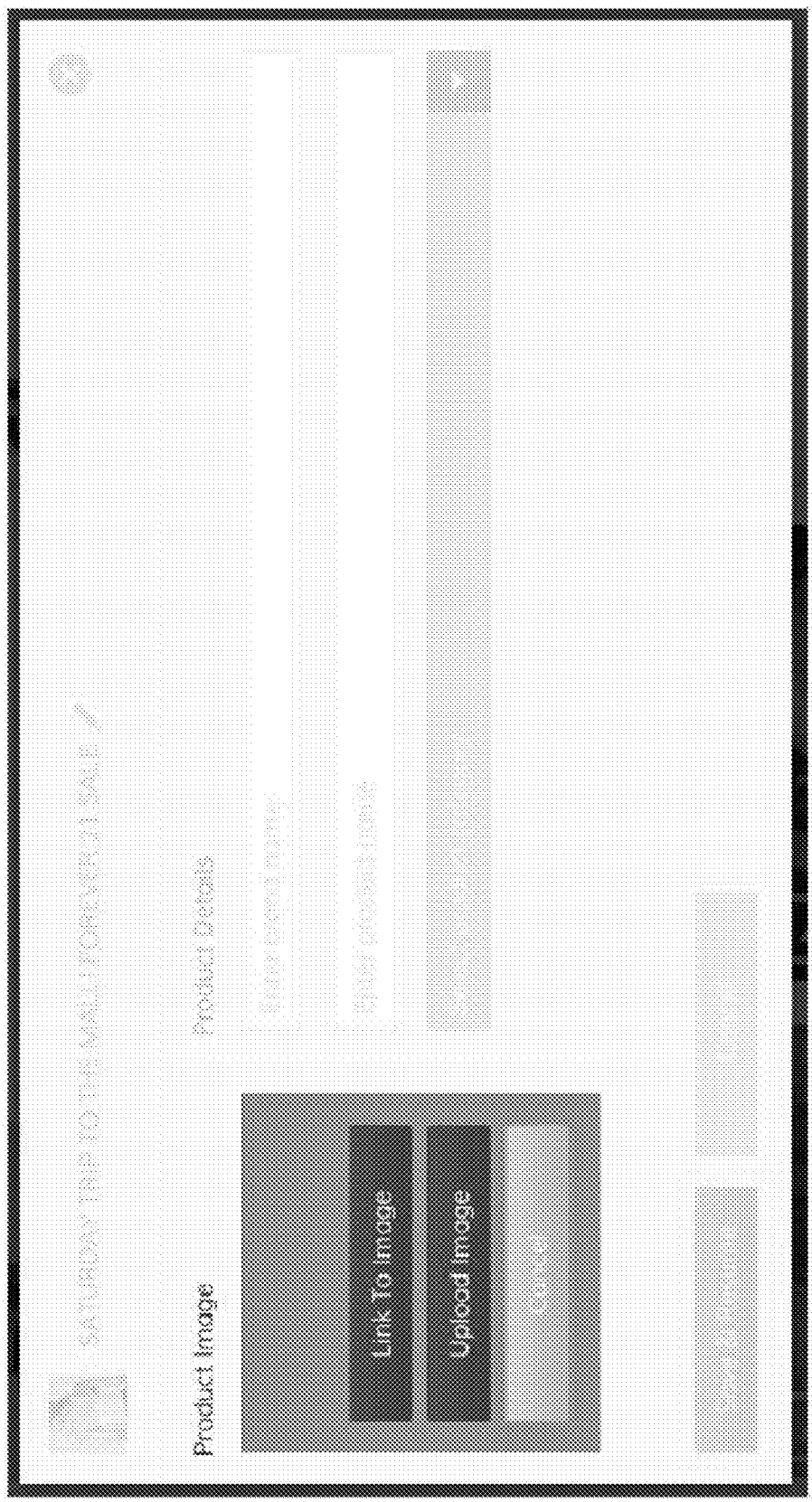

Optionally, an upload user interface, such as that illustrated in FIG. 16D, may be provided which enables the user to upload or link to an image of the item being reviewed, to be used as a representative frame for the item review, which the user may cause to be saved by activating the "save and resume" control.

Figure 16E:
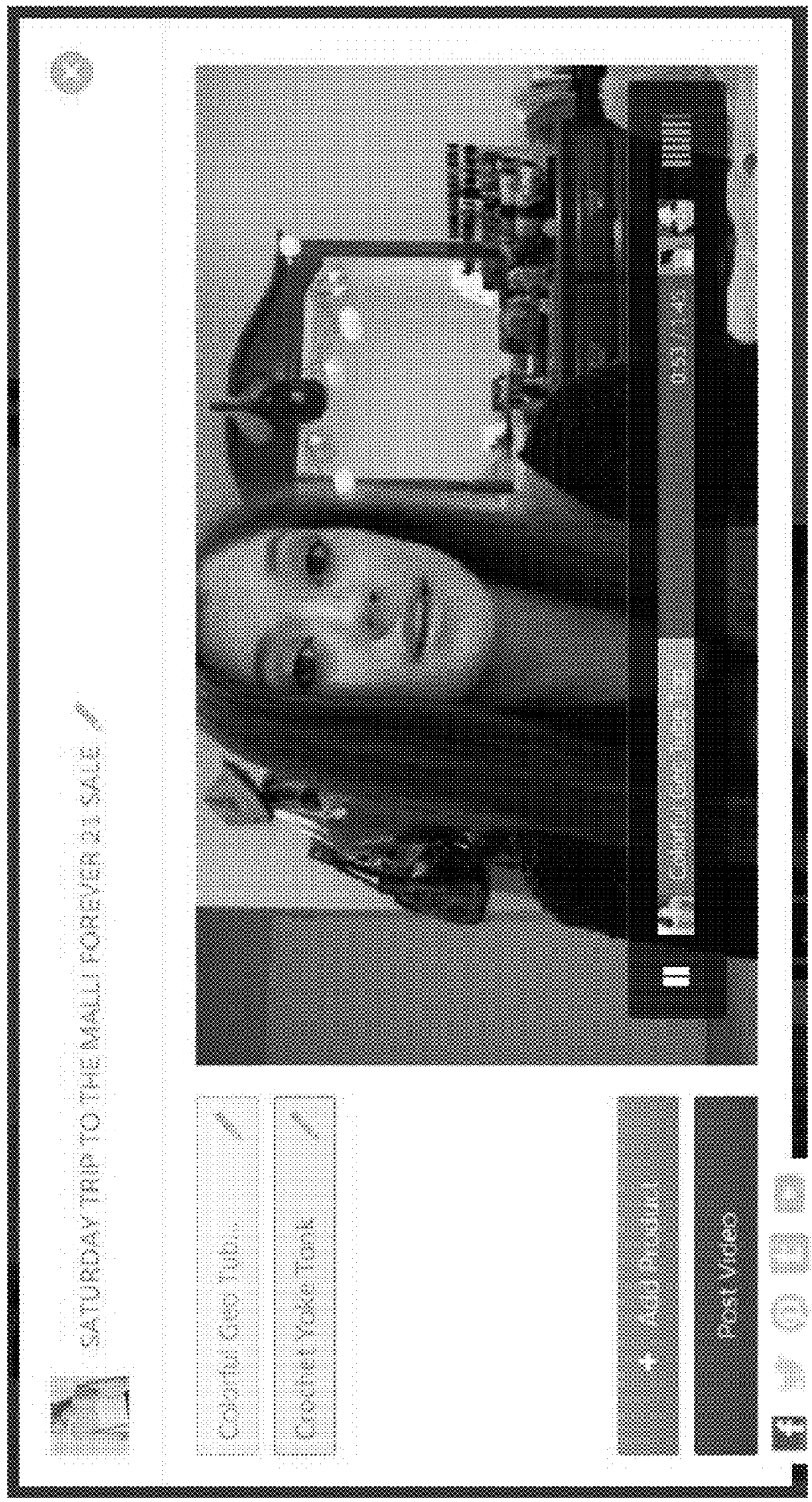

Referring to the example user interface illustrated in FIG. 16E, the user interface presents the video review to the user including some or all of the information provided by the user via the user interfaces discussed above. For example, the representative image and video review title may be displayed adjacent to (or overlaying) the video review playback area. The representative item image and/or item name may be displayed in the scrubber area. The user causes the system to post the video review on one or social networking sites by activating a respective social networking control provided via the user interface.

The user may add information regarding additional item reviews included in the video review by activating the "add product" control illustrated in FIG. 16E. If the user activates the "add product" control, the user may provide the item review information for an additional item review using, optionally the corresponding interfaces discussed above (e.g., the interfaces illustrated in FIGS. 16C-16D). As the user "adds a product" (e.g., by providing the information for a corresponding item review), the item review product name (and/or other identifier, such as the representative item image), appears in an item review listing menu (e.g., on the left side of the user interface, or other location). The user may also edit information for a listed item review. For example, the user may activate the pencil edit control for a corresponding item review, and the user interface illustrated in FIG. 16C may be presented, populated with the previously provided item review information from the user. The user can edit the item review information as desired, and then save the edits, which will then be reflected in the example user interface illustrated in FIG. 16E.

Figure 23A:
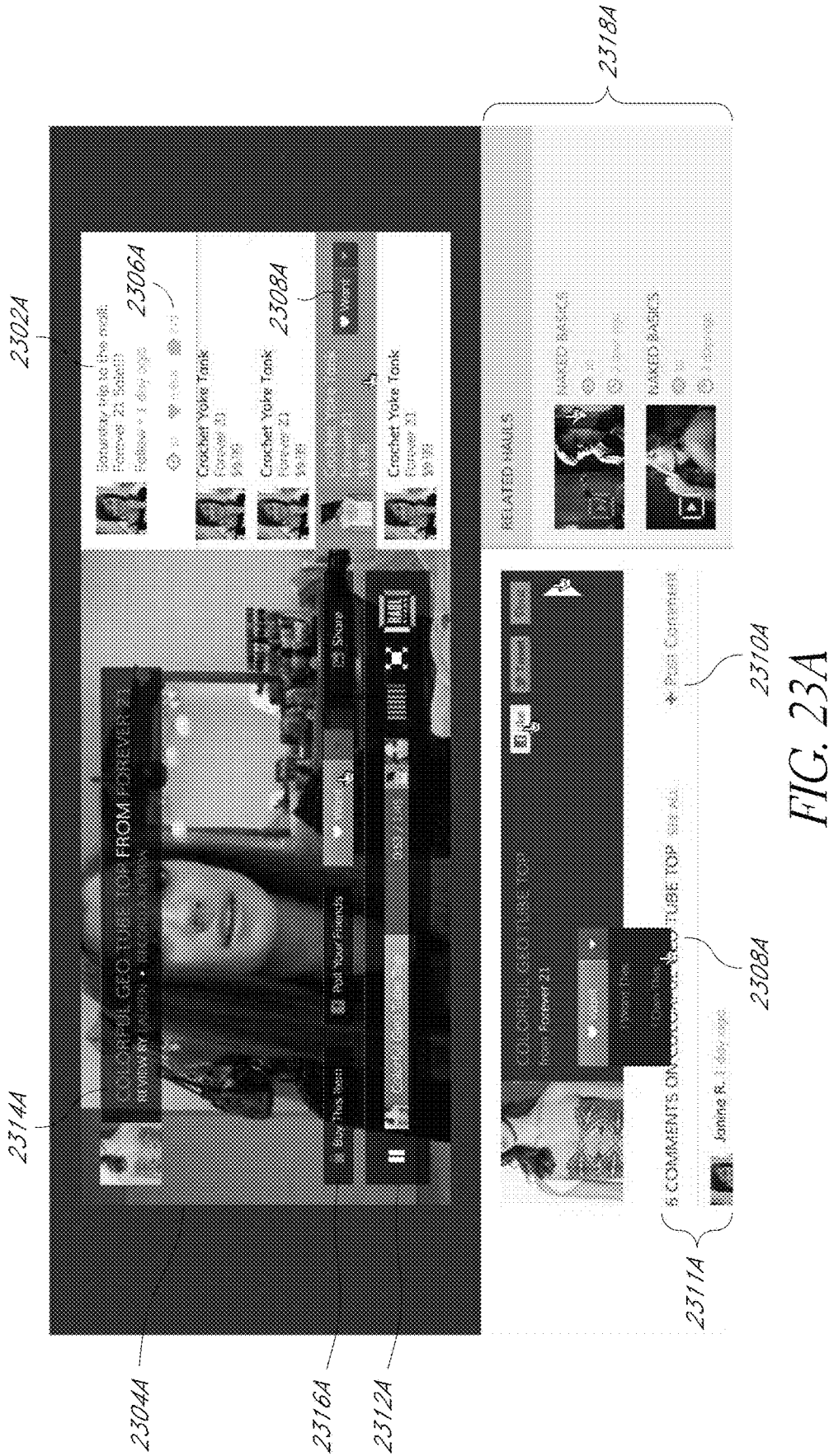

FIG. 23A illustrates an example video review player user interface, as it may appear on a native website (e.g., not as an embedded video review player on a third party website). In this example, a menu (e.g., a list) of item reviews 2302A, included in the video review being played back in playback area 2304A, is provided for display. There may also be a menu entry for the overall video review. A given item review entry in the list 2302A may include one or more of the following: an image from the item review (e.g., a representative image selected as discussed above), an image of the reviewer, the name of the item being reviewed (e.g., Crochet Yoke Tank), the brand of the item being reviewed, and/or a price of the item being reviewed. Other or different information may be provided as well (e.g., the name of the merchant at which the item was purchased, the color of the item, the size of the item, etc.). Social network information may be provided as well in association with a given item review entry and for the overall video review. For example, the number of views, wants, and comments may be displayed in association with an entry (see, e.g., social information 2306A) and/or the video review overall.

In addition, with reference to FIG. 23A, a control 2308A may be provided via which the user can indicate that the user wants the item in a given entry, does not want the item, or already owns the item. A control 2310A may be provided via which the user can provide comments (including questions) on the corresponding item or item review. Comments (by the user and/or other users) associated with the item review displayed in the playback area 2304A may appear in a comments area 2311A. As similarly discussed elsewhere herein, the displayed comments may be synchronized to correspond with the item review being displayed in the playback area 2304A.

A timeline of the video review 2312A may be provided which displays, in sequence, identifiers corresponding to some or all of the item reviews included in the video review (e.g., a representative item review image, a product name, etc.). The timeline may be associated with a scrubber control which the user can move to a desired location in the timeline, which will then be reflected in the video playback area 2304A, as similarly discussed above. Optionally, a user may go directly to an item review by clicking on an item review entry in the list area 2302 and/or in the timeline. Metadata 2314A related to the item review being shown in playback area 2304A may be presented in overlay fashion over the video review and/or elsewhere. For example, the metadata may include the representative image for the item review, the product name, the name of the user (which may be the user's actual name, a user ID or other alias), and/or other information. Play and pause controls may be provided. Optionally, other controls, such as fast forward, reverse, and/or fast reverse controls may be provided as well. A control may be provided enabling the user to record her own review for the item in the item review being displayed and/or for another item.

Controls 2316A may be provided via which the user may purchase the item in the item review being displayed, poll their friends regarding the item in the item review being displayed, indicate that the user wants the item in the item review being displayed, and/or share the item review with others (e.g., via email, SMS, MMS, social networks, blogs, microblogs, and/or otherwise), as similarly discussed in greater detail elsewhere herein. The user interface may also display related reviews the user can view in a related reviews area 2318A.

Figure 23B:
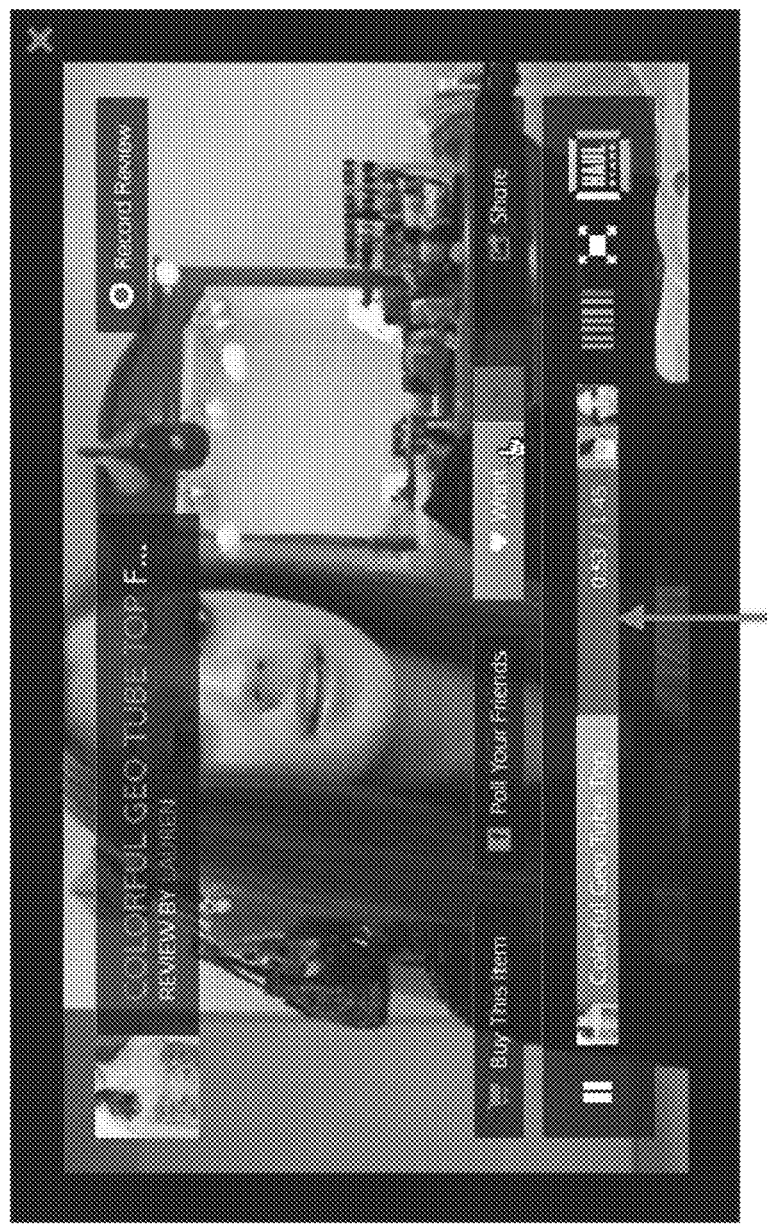

FIG. 23B illustrates another user interface, similar to that illustrated in FIG. 23A, as it may appear when the video review player is embedded on a non-native networked site (e.g., a third party website, in editorial content or in an advertisement, such as in a webpage banner ad). Optionally, the user interface may be initially displayed to a visiting user in an open state, such as that illustrated in FIG. 23B, or there may be a much smaller "watch the review" control, which when activated by a visiting users, causes the user interface to be displayed on the site, editorial content, or an advertisement.

When the video review is displayed via an advertisement or in-line with editorial content, optionally initially an image corresponding to the video review may be presented in the advertisement or editorial content, adjacent to and in conjunction with advertisement/editorial text and/or image(s) separate from the image corresponding to the video review. The image corresponding to the video review may have been provided or selected by the video review author, or by another entity, such as the advertiser or editorial content provider. Optionally, the image corresponding to the video review is not an image from the video review. A video playback control may be displayed in association with the image corresponding to the video review (e.g., overlaying or adjacent to the image), which when selected by the viewer, causes the video played to be activated. For example, the video player optionally may pop up over the advertisement/editorial content, obscuring some or all of the advertisement/editorial content.

The video player may optionally provide a single video including reviews of multiple items reviewed by the same person, or the video player may provide different reviewers reviewing the same and/or different items. Optionally, the video review may include a single item review. The user interface may include some or all of the functionality described above with respect to FIG. 23A. Optionally instead, when the video player is in embedded form, certain functionality may not be provided or present. For example, optionally, the item review listing 2302A, the related reviews area 2318A, and/or the comments area 2311A may optionally be omitted. The video player optionally displays a scrubber area including a scrubber, or optionally does not display a scrubber area including a scrubber. Optionally, a record review control is provided in association with the video player as similarly discussed elsewhere herein. For example, if the user activates the record control the user may record a new video review of the item included in the item review presented to the user, or of another item in the video review, or an item not included in the video review. Optionally, the user may be provided with a user interface enabling the user to add titles, tags and/or item detail information to the video review as similarly discussed elsewhere herein. Optionally, the user may be instructed to only include one item review in the recorded video review, and optionally the ability to indicate start positions for item reviews within the video review may be disabled or not provided to further encourage the user not to include multiple item reviews in the video review.

The video player and/or a remote system with which the video player communicates, may monitor and track a user's interactions with the video player and with other users via the video player, and store and report such information (e.g., to an advertiser or a representative or agent thereof) to provide analytics regarding items being reviewed and user interaction processes. Such analytics may be used to better identify target audiences for advertisements and to better focus advertisement campaigns. Thus, such an embedded (or native) video player may drive user traffic to brand sites (e.g., websites) to purchase items being reviewed or other items from the brand, enables users to share item information with their friends, promoting virality and enabling the collection of consumer insights regarding items.

Figure 24:
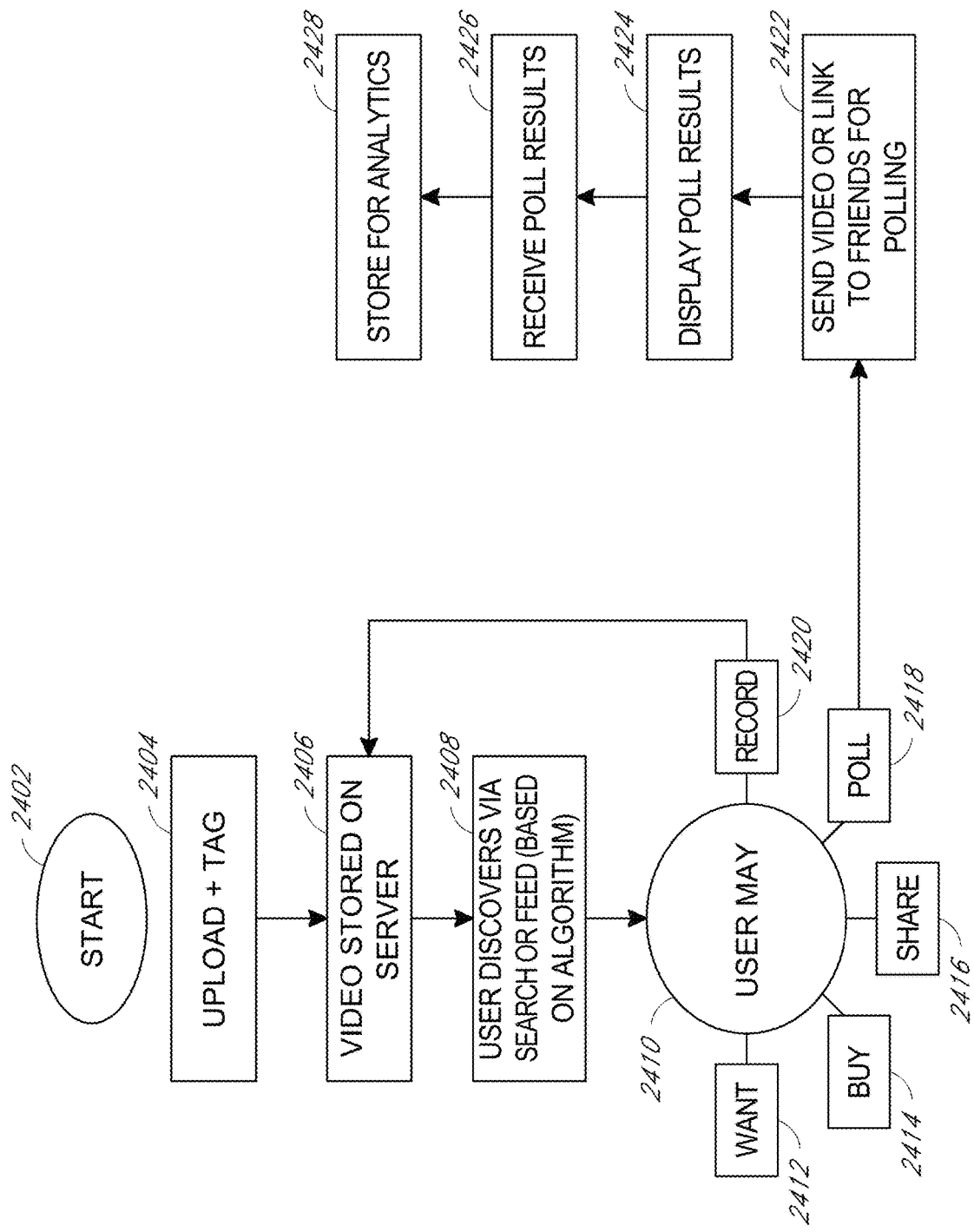
FIGS. 24-25 illustrate example processes.

FIG. 24 illustrates an example process including utilization of a native video player. The process begins at state 2402. At state 2404, a reviewer uploads from a reviewer terminal a video review, including one or more item reviews, and provides associated metadata (e.g., tags and detail information), as similarly discussed above. Optionally, the user may record a new review via a webcam, camcorder, or otherwise. At state 2406, the video review is stored on a remote system (e.g., of a posting system server). At state 2406, the video review is displayed to another user via a video player. For example, the video review may have been discovered by the user as a result of a user review search request submitted to the remote system and returned in search results, the review may be displayed within an advertisement, such as a banner ad, or the video review may have been presented to the user as part of a feed.

At state 2410, the user may interact with the video player. The video player enables the user indicate (e.g., via one or more controls) that the user wants the item 2414, wants to initiate a purchase of the item 2414, wants to share the video review or a subset thereof (e.g., an item review) with others 2416, wants to poll others regarding the item being reviewed 2418, and/or wants to record a review (e.g., of the item in the current review and/or of another item) 2420. If the user indicates that the user wants to record another review, the process proceeds back to state 2406. If the user indicates that the user wants to initiate a poll, the process may proceed to state 2422, and the remote system or video player transmits the video review (and optionally, just the item review contained in the video review, where the video review includes multiple item reviews) and/or a link to the video review, to one or more other users for polling (e.g., other users specified by the user, other users networked to the user via one or more social networking sites, other users in the user's contact database, and/or otherwise).

At state 2424, the results are received from the users that responded to the poll are tabulated (e.g., added up to determine how may users indicated they like the item, how many indicated they dislike the item, and/or how many indicated are indifferent or have no opinion regarding the item). The results, including the tabulation, may be transmitted to and presented to the user that initiated the poll via the user's terminal. At state 2426, the poll results may also be transmitted to, and received by, another system, such as that of an advertiser, retail enterprise, and/or manufacturer. At state 2428, the receiving system may store the poll results and perform analytics on the results. Optionally, the poll results may include demographics (which may have been obtained for a social network of which they are a member, and may include such information as gender, age, income, education, relationship status (e.g., single, married, divorced, in a relationship, etc.)) of poll respondents in association with their poll response, to further facilitate the performance of analytics (e.g., to determine characteristics of those that liked, disliked, or are indifferent to the item being reviewed).

An example review aggregation process will now be described with respect to a merchant of the item(s), a manufacturer of the item(s), or other entity (e.g., a media company which has properties that provide editorial and/or advertising content) related to items being reviewed. Such entities may have a networked site via which the item reviews can be accessed. User video reviews and advertisements (e.g., advertisements related to item(s) being reviewed) may be aggregated at a central or distributed system. A user interface may be provided via which the entity may rate a given item review, categorize a given item review for appropriate use (e.g., for publication, for selective publication on certain sites and not on other sites, for in-edit publication and/or in-ad publication, for research and not for publication, etc.). By way of example, the commerce-enabled video player and/or video reviews (and other content, such as tutorials on the user of the commerce enabled video player and user instructions on generating item reviews) may be licensed. By way of example, a media company could use such review content and the commerce enabled video player to make their properties (e.g., websites, applications, etc.) more attractive to advertisers and may enable such media company to charge advertisers relatively higher advertising rates.

Figure 19A:
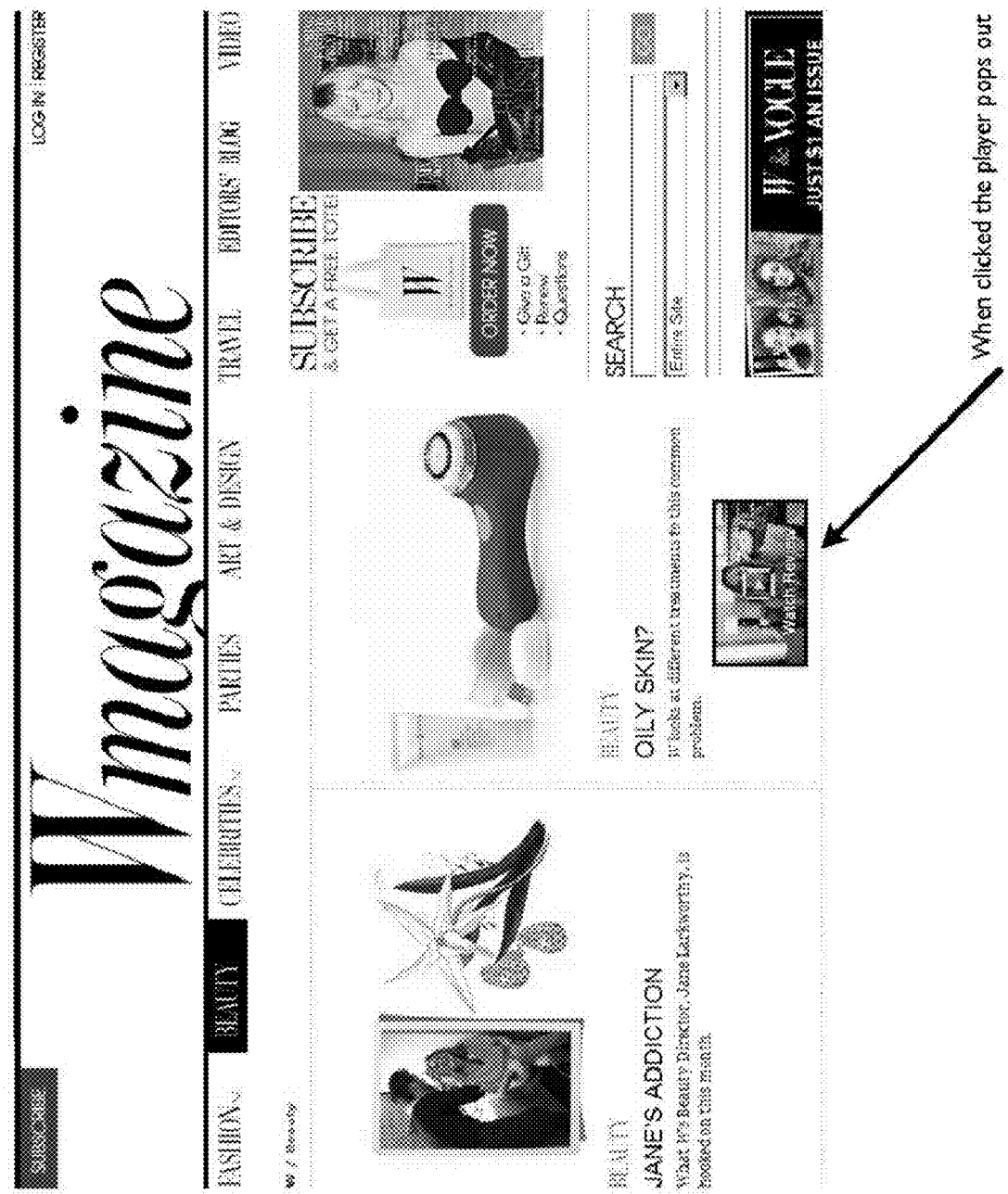
Figure 19B:
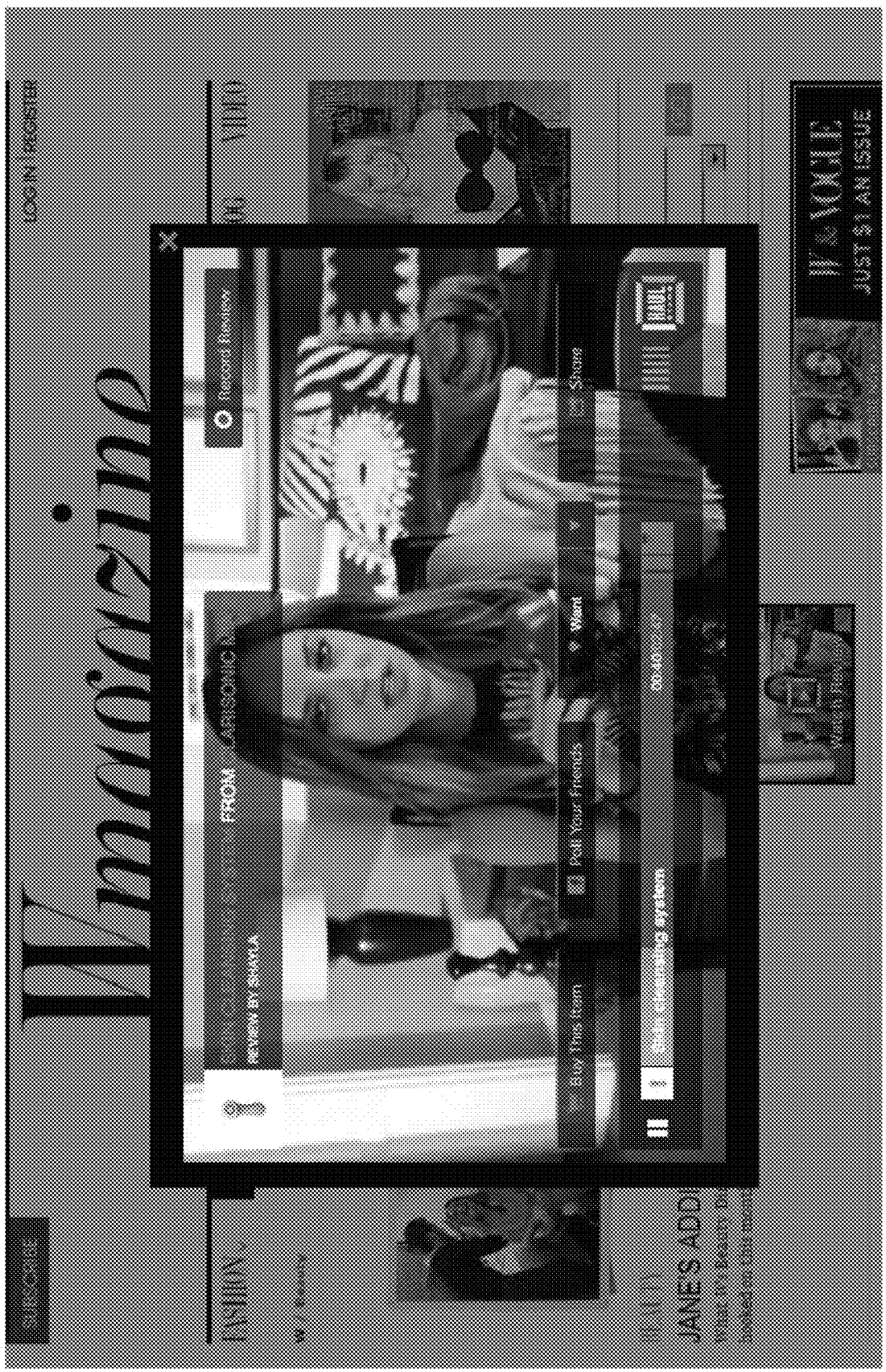

FIGS. 19A-B illustrates an example item review provided via an in-edit. The video review may be similarly presented via an advertisement. As similarly discussed above, and as illustrated in FIG. 19A, an image corresponding to the video review may be presented in the advertisement or editorial content, adjacent to and in conjunction with advertisement/editorial text and/or image(s) separate from the image corresponding to the video review. Optionally, the image corresponding to the video review is not an image from the video review. A video playback control may be displayed in association with the image corresponding to the video review (e.g., overlaying image in this example), which when selected by the viewer, causes the video player to be activated. For example, the video player optionally may pop up over the advertisement/editorial content, obscuring some or all of the advertisement/editorial content, as illustrated in FIG. 19B. Optionally instead, the video player may be presented in-line with the advertisement, without obscuring advertisement text. As similarly discussed above, the video player may include controls via which the user can indicate that the user wants the item, wants to initiate a purchase of the item, wants to share the video review with others, wants to poll others regarding the item being reviewed, and/or wants to record a review (e.g., of the item in the current review and/or of another item). In this example, a scrubber is provided, including representative images corresponding to item reviews included in the video review. The user may jump to a given item review by selecting a corresponding representative image, as similarly discussed above. The video review author and title of the video review (as well as of item reviews) may be presented as well via the video player.

Figure 25:
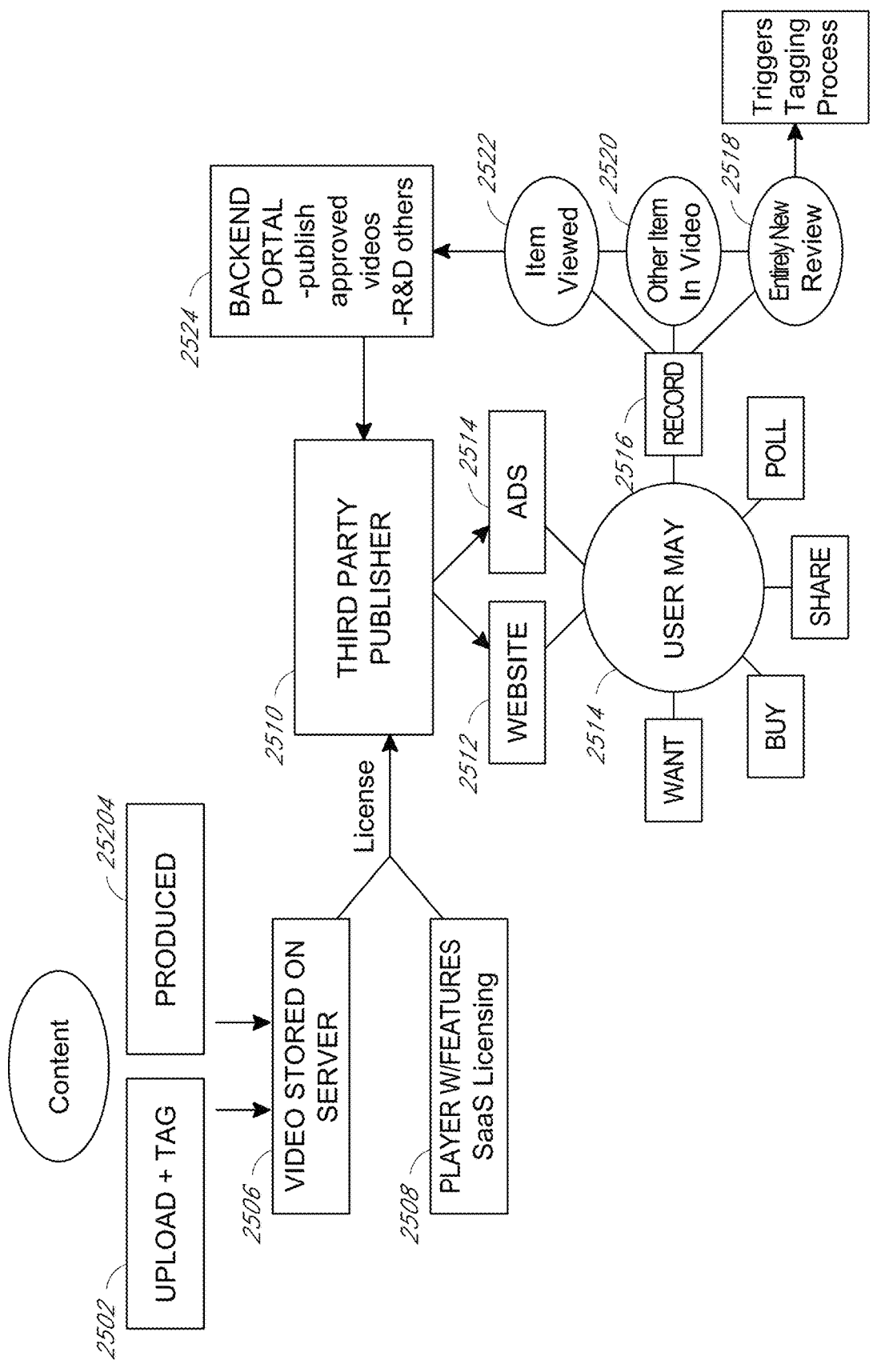

FIG. 25 illustrates an example process including utilization of an embedded video player, which may be displayed on a third party website, such as within editorial content (e.g., of an online magazine) or within an advertisement (e.g., a banner ad or otherwise). At state 2502, a reviewer uploads from a reviewer terminal a video review, including one or more item reviews, and associated metadata (e.g., tags and detail information) as similarly discussed above. At state 2504 the reviewer may instead record a new review (e.g., via a webcam or camcorder, as similarly discussed elsewhere herein). At state 2506, the video is stored on a remote system (e.g., of a posting system server). At state 2510, the review content and the video player 2508 is provided (or access thereto is provided) to a third party publisher. At states 2512, 2514 the third party publisher publishes the video player and the content in conjunction with editorial content (e.g., on a website magazine) and/or in an advertisement (which may be presented on a webpage), which users may then view via user terminals.

At state 2514, the user may interact with the video player as similarly discussed above with respect to FIG. 24. For example, the video player may enable the user indicate (e.g., via one or more controls) the user wants the item, wants to initiate a purchase of the item, wants to share the video review or a subset thereof (e.g., an item review) with others, wants to poll others regarding the item being reviewed, and/or wants to record a review (e.g., of the item in the current review and/or of another item). If the user indicates that the user wants to initiate a poll, the process may proceed as similarly discussed above with respect to FIG. 24.

If the user indicates that the user wants to record a new video review 2516, the process proceeds to states 2518 (where the user records a review for an item not included in the video review being viewed by the user), 2520 (where the user records a review for a different item included in the video review being viewed by the user), or 2522 (where the user records a review for the item whose review is currently displayed to the user). The process may then prompt the user to add metadata, such as tags and/or other item details, to the review, as similarly discussed elsewhere herein. Optionally, the user may be instructed to only include one item review in the recorded video review, and optionally the ability to indicate start positions for item reviews within the video review may be disabled or not provided.

At state 2524, the new review may optionally be reviewed by the third party publisher and/or other entity, as similarly discussed elsewhere herein, and/or may be used for research and development purposes and/or to better focus future advertising. If approved for publishing, the review may then be published by the third party publisher, optionally in conjunction with editorial content, an advertisement, and/or otherwise.

Certain embodiments provide location based services. Certain embodiments may determine a substantially current location of a user. For example, the user location may be determined from information transmitted by a mobile device being carried by the user. The mobile device may be a smart phone, a mobile entertainment device, a GPS enabled watch, or other device. The location information may be GPS-based, WiFi-based, and/or cell tower-based location information. The location information may be manually provided by the user (e.g., by entering in an address, selecting a corresponding contact record in a contact record data store, by checking in at a location, etc.). The location information may be transmitted via an application downloaded and installed on the user's mobile device to a remote system, such as the posting system, or may be preinstalled on the mobile device.

Based at least in part on the user's location, the system may determine which merchants are within a specified distance or vicinity of the user's location (e.g., within 30 meters, 100 meters, 500 meters, or other distance). The system may further determine what items and/or types of items are sold by merchants within the specified distance. The system may determine whether the system has access to video reviews (e.g., consumer generated video reviews) corresponding to one or more items and/or types of items sold by merchants within the specified distance. The system may then transmit to the user mobile device (e.g., to an application installed on the mobile device), one or more of the identified item video reviews (and/or links to such reviews), and may further transmit to the mobile device merchant referral information indicating which merchants sell or may sell the item, optionally in association with addresses of such merchants and/or directions from the user's location to such merchants.

Optionally, the system may further provide discount coupons or codes which can be applied to the purchase of the item at some or all of the identified merchants. Optionally, the merchants pay a fee to the system operator for such referral services and/or the merchants may pay a fee to the system operator for purchases made by users referred to the merchants. Optionally, when the user is close to (e.g., within a specified distance or area) and/or enters the merchant's establishment, the application installed on the user's mobile device (e.g., smart phone) may automatically prompt the user (via sound, text, and/or graphic alert) to view a review of an item the user has indicated they want or like and/or present a review (or notify the user regarding the review) based at least in part on the user's demographic information. The user may be presented with incentives, such as discounts, prior to and/or in response to entering the merchant's establishment. The user may also be provided incentives if the user records a review of an item(s) at the merchant's establishment. The review may be of the reviewed item or other item(s) at the merchant. Optionally, the user may manually access the application in order to record such a review. The review may be uploaded and tagged as similarly discussed above. In this manner, the viewing of a given review by a user leads to the user recording additional reviews, further expanding the amount of review content available to users.

While certain embodiments may have been discussed with reference to the reviews of items, such as products and services, certain of foregoing functionalities may be applied to other uses, such as online dating. For example, if a user provides a dating service with profile information of the user and/or of the traits desired by the user in a potential match, a dating system may utilize such information to identify other users who may be potential matches. If the potential matches are associated with video content, such as a potential match describing his or herself (e.g., a "self-review"), the dating system may assemble the video content for the plurality of potential matches into a single video file, with representative images included or identified corresponding to respective potential match videos. The representative image may include an image of the potential match.

The video file may be displayed via the video player, and some or all of the representative images may be displayed in the video player scrubber area. The user can select a given image in the scrubber area, and the corresponding portion of the video file will then be played back to the user, skipping over preceding video portions of other potential matches. Optionally, if a user selects an image, the user can indicate that they are interested in the corresponding potential match, and/or the application will navigate to an online dating site associated with the dating service, enabling the user to learn more about the potential match and/or to arrange a meeting with the potential match.

Thus, example systems and methods are described for collecting and distributing user generated video reviews, for polling users with respect to reviewed items, and for enabling users to indicate that they want an item in a video review.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein a second.

While certain embodiments may be illustrated or discussed as having certain example components, additional, fewer, or different components may be used. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app") installed on the user's mobile phone, laptop, pad, desktop, television, set top box, phone, or other terminal. Various features described or illustrated as being present in different embodiments or user interfaces may be combined into the same embodiment or user interface. While certain examples may refer to a website or web page, other networked resources and other types of document may be used, which may or may not use web standards to provide and/or receive information and instructions. While certain functionality may be described with respect to a mobile phone application, the same or similar functionality may be provided via other interfaces, such as a browser (optionally using browser plug-in), a camera equipped kiosk, or otherwise. Similarly, while certain functionality may be described with respect to a browser, similar or the same functionality may be provided via a dedicated app, a camera equipped kiosk, or otherwise.

While various features and advantages of the present invention have been described and illustrated in detail, it is to be understood by those skilled in the art that many modifications to the various embodiments herein can be made without departing from the spirit of the invention.

What is claimed is:

1. A system, comprising:
   a computing device;
   a network interface;

non-transitory memory that stores programmatic instructions that when executed by the computing device cause the system to perform operations comprising:

limiting a time length of uploaded videos to a first time length;

providing a first user interface for display on a first user device configured to be used to upload a compressed video file wherein the first user interface is configured to enable a user to drag content to a visually defined area in the first user interface and to upload the content dragged to the visually defined area of the first user interface to the system, and is further configured to enable the user to upload the video file by selecting the video file via browse control, and is further configured to enable the user to upload the video file by providing a link, comprising a Uniform Resource Locator (URL) to the video file;

receiving via the first user interface, using a network interface, an upload the video file or a link to the video file, to enable the upload of the video file from a linked-to source, from a device of a first user;

enabling the first user to shorten a length of the video file after the video file is uploaded to the system by removing a portion of the uploaded video file;

providing a user interface comprising a scrubber control, for display on the first user device via which the first user can define multiple segments to which metadata can be added, separate from the shortening of the length of the video file after the video file is uploaded to the system by removing a portion of the uploaded video file, wherein the user interface comprising the scrubber control enable the first user to:
  manipulate the scrubber control to define multiple segments within the shortened video file, including:
    manipulate the scrubber control to define a first starting point corresponding to a start of a first segment within the shortened video file, and
    manipulate the scrubber control to define a second starting point corresponding to a start of a second segment within the shortened video file;
  define first metadata associated with the first segment within the shortened video file;
  define second metadata associated with the first segment within the shortened video file;
  define third metadata associated with the second segment within the shortened video file;
  define fourth metadata associated with the second segment within the shortened video file;

receiving, via the user interface including the scrubber control, a definition of the first starting point corresponding to the start of the first segment within the video file, the second starting point corresponding to the start and of a second segment within the video file, the first metadata, the second metadata, the third metadata, and the fourth metadata;

providing an image upload interface different from the first user interface via which the first user can upload an image separately from the video file;

receiving, separately from the video file, via the image upload interface, an upload of a first image;

storing an association of the first image, uploaded separately from the video file, with the video file, wherein the first image is associated with the first segment of the shortened video file;

receiving a first link associated with the first segment of the shortened video file;

receiving, separately from the video file, via the image upload interface, an upload of a second image;

storing an association of the second image, uploaded separately from the video file, with the video file, wherein the second image is associated with the second segment of the shortened video file;

receiving a second link associated with the second segment of the shortened video file;

displaying at least a first textual tag on a timeline in association with a playback of the shortened video file;

enabling the shortened video file to be published on one or more networked sites in association with share controls enabling a viewer to share video file content using a communication channel selectable from a set of communication channels comprising at least:
  a messaging service comprising an SMS and/or MMS messaging service, and
  a social network,
wherein viewers are enabled to add comments related to the shortened video file via at least one of the one or more networked sites;

enabling, during playback of the first segment of the shortened video file, a first overlay to be displayed, the first overlay comprising the first image and the second metadata, wherein selection by a viewer of the first overlay causes a corresponding navigation event associated with the first link to occur; and enabling, during playback of the second segment of the shortened video file, a second overlay to be displayed, the second overlay comprising the second image and the fourth metadata, wherein selection by a viewer of the second overlay causes a corresponding navigation event associated with the second link to occur;

enabling a video player to be embedded on a third party site and the shortened video file to be played via the video player embedded on the third party site;

providing a search interface enabling a search to be performed for video files received from at least one user device, including the shortened video file having the defined first starting point corresponding to the start of the first segment within the shortened video file and the defined second starting point corresponding to the start of the second segment within the shortened video file.

2. The system as defined in claim 1, wherein the first user interface comprises:
  wherein the visually defined area in the first user interface is a four sided box;
  a user interface that enables the first user to select a file from the device of the first user to upload of the video file to the system; and
  a user interface that enables the first user to provide a link associated with the video file to upload of the video file to the system.

3. The system as defined in claim 1, the operations further comprising:
  enabling the first user to publish the shortened video file to a social network site and enabling other users to provide a like indication with respect to the shortened video file when published to the social network site; and
  determining a number of views for the shortened video file and a number of likes for shortened the video file received at the social networking site.

4. The system as defined in claim 1, the operations further comprising:
providing a search tool that enables users to search for video files using search terms.

5. The system as defined in claim 1, the operations further comprising:
enabling the first user to publish the shortened video file to a social network site;
detecting feedback of viewers of the shortened video file on the social network site; and
generating a graph reflective of the detected feedback of viewers.

6. The system as defined in claim 1, wherein the operations enable the first user to define the first starting point by specifying at what point in time in the first segment begins.

7. The system as defined in claim 1, wherein the operations further cause at least a first tag to be displayed in conjunction with a timeline.

8. The system as defined in claim 1, wherein the operations further cause a preview control and a post control to be provided in association with the shortened video file, wherein activation of the preview control enables the first user to preview the shortened video file, and activation of the post control causes the shortened video file to be posted.

9. The system as defined in claim 1, the operations further comprising:
providing a user interface, comprising a first area, that enables the first user to drag the video file to the first area to initiate uploading of the video file to the system;
providing a user interface that enables the first user to select a file from the device of the first user to upload of the video file to the system;
providing a user interface that enables the first user to provide a link associated with the video file to upload of the video file to the system;
providing a search tool that enables users to search for video files using search terms, wherein the search tool identifies relevant video files based at least in part on respective textual detail information associated with the video files;
enabling the first user to publish the shortened video file to a social network site;
detecting feedback of viewers of the published shortened video file on the social network site;
generating a graph reflective of the detected feedback of viewers of the published shortened video file; and
causing at least a first tag to be displayed in conjunction with a timeline associated with at least one received video file.

10. A system, comprising:
a computing device;
a network interface;
non-transitory memory that stores programmatic instructions that when executed by the computing device cause the system to perform operations comprising:
limiting a time length of uploaded videos to a first time length;
providing a first user interface for display on a first user device, the first user interface providing at least the following options to provide a video file:
upload the video file via a drag and drop operation;
receive a link to the video file;
upload the video file by selecting the video file via browse control;
receiving via the first user interface, using a network interface, an upload of the video file or a link to the video file, to enable the upload of the video file from a linked-to source, from a device of a first user;
enabling the first user to shorten a length of the uploaded video file after the video file is uploaded;
providing a user interface comprising a scrubber control for display on the first user device via which the first user can define multiple segments to which metadata can be added, separate from the shortening of the length of the video file after the video file is uploaded, wherein the user interface comprising the scrubber control enable the first user to:
manipulate the scrubber control to define multiple segments within the shortened video file, including:
manipulate the scrubber control to define a first starting point corresponding to a start of a first segment within the shortened video file, and
manipulate the scrubber control to define a second starting point corresponding to a start of a second segment within the shortened video file;
define first metadata associated with the first segment;
define second metadata associated with the second segment;
receiving, via the user interface, a definition of the first starting point corresponding to the start of the first segment within the shortened video file, the second starting point corresponding to the start and of a second segment within the shortened video file, the first metadata, and the second metadata;
providing an image upload interface via which the first user can upload an image separately from the video file;
receiving, separately from the video file, via the image upload interface, an upload of a first image, wherein the first image is associated with the first segment of the shortened video file;
enabling the shortened video file, first metadata, and second metadata to be published to an external website in association with share controls enabling a viewer to share video file content using a communication channel selectable from a set of communication channels comprising at least:
a messaging service comprising an SMS and/or MMS messaging service, and
a social network, wherein viewers are enabled to add comments related to the shortened video file via at least the social network,
wherein the external website utilizes an embedded video player comprising a program; and
enabling, during playback of at least a portion of the shortened video file by the video player, a first overlay to be displayed, comprising the first image received separately from the video file.

11. The system as defined in claim 10, the operations further comprising:
receiving third metadata associated with the first segment;
receiving a first link associated with the first segment;
receiving, via the image upload interface, an upload of a second image uploaded separately from the video file, wherein the second image is associated with the second segment of the shortened video file;
receiving fourth metadata associated with the second segment;
receiving a second link associated with the second segment;

enabling, during playback of the first segment of the shortened video file, a first overlay to be displayed comprising the first image and the third metadata, wherein selection by a viewer of the first overlay causes a corresponding navigation event associated with the first link to occur;

enabling, during playback of the second segment of the shortened video file, a second overlay to be displayed comprising the second image and the fourth metadata, wherein selection by a viewer of the second overlay causes a corresponding navigation event associated with the second link to occur.

12. The system as defined in claim 10, wherein the first user interface comprises:

a user interface, comprising a first area, that enables the first user to drag the video file to the first area to initiate uploading of the video file to the system;

a user interface that enables the first user to select a file from the device of the first user to upload of the video file to the system; and a user interface that enables the first user to provide a link associated with the video file to upload of the video file to the system.

13. The system as defined in claim 10, the operations further comprising:

enabling the first user to publish the shortened video file to a social network site and enabling other users to provide a like indication with respect to the shortened video file when published to the social network site; and determining a number of views for the video file and a number of likes for the video file received at the social networking site.

14. The system as defined in claim 10, the operations further comprising:

providing a search tool that enables users to search for video files using search terms.

15. The system as defined in claim 10, the operations further comprising:

enabling the first user to publish the shortened video file to a social network site;

detecting feedback of viewers of the shortened video file on the social network site; and generating a graph reflective of the detected feedback of viewers.

16. The system as defined in claim 10, wherein the operations enable the first user to define the first starting point by specifying at what point in time in the first segment begins.

17. The system as defined in claim 10, wherein the operations further cause at least a first tag to be displayed in conjunction with a timeline.

18. The system as defined in claim 10, wherein the operations further cause a preview control and a post control to be provided in association with the shortened video file, wherein activation of the preview control enables the first user to preview the shortened video file, and activation of the post control causes the video file to be posted.

19. The system as defined in claim 10, the operations further comprising:

providing a user interface, comprising a first area, that enables the first user to drag the video file to the first area to initiate uploading of the video file to the system;

providing a user interface that enables the first user to select a file from the device of the first user to upload of the video file to the system;

providing a user interface that enables the first user to provide a link associated with the video file to upload of the video file to the system;

providing a search tool that enables users to search for video files using search terms, wherein the search tool identifies relevant video files based at least in part on respective textual detail information associated with the video files;

enabling the first user to publish the shortened video file to a social network site and enabling other users to provide a like indication with respect to the published shortened video file when published to the social network site; and determining a number of views for the shortened video file and a number of likes for the shortened video file received at the social networking site; and causing at least a first tag to be displayed in conjunction with a timeline associated with at least one received video file.

20. A computer implemented method, comprising:

providing a first user interface for display on a first user device configured to be used to upload a video file or receive a link to the video file;

limiting a time length of uploaded videos to a first time length;

receiving via the first user interface, over a network using a network interface at a computer system configured to enabling editing and distribution of video media, the video file or a link to the video file from a device of a first user;

enabling the first user to shorten a length of the video file after the video file is received by the computer system;

providing by the computer system a user interface comprising a scrubber control for display on the first user device via which the first user can define multiple segments to which metadata can be added, separate from the shortening of the length of the video file after the video file is uploaded, wherein the user interface comprising the scrubber control enable the first user to:

manipulate the scrubber control to define multiple segments within the shortened video file, including:

manipulate the scrubber control to define a first starting point corresponding to a start of a first segment within the shortened video file, and manipulate the scrubber control to define a second starting point corresponding to a start of a second segment within the shortened video file;

define first metadata associated with the first segment;

define second metadata associated with the second segment;

receiving, via the user interface, at the computer system a definition of:

the first starting point corresponding to the start of the first segment within the shortened video file, the second starting point corresponding to the start of the second segment within the shortened video file, the first metadata, and the second metadata;

providing an image upload interface via which the first user can upload an image separately from the video file;

receiving, separately from the video file, via the image upload interface, an upload of a first image wherein the first image is associated with the first segment of the shortened video file;

enabling the shortened video file, first metadata, and second metadata to be published to an external networked site using an embedded video player in association with share controls enabling a viewer to share video file content using a communication channel selectable from a set of communication channels comprising at least:
  a messaging service comprising an SMS and/or MMS messaging service, and
  a social network,
wherein viewers are enabled to add comments related to the shortened video file via at least one of the one or more networked sites;
enabling, during playback of at least a portion of the shortened video file by the video player, a first overlay to be displayed, comprising the first image uploaded separately from the video file; and
providing a search interface enabling a search to be performed for video files, including the shortened video file having the defined first starting point corresponding to the start of the first segment within the shortened video file and the defined second starting point corresponding to the start of the second segment within the shortened video file.

21. The method as defined in claim 20, the method further comprising:
receiving third metadata associated with the first segment;
receiving a first link associated with the first segment;
receiving, via the image upload interface, an upload of a second image, wherein the second image is associated with the second segment;
receiving fourth metadata associated with the second segment;
receiving a second link associated with the second segment;
enabling, during playback of the first segment of the shortened video file, a first overlay to be displayed comprising the first image and the third metadata, wherein selection by a viewer of the first overlay causes a corresponding navigation event associated with the first link to occur;
enabling, during playback of the second segment of the shortened video file, a second overlay to be displayed comprising the second image and the fourth metadata, wherein selection by a viewer of the second overlay causes a corresponding navigation event associated with the second link to occur.

22. The method as defined in claim 20, wherein the first user interface comprises:
a user interface, comprising a first area, that enables the first user to drag the video file to the first area to initiate uploading of the video file to the computer system;
a user interface that enables the first user to select a file from the device of the first user to upload of the video file to the computer system; and
a user interface that enables the first user to provide a link associated with the video file to upload of the video file to the computer system.

23. The method as defined in claim 20, the method further comprising:

enabling the first user to publish the shortened video file to a social network site and enabling other users to provide a like indication with respect to the shortened video file when published to the social network site; and
determining a number of views for the shortened video file and a number of likes for the shortened video file received at the social networking site.

24. The method as defined in claim 20, the method further comprising:
providing a search tool that enables users to search for video files using search terms.

25. The method as defined in claim 20, the method further comprising:
enabling the first user to publish the shortened video file to a social network site;
detecting feedback of viewers of the shortened video file on the social network site; and
generating a graph reflective of the detected feedback of viewers.

26. The method as defined in claim 20, the method further comprising enabling the first user to define the first starting point by specifying at what point in time in the first segment begins.

27. The method as defined in claim 20, the method further comprising enabling at least a first tag to be displayed in conjunction with a timeline.

28. The method as defined in claim 20, the method further comprising enabling a preview control and a post control to be provided in association with the shortened video file, wherein activation of the preview control enables the first user to preview the shortened video file, and activation of the post control causes the shortened video file to be posted.

29. The method as defined in claim 20, the method further comprising:
providing a user interface, comprising a first area, that enables the first user to drag the video file to the first area to initiate uploading of the video file to a storage system;
providing a user interface that enables the first user to select a file from the device of the first user to upload of the video file storage system;
providing a user interface that enables the first user to provide a link associated with the video file to upload of the video file to the storage system;
providing a search tool that enables users to search for video files using search terms;
enabling the first user to publish the shortened video file to a social network site;
enabling other users to provide a like indication with respect to the published shortened video file when published to the social network site;
determining a number of views for the published shortened video file and a number of likes for the published shortened video file received at the social networking site; and
causing at least a first tag to be displayed in conjunction with a timeline associated with at least one received video file.

* * * * *

UNITED STATES PATENT AND TRADEMARK OFFICE
CERTIFICATE OF CORRECTION

PATENT NO. : 10,909,586 B2
APPLICATION NO. : 15/973082
DATED : February 2, 2021
INVENTOR(S) : Narbeh Avedissian Page 1 of 2

It is certified that error appears in the above-identified patent and that said Letters Patent is hereby corrected as shown below:

On the Title Page

On page 3, in Column 2, item (56), Other Publications, Line 9, delete "DialogSrchJul." and insert -- DialogSrch Jul. --.

On page 3, in Column 2, item (56), Other Publications, Line 18, delete "wwwIdolUnderground.com" and insert -- www.IdolUnderground.com --.

On page 3, in Column 2, item (56), Other Publications, Line 20, delete "wwwidolUnderground.com" and insert -- www.IdolUnderground.com --.

In the Drawings

In sheet 38 of 39, FIG. 25, Line 2, delete "25204" and insert -- 2504 --.

In the Specification

In Column 3, Line 47, delete "and or" and insert -- and/or --.

In Column 5, Line 2, delete "be" and insert -- being --.

In Column 9, Line 52, delete "FIG." and insert -- FIGS. --.

In Column 10, Line 64, delete "costumer" and insert -- customer --.

In Columns 10-11, Lines 67 and 1, delete "costumer" and insert -- customer --.

In Column 12, Line 29, delete "RIFD" and insert -- RFID --.

In Column 18, Line 65, delete "costumer" and insert -- customer --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,909,586 B2

In Column 31, Line 25, delete "pate" and insert -- page --.

In the Claims

In Column 44, Line 67, Claim 3, delete "social networking site" and insert -- social network site --.

In Column 47, Lines 33-34, Claim 13, delete "social networking site" and insert -- social network site --.